US008073845B2

(12) United States Patent
Homma et al.

(10) Patent No.: US 8,073,845 B2
(45) Date of Patent: Dec. 6, 2011

(54) INFORMATION RETRIEVAL APPARATUS, INFORMATION RETRIEVAL SYSTEM, AND INFORMATION RETRIEVAL METHOD

(75) Inventors: Takeshi Homma, Fuchu (JP); Hiroaki Kokubo, Higashimurayama (JP); Hisashi Takahashi, Sagamihara (JP)

(73) Assignee: Xanavi Informatics Corporation, Kanagawa-ken (JP)

( * ) Notice: Subject to any disclaimer, the term of this patent is extended or adjusted under 35 U.S.C. 154(b) by 335 days.

(21) Appl. No.: 12/368,520

(22) Filed: Feb. 10, 2009

(65) Prior Publication Data

US 2009/0234847 A1 Sep. 17, 2009

(30) Foreign Application Priority Data

Mar. 11, 2008 (JP) ................................ 2008-061013

(51) Int. Cl.
*G06F 7/00* (2006.01)
*G06F 17/30* (2006.01)

(52) U.S. Cl. ........ 707/723; 707/748; 707/752; 701/213; 704/746; 704/751

(58) Field of Classification Search ........................ None
See application file for complete search history.

(56) References Cited

U.S. PATENT DOCUMENTS 7,590,538 B2 * 9/2009 St. John ........................ 704/246
2003/0074136 A1 * 4/2003 Hancock et al. .............. 701/213
2003/0078777 A1 * 4/2003 Shiau ............................ 704/251
2004/0215458 A1 * 10/2004 Kobayashi et al. ........... 704/251
2006/0167935 A1 * 7/2006 Atarashi et al. ............ 707/104.1
2008/0167813 A1 * 7/2008 Geelen et al. ................. 701/213
2008/0250014 A1 * 10/2008 Ishizaki ............................ 707/5
2011/0125403 A1 * 5/2011 Smith .......................... 701/213

FOREIGN PATENT DOCUMENTS

JP 04-235599 5/1992
JP 2002-107173 4/2002
JP 2004-234421 8/2004
JP 2006-023572 1/2006
JP 2006-202159 8/2006
JP 2008-134502 6/2008

* cited by examiner

*Primary Examiner* — Pierre Vital
*Assistant Examiner* — Loan T Nguyen
(74) *Attorney, Agent, or Firm* — Antonelli, Terry, Stout & Kraus, LLP.

(57) ABSTRACT

Provided is an information retrieval method including: retrieving, by a computer, a name including input characters from a database for storing the name, an attribute word associated with the name, and a degree of relevance between the name and the attribute word; outputting the retrieved name as a candidate name; and extracting an attribute word associated with the candidate name, the extracting including: calculating a degree of independency indicating a degree of difference between the extracted attribute words, a degree of coverage indicating an extent to which the combination of the extracted attribute words covers the candidate names, and a degree of equality of a number of corresponding candidate names for each attribute word; and calculating a score of the combination of the attribute words based on at least one of the independency, the coverage and the equality to output the combinations of the attribute words to an output unit.

20 Claims, 52 Drawing Sheets

8a

| ID (3010) | POI NAME (3020) | ADDRESS (3040) | TELEPHONE NUMBER (3050) | LATITUDE, LONGUITUDE (3060) | MAIN CATEGORY (3070) | SUB CATEGORY (3080) |
|---|---|---|---|---|---|---|
| 1001000001 | HOKKAIDO OFFICE | HOKKAIDO, SAPPORO· · · | | | PUBLIC INSTITUTION | PREFECTURE INSTITUTION |
| 1001000002 | SAPPORO CITY HALL | HOKKAIDO, SAPPORO· · · | | | PUBLIC INSTITUTION | CITY HALL |
| · · · | · · · | · · · | | | · · · | · · · |
| 1011245631 | MISATSU CITY HOSPITAL | SAITAMA, MISATSU· · · | | | HOSPITAL | GENERAL HOSPITAL |
| 1011245632 | JA MISATSU CANAL | SAITAMA, MISATSU· · · | | | COOPERATIVE | FARMER'S COOPERATIVE |
| 1011245633 | ANGEL PRESCHOOL | SAITAMA, MISATSU· · · | · · · | | CHILDREN'S FACILITY | PRESCHOOL |
| 1011245634 | COOP MISATSU | SAITAMA, MISATSU· · · | | | COOPERATIVE | CUSTOMER'S COOPERATIVE |
| · · · | · · · | · · · | | | · · · | · · · |
| 1012297545 | TOZAI DENDEN LAND | CHIBA, DENYASU· · · | | | THEME PARK | AMUSEMENT GROUND |
| 1012297546 | TOZAI DENDEN LAND HOTEL | CHIBA, DENYASU· · · | | | ACCOMMODATION FACILITY | HOTEL |
| · · · | · · · | · · · | | | · · · | · · · |
| 1047678125 | NAHA WHOLESALE MARKET | OKINAWA, NAHA· · · | | | PUBLIC INSTITUTION | PREFECTURE INSTITUTION |
| 1047678126 | RAMEN TETESONU | OKINAWA, NAHA· · · | | | RESTAURANT | CHINESE NOODLE |

| ID | POI NAME | ATTRIBUTE WORD | | | | | | | | | | | |
|---|---|---|---|---|---|---|---|---|---|---|---|---|---|
| | | PUBLIC INSTITUSION | CITY HALL | PREFECTURE OFFICE | HOS-PITAL | CO-OPERATIVE | SHOPP-ING | LEI-SURE | AMUSEMENT GROUND | ACCOMMODATION FACILITY | PRE-SCHOOL | CHINESE NOODLE | ... |
| 1001000001 | HOKKAIDO OFFICE | 0.95 | 0 | 1 | 0 | 0 | 0 | 0 | 0 | 0 | 0 | 0 | ... |
| 1001000002 | SAPPORO CITY HALL | 0.95 | 1 | 0 | 0 | 0 | 0 | 0 | 0 | 0 | 0 | 0 | ... |
| ... | | | | | | | | | | | | | ... |
| 1011245631 | MISATSU CITY HOSPITAL | 0.7 | 0 | 0 | 1 | 0 | 0 | 0 | 0 | 0 | 0 | 0 | ... |
| 1011245632 | JA MISATSU CANAL | 0.2 | 0 | 0 | 0 | 0.8 | 0 | 0 | 0 | 0 | 0 | 0 | ... |
| 1011245633 | ANGEL PRESCHOOL | 0.05 | 0 | 0 | 0 | 0 | 0 | 0 | 0 | 0 | 1 | 0 | ... |
| 1011245634 | COOP MISATSU | 0 | 0 | 0 | 0 | 0.6 | 0.9 | 0 | 0 | 0 | 0 | 0 | ... |
| ... | | | | | | | | | | | | | ... |
| 1012297545 | TOZAI DENDEN LAND | 0 | 0 | 0 | 0 | 0 | 0 | 0.9 | 1 | 0.1 | 0 | 0 | ... |
| 1012297546 | TOZAI DENDEN LAND HOTEL | 0 | 0 | 0 | 0 | 0 | 0 | 0.8 | 0.7 | 1 | 0 | 0 | ... |
| ... | | | | | | | | | | | | | ... |
| 1047678125 | NAHA WHOLESALE MARKET | 0.2 | 0 | 0 | 0 | 0 | 0.6 | 0 | 0 | 0 | 0 | 0 | ... |
| 1047678126 | RAMEN TETESONU | 0 | 0 | 0 | 0 | 0 | 0 | 0.1 | 0 | 0 | 0 | 1 | ... |

| POI NAME CANDIDATE / ATTRIBUTE WORD | HOSPITAL | PET | COOPERATIVE | MONETARY FACILITY | SHOPPING | SUPERMARKET | CAR | LEISURE | ACCOMMODATION FACILITY | CATTERY/KENNEL | DENTAL OFFICE | GENERAL HOSPITAL | INTERCHANGE | SPA | PUBLIC INSTITUTION | POST OFFICE |
|---|---|---|---|---|---|---|---|---|---|---|---|---|---|---|---|---|
| MISATSU CITY HOSPITAL | 1 | 0 | 0 | 0 | 0 | 0 | 0 | 0 | 0 | 0 | 0.8 | 1 | 0 | 0 | 0.7 | 0 |
| MISATSU ANIMAL HOSPITAL | 0.6 | 1 | 0 | 0 | 0 | 0 | 0 | 0 | 0 | 0.7 | 0 | 0.05 | 0 | 0 | 0 | 0 |
| JA MISATSU CANAL | 0 | 0 | 0.8 | 0.95 | 0 | 0 | 0 | 0 | 0 | 0 | 0 | 0 | 0 | 0 | 0.2 | 0 |
| COOP MISATSU | 0 | 0 | 0.6 | 0 | 0.9 | 1 | 0 | 0 | 0 | 0 | 0 | 0 | 0 | 0 | 0 | 0 |
| MISATSU CAR-DEALER | 0 | 0 | 0 | 0 | 0.9 | 0 | 0.95 | 0 | 0 | 0 | 0 | 0 | 0 | 0 | 0 | 0 |
| MISATSU INTERCHANGE | 0 | 0 | 0 | 0 | 0 | 0 | 0.8 | 0 | 0 | 0 | 0 | 0 | 1 | 0 | 0 | 0 |
| DOG AND CAT PARK MISATSU | 0 | 0.8 | 0 | 0 | 0 | 0 | 0 | 0.8 | 0 | 0 | 0 | 0 | 0 | 0 | 0 | 0 |
| CATTERY, KENNEL MISATSU | 0 | 1 | 0 | 0 | 0 | 0 | 0 | 0 | 0.4 | 1 | 0 | 0 | 0 | 0 | 0 | 0 |
| MISATSU CS HOTEL | 0 | 0 | 0 | 0 | 0 | 0 | 0 | 0.8 | 1 | 0 | 0 | 0 | 0 | 0 | 0 | 0 |
| MISATSU CANAL DENTAL CLINIC | 1 | 0 | 0 | 0 | 0 | 0 | 0 | 0 | 0 | 0 | 1 | 0.1 | 0 | 0 | 0 | 0 |
| MISATSU CITY CAMPSITE | 0 | 0 | 0 | 0 | 0 | 0 | 0 | 0.95 | 0.1 | 0 | 0 | 0 | 0 | 0 | 0 | 0 |
| MISATSU CIVIC SPA RESORT | 0 | 0 | 0 | 0 | 0 | 0 | 0 | 0.9 | 0.9 | 0 | 0 | 0 | 0 | 0.9 | 0.5 | 0 |
| MISATSU CANAL POST OFFICE | 0 | 0 | 0 | 0.6 | 0 | 0 | 0 | 0 | 0 | 0 | 0 | 0 | 0 | 0 | 0.9 | 1 |

EXAMPLE OF HIGH DEGREE OF INDEPENDENCY

| POI NAME CANDIDATE | ATTRIBUTE WORD | | | $C_{IND}$ |
|---|---|---|---|---|
| | SHOPPOING | LEISURE | PUBLIC INSTITUTE | |
| MISATSU CITY HOSPITAL | 0 | 0 | 0.7 | 0 |
| MISATSU ANIMAL HOSPITAL | 0 | 0 | 0 | 0 |
| JA MISATSU CANAL | 0 | 0 | 0.2 | 0 |
| COOP MISATSU | 0.9 | 0 | 0 | 0 |
| MISATSU CAR-DEALER | 0.9 | 0 | 0 | 0 |
| MISATSU INTERCHANGE | 0 | 0 | 0 | 0 |
| DOG AND CAT PARK MISATSU | 0 | 0.8 | 0 | 0 |
| CATTERY, KENNEL MISATSU | 0 | 0 | 0 | 0 |
| MISATSU CS HOTEL | 0 | 0.8 | 0 | 0 |
| MISATSU CANAL DENTAL CLINIC | 0 | 0 | 0 | 0 |
| MISATSU CITY CAMPSITE | 0 | 0.95 | 0 | 0 |
| MISATSU CIVIC SPA RESORT | 0 | 0.9 | 0.5 | 1 |
| MISATSU CANAL POST OFFICE | 0 | 0 | 0.9 | 0 |
| | | | SUM OF $C_{IND}$ | 1 |
| | | | DEGREE OF INDEPENDENCY($p_{IND}$) | 0.923 |

EXAMPLE OF LOW DEGREE OF INDEPENDENCY

| POI NAME CANDIDATE | ATTRIBUTE WORD | | | $C_{IND}$ |
|---|---|---|---|---|
| | HOSPITAL | DENTAL OFFICE | GENERAL HOSPITAL | |
| MISATSU CITY HOSPITAL | 1 | 0.8 | 1 | 2 |
| MISATSU ANIMAL HOSPITAL | 0.6 | 0 | 0.05 | 1 |
| JA MISATSU CANAL | 0 | 0 | 0 | 0 |
| COOP MISATSU | 0 | 0 | 0 | 0 |
| MISATSU CAR-DEALER | 0 | 0 | 0 | 0 |
| MISATSU INTERCHANGE | 0 | 0 | 0 | 0 |
| DOG AND CAT PARK MISATSU | 0 | 0 | 0 | 0 |
| CATTERY, KENNEL MISATSU | 0 | 0 | 0 | 0 |
| MISATSU CS HOTEL | 0 | 0 | 0 | 0 |
| MISATSU CANAL DENTAL CLINIC | 1 | 1 | 0.1 | 2 |
| MISATSU CITY CAMPSITE | 0 | 0 | 0 | 0 |
| MISATSU CIVIC SPA RESORT | 0 | 0 | 0 | 0 |
| MISATSU CANAL POST OFFICE | 0 | 0 | 0 | 0 |
| | | | SUM OF $C_{IND}$ | 5 |
| | | | DEGREE OF INDEPENDENCY($p_{IND}$) | 0.615 |

EXAMPLE OF HIGH DEGREE OF COVERAGE

| POI NAME CANDIDATE | ATTRIBUTE WORD: HOSPITAL | ATTRIBUTE WORD: ACCOMMODATION FACILITY | ATTRIBUTE WORD: PUBLIC INSTITUTION | $C_{EXH}$ |
|---|---|---|---|---|
| MISATSU CITY HOSPITAL | 1 | 0 | 0.7 | 1 |
| MISATSU ANIMAL HOSPITAL | 0.6 | 0 | 0 | 1 |
| JA MISATSU CANAL | 0 | 0 | 0.2 | 1 |
| COOP MISATSU | 0 | 0 | 0 | 0 |
| MISATSU CAR-DEALER | 0 | 0 | 0 | 0 |
| MISATSU INTERCHANGE | 0 | 0 | 0 | 0 |
| DOG AND CAT PARK MISATSU | 0 | 0 | 0 | 0 |
| CATTERY, KENNEL MISATSU | 0 | 0.4 | 0 | 1 |
| MISATSU CS HOTEL | 0 | 1 | 0 | 1 |
| MISATSU CANAL DENTAL CLINIC | 1 | 0 | 0 | 1 |
| MISATSU CITY CAMPSITE | 0 | 0.1 | 0 | 1 |
| MISATSU CIVIC SPA RESORT | 0 | 0.9 | 0.5 | 1 |
| MISATSU CANAL POST OFFICE | 0 | 0 | 0.9 | 1 |
| | | | SUM OF $C_{EXH}$ | 9 |
| | | | DEGREE OF COVERAGE($p_{EXH}$) | 0.692 |

7010 (SUM OF $C_{EXH}$)
7020 (DEGREE OF COVERAGE)

*FIG. 8A*

EXAMPLE OF LOW DEGREE OF COVERAGE

| POI NAME CANDIDATE | ATTRIBUTE WORD: COOPERATIVE | ATTRIBUTE WORD: SUPER-MARKET | ATTRIBUTE WORD: POST OFFICE | $C_{EXH}$ |
|---|---|---|---|---|
| MISATSU CITY HOSPITAL | 0 | 0 | 0 | 0 |
| MISATSU ANIMAL HOSPITAL | 0 | 0 | 0 | 0 |
| JA MISATSU CANAL | 0.8 | 0 | 0 | 1 |
| COOP MISATSU | 0.6 | 1 | 0 | 1 |
| MISATSU CAR-DEALER | 0 | 0 | 0 | 0 |
| MISATSU INTERCHANGE | 0 | 0 | 0 | 0 |
| DOG AND CAT PARK MISATSU | 0 | 0 | 0 | 0 |
| CATTERY, KENNEL MISATSU | 0 | 0 | 0 | 0 |
| MISATSU CS HOTEL | 0 | 0 | 0 | 0 |
| MISATSU CANAL DENTAL CLINIC | 0 | 0 | 0 | 0 |
| MISATSU CITY CAMPSITE | 0 | 0 | 0 | 0 |
| MISATSU CIVIC SPA RESORT | 0 | 0 | 0 | 0 |
| MISATSU CANAL POST OFFICE | 0 | 0 | 1 | 1 |
| | | | SUM OF $C_{EXH}$ | 3 |
| | | | DEGREE OF COVERAGE($p_{EXH}$) | 0.231 |

7030 (SUM OF $C_{EXH}$)
7040 (DEGREE OF COVERAGE)

*FIG. 8B*

EXAMPLE OF HIGH DEGREE OF EQUALITY

| POI NAME CANDIDATE | ATTRIBUTE WORD: PET | CAR | DENTAL OFFICE |
|---|---|---|---|
| MISATSU CITY HOSPITAL | 0 | 0 | 0.8 |
| MISATSU ANIMAL HOSPITAL | 1 | 0 | 0 |
| JA MISATSU CANAL | 0 | 0 | 0 |
| COOP MISATSU | 0 | 0 | 0 |
| MISATSU CAR-DEALER | 0 | 0.95 | 0 |
| MISATSU INTERCHANGE | 0 | 0.8 | 0 |
| DOG AND CAT PARK MISATSU | 0.8 | 0 | 0 |
| CATTERY, KENNEL MISATSU | 1 | 0 | 0 |
| MISATSU CS HOTEL | 0 | 0 | 0 |
| MISATSU CANAL DENTAL CLINIC | 0 | 0 | 1 |
| MISATSU CITY CAMPSITE | 0 | 0 | 0 |
| MISATSU CIVIC SPA RESORT | 0 | 0 | 0 |
| MISATSU CANAL POST OFFICE | 0 | 0 | 0 |
| $D_{EQU}$ | 3 | 2 | 2 |
| | STANDARD DEVIATION OF $D_{EQU}$ | | 0.471 |
| | DEGREE OF EQUALITY($p_{EQU}$) | | 0.964 |

EXAMPLE OF LOW DEGREE OF EQUALITY

| POI NAME CANDIDATE | ATTRIBUTE WORD: ACCOMMODATION FACILITY | SPA | POST OFFICE |
|---|---|---|---|
| MISATSU CITY HOSPITAL | 0 | 0 | 0 |
| MISATSU ANIMAL HOSPITAL | 0 | 0 | 0 |
| JA MISATSU CANAL | 0 | 0 | 0 |
| COOP MISATSU | 0 | 0 | 0 |
| MISATSU CAR-DEALER | 0 | 0 | 0 |
| MISATSU INTERCHANGE | 0 | 0 | 0 |
| DOG AND CAT PARK MISATSU | 0 | 0 | 0 |
| CATTERY, KENNEL MISATSU | 0.4 | 0 | 0 |
| MISATSU CS HOTEL | 1 | 0 | 0 |
| MISATSU CANAL DENTAL CLINIC | 0 | 0 | 0 |
| MISATSU CITY CAMPSITE | 0.1 | 0 | 0 |
| MISATSU CIVIC SPA RESORT | 0.9 | 0.9 | 0 |
| MISATSU CANAL POST OFFICE | 0 | 0 | 0 |
| $D_{EQU}$ | 4 | 1 | 1 |
| | STANDARD DEVIATION OF $D_{EQU}$ | | 1.414 |
| | DEGREE OF EQUALITY($p_{EQU}$) | | 0.891 |

EXAMPLE OF HIGH DEGREE OF UNDERSTANDABILITY

| POI NAME CANDIDATE | ATTRIBUTE WORD | | |
|---|---|---|---|
| | SUPERMARKET | LEISURE | POST OFFICE |
| MISATSU CITY HOSPITAL | 0 | 0 | 0 |
| MISATSU ANIMAL HOSPITAL | 0 | 0 | 0 |
| JA MISATSU CANAL | 0 | 0 | 0 |
| COOP MISATSU | 1 | 0 | 0 |
| MISATSU CAR-DEALER | 0 | 0 | 0 |
| MISATSU INTERCHANGE | 0 | 0 | 0 |
| DOG AND CAT PARK MISATSU | 0 | 0.8 | 0 |
| CATTERY, KENNEL MISATSU | 0 | 0 | 0 |
| MISATSU CS HOTEL | 0 | 0.8 | 0 |
| MISATSU CANAL DENTAL CLINIC | 0 | 0 | 0 |
| MISATSU CITY CAMPSITE | 0 | 0.95 | 0 |
| MISATSU CIVIC SPA RESORT | 0 | 0.9 | 0 |
| MISATSU CANAL POST OFFICE | 0 | 0 | 1 |
| $D_{EAS}$ | 1.000 | 0.863 | 1.000 |
| | DEGREE OF UNDERSTANDABILITY($p_{EAS}$) | | 0.954 |

EXAMPLE OF LOW DEGREE OF UNDERSTANDABILITY

| POI NAME CANDIDATE | ATTRIBUTE WORD | | |
|---|---|---|---|
| | CAR | ACCOMMODATION | PUBLIC INSTITUTION |
| MISATSU CITY HOSPITAL | 0 | 0 | 0.7 |
| MISATSU ANIMAL HOSPITAL | 0 | 0 | 0 |
| JA MISATSU CANAL | 0 | 0 | 0.2 |
| COOP MISATSU | 0 | 0 | 0 |
| MISATSU CAR-DEALER | 0.95 | 0 | 0 |
| MISATSU INTERCHANGE | 0.8 | 0 | 0 |
| DOG AND CAT PARK MISATSU | 0 | 0 | 0 |
| CATTERY, KENNEL MISATSU | 0 | 0.4 | 0 |
| MISATSU CS HOTEL | 0 | 1 | 0 |
| MISATSU CANAL DENTAL CLINIC | 0 | 0 | 0 |
| MISATSU CITY CAMPSITE | 0 | 0.1 | 0 |
| MISATSU CIVIC SPA RESORT | 0 | 0.9 | 0.5 |
| MISATSU CANAL POST OFFICE | 0 | 0 | 0.9 |
| $D_{EAS}$ | 0.875 | 0.600 | 0.575 |
| | DEGREE OF UNDERSTANDABILITY($p_{EAS}$) | | 0.683 |

| COMBINATION OF ATTRIBUTE WORDS | DEGREE OF INDEPENDENCY $p_{IND}$ | DEGREE OF COVERAGE $p_{EXH}$ | DEGREE OF EQUALITY $p_{EQU}$ | DEGREE OF UNDERSTANDABILITY $p_{EAS}$ | SCORE S |
|---|---|---|---|---|---|
| HOSPITAL, SHOPPING, LEISURE | 1.000 | 0.692 | 0.937 | 0.876 | 4.575 |
| HOSPITAL, CAR, LEISURE | 1.000 | 0.692 | 0.937 | 0.868 | 4.558 |
| HOSPITAL, MONETARY FACILITY, LEISURE | 1.000 | 0.692 | 0.937 | 0.835 | 4.491 |
| HOSPITAL, SUPERMARKET, LEISURE | 1.000 | 0.615 | 0.904 | 0.910 | 4.454 |
| | | ⋮ | | | |
| CATTERY/KENNEL, DENTAL OFFICE, GENERAL HOSPITAL | 0.769 | 0.308 | 0.964 | 0.711 | 3.386 |
| HOSPITAL, GENERAL HOSPITAL, SPA | 0.769 | 0.308 | 0.927 | 0.717 | 3.361 |
| HOSPITAL, CATTERY/KENNEL, GENERAL HOSPITAL | 0.692 | 0.308 | 0.964 | 0.700 | 3.325 |
| HOSPITAL, DENTAL OFFICE, GENERAL HOSPITAL | 0.615 | 0.231 | 0.964 | 0.717 | 3.166 |

WEIGHT $w_{IND} = 0.5$
$w_{EXH} = 2.0$
$w_{EQU} = 1.0$
$w_{EAS} = 2.0$

| POI NAME CANDIDATE \ ATTRIBUTE WORD | PET | ACCOMMODATOIN FACILITY | SPA | PUBLIC INSTITUTION |
|---|---|---|---|---|
| DOG AND CAT PARK MISATSU | 0.8 | 0 | 0 | 0 |
| MISATSU CS HOTEL | 0 | 1 | 0 | 0 |
| MISATSU CITY CAMPSITE | 0 | 0.1 | 0 | 0 |
| MISATSU CIVIC SPA RESORT | 0 | 0.9 | 0.9 | 0.5 |

| ATTRIBUTE WORD / POI NAME CANDIDATE | HOSPITAL | COOPERATIVE | MONETARY FACILITY | SHOPPING | CAR | LEISURE | ACCOMMODATION FACILITY | DENTAL OFFICE | GENERAL HOSPITAL | SPA | PUBLIC INSTITUTION | POST OFFICE |
|---|---|---|---|---|---|---|---|---|---|---|---|---|
| MISATSU CITY HOSPITAL | 1 | 0 | 0 | 0 | 0 | 0 | 0 | 0.8 | 1 | 0 | 0.7 | 0 |
| JA MISATSU CANAL | 0 | 0.8 | 0.95 | 0 | 0 | 0 | 0 | 0 | 0 | 0 | 0.2 | 0 |
| MISATSU CAR-DEALER | 0 | 0 | 0 | 0.9 | 0.95 | 0 | 0 | 0 | 0 | 0 | 0 | 0 |
| MISATSU CS HOTEL | 0 | 0 | 0 | 0 | 0 | 0.8 | 1 | 0 | 0 | 0 | 0 | 0 |
| MISATSU CANAL DENTAL CLINIC | 1 | 0 | 0 | 0 | 0 | 0 | 0 | 1 | 0.1 | 0 | 0 | 0 |
| MISATSU CITY CAMPSITE | 0 | 0 | 0 | 0 | 0 | 0.95 | 0.1 | 0 | 0 | 0 | 0 | 0 |
| MISATSU CIVIC SPA RESORT | 0 | 0 | 0 | 0 | 0 | 0.9 | 0.9 | 0 | 0 | 0.9 | 0.5 | 0 |
| MISATSU CANAL POST OFFICE | 0 | 0 | 0.6 | 0 | 0 | 0 | 0 | 0 | 0 | 0 | 0.9 | 1 |

SEARCH BY POI NAME

MISATSUC

| A | B | C | D | E | F | G |
|---|---|---|---|---|---|---|
| H | I | J | ... | | | |
| | | | | | | |
| | | | | | | |
| | | | | | | |

SELECT CATEGORY

HOSPITAL (2)

MONETARY FACILITY (2) ⎬ 2040

LEISURE (3)

SEARCH (8)

16020

| ID | POI NAME | ATTRIBUTE WORD(MORPHEME) | | | | | | | | | | | | |
|---|---|---|---|---|---|---|---|---|---|---|---|---|---|---|
| | | HOKKAIDO | RAMEN | CITY HALL | MISATSU | CANAL | HOSPITAL | HOTEL | ANGEL | NAHA | TOZAI | DENDEN | LAND | ··· |
| 1001000001 | HOKKAIDO OFFICE | 1 | 0 | 0 | 0 | 0 | 0 | 0 | 0 | 0 | 0 | 0 | 0 | ··· |
| 1001000002 | SAPPORO CITY HALL | 0 | 0 | 1 | 0 | 0 | 0 | 0 | 0 | 0 | 0 | 0 | 0 | ··· |
| ··· | | | | | | | | | | | | | | ··· |
| 1011245631 | MISATSU CITY HOSPITAL | 0 | 0 | 0 | 1 | 0 | 1 | 0 | 0 | 0 | 0 | 0 | 0 | ··· |
| 1011245632 | JA MISATSU CANAL | 0 | 0 | 0 | 1 | 0.9 | 0 | 0 | 0 | 0 | 0 | 0 | 0 | ··· |
| 1011245633 | ANGEL PRESCHOOL | 0 | 0 | 0 | 0 | 0 | 0 | 0 | 1 | 0 | 0 | 0 | 0 | ··· |
| 1011245634 | COOP MISATSU | | | | | | | | | | | | | ··· |
| ··· | | | | | | | | | | | | | | ··· |
| 1012297545 | TOZAI DENDEN LAND | 0 | 0 | 0 | 0 | 0 | 0 | 0 | 0 | 0 | 0.9 | 1 | 0.9 | ··· |
| 1012297546 | TOZAI DENDEN LAND HOTEL | 0 | 0 | 0 | 0 | 0 | 0 | 0 | 0 | 0 | 0.9 | 0.95 | 0.8 | ··· |
| ··· | | | | | | | | | | | | | | ··· |
| 1047678125 | NAHA WHOLESALE MARKET | 0 | 0 | 0 | 0 | 0 | 0 | 0 | 0 | 0 | 0 | 0 | 0 | ··· |
| 1047678126 | RAMEN TETESONU | 0 | 1 | 0 | 0 | 0 | 0 | 0 | 0 | 0 | 0 | 0 | 0 | ··· |

| POI NAME CANDIDATE (MORPHEME) | MORPHEME | | | | | | | | | | | | | | | | | |
|---|---|---|---|---|---|---|---|---|---|---|---|---|---|---|---|---|---|---|
| | DEJIMA | DENRYOKU | DESIGN | SCHOOL | CLINIC | CENTER | DEALER | DIGITAL | DENDEN | LAND | SOU | RESORT | FUJISAWA | NINOMIYA | YOKOSUKA | HOSPITAL | YOTSUBISHI | ... |
| ALADDIN / RENT-A-CAR / CORPORATION / TOZAI / DEJIMA / OFFICE | 0.9 | 0 | 0 | 0 | 0 | 0 | 0 | 0 | 0 | 0 | 0 | 0 | 0 | 0 | 0 | 0 | 0 | |
| TOZAI / DATA / VIEW | 0 | 0 | 0 | 0 | 0 | 0 | 0 | 0 | 0 | 0 | 0 | 0 | 0 | 0 | 0 | 0 | 0 | |
| VIEW / HOTEL / TOZAI / DEJIMA | 0.9 | 0 | 0 | 0 | 0 | 0 | 0 | 0 | 0 | 0 | 0 | 0 | 0 | 0 | 0 | 0 | 0 | |
| IRYOHOUJIN / KENKOKAI / TOZAI / DEJIMA / CLINIC | 0.9 | 0 | 0 | 0 | 1 | 0 | 0 | 0 | 0 | 0 | 0 | 0 | 0 | 0 | 0 | 0 | 0 | |
| SHIRITSU / TOZAI DESIGN / UNIVERSITY / TOKYO / FUZOKU / HIGH / SCHOOL | 0 | 0 | 1 | 0.8 | 0 | 0 | 0 | 0 | 0 | 0 | 0 | 0 | 0 | 0 | 0 | 0 | 0 | |
| SHIN / TOZAI / DENNETSU / CORPORATION | 0 | 0 | 0 | 0 | 0 | 0 | 0 | 0 | 0 | 0 | 0 | 0 | 0 | 0 | 0 | 0 | 0 | |
| TOZAI / DESIGN / RESEARCH | 0 | 0 | 1 | 0 | 0 | 0 | 0 | 0 | 0 | 0 | 0 | 0 | 0 | 0 | 0 | 0 | 0 | |
| TOZAI / DESIGN / UNIVERSITY / TOKYO / CAMPUS | 0 | 0 | 1 | 0 | 0 | 0 | 0 | 0 | 0 | 0 | 0 | 0 | 0 | 0 | 0 | 0 | 0 | |
| TOZAI / DEGITAL / CORPORATION | 0 | 0 | 0 | 0 | 0 | 0 | 0 | 1 | 0 | 0 | 0 | 0 | 0 | 0 | 0 | 0 | 0 | |
| TOZAI / DIGITAL / TECHNICAL / SCHOOL | 0 | 0 | 0 | 0.9 | 0 | 0 | 0 | 1 | 0 | 0 | 0 | 0 | 0 | 0 | 0 | 0 | 0 | |
| TOZAI / DENDEN / LAND | 0 | 0 | 0 | 0 | 0 | 0 | 0 | 0 | 1 | 0.9 | 0 | 0 | 0 | 0 | 0 | 0 | 0 | |
| TOZAI / DENDEN / LAND / HOTEL | 0 | 0 | 0 | 0 | 0 | 0 | 0 | 0 | 0.95 | 0.8 | 0 | 0 | 0 | 0 | 0 | 0 | 0 | |
| TOZAI / DETOX / SERVICE / CORPORATOIN | 0 | 0 | 0 | 0 | 0 | 0 | 0 | 0 | 0 | 0 | 0 | 0 | 0 | 0 | 0 | 0 | 0 | |
| TOZAI / DEALER / KOGANEI / SHOP | 0 | 0 | 0 | 0 | 0 | 0 | 1 | 0 | 0 | 0 | 0 | 0 | 0 | 0 | 0 | 0 | 0 | |
| TOZAI / DEALER / HACHIOJI / SHOP | 0 | 0 | 0 | 0 | 0 | 0 | 1 | 0 | 0 | 0 | 0 | 0 | 0 | 0 | 0 | 0 | 0 | |
| TOZAI / DENTAL / CLINIC | 0 | 0 | 0 | 0 | 0.95 | 0 | 0 | 0 | 0 | 0 | 0 | 0 | 0 | 0 | 0 | 0 | 0 | |
| TOZAI DENTAL / SEMINAR / HOUSE | 0 | 0 | 0 | 0 | 0 | 0 | 0 | 0 | 0 | 0 | 0 | 0 | 0 | 0 | 0 | 0 | 0 | |
| TOZAI / DEJIMA / POLICE / OFFICE | 1 | 0 | 0 | 0 | 0 | 0 | 0 | 0 | 0 | 0 | 0 | 0 | 0 | 0 | 0 | 0 | 0 | |
| TOZAI / DEJIMA / LAWYER / OFFICE | 1 | 0 | 0 | 0 | 0 | 0 | 0 | 0 | 0 | 0 | 0 | 0 | 0 | 0 | 0 | 0 | 0 | |
| TOZAI / DISC | 0 | 0 | 0 | 0 | 0 | 0 | 0 | 0 | 0 | 0 | 0 | 0 | 0 | 0 | 0 | 0 | 0 | |
| TOZAI / DENSHI / TECHNICAL / SCHOOL | 0 | 0 | 0 | 0.9 | 0 | 0 | 0 | 0 | 0 | 0 | 0 | 0 | 0 | 0 | 0 | 0 | 0 | |
| TOZAI / DENNO / SHA | 0 | 0 | 0 | 0 | 0 | 0 | 0 | 0 | 0 | 0 | 0 | 0 | 0 | 0 | 0 | 0 | 0 | |
| TOZAI / DENRYOKU / TENJI / KAN | 0 | 1 | 0 | 0 | 0 | 0 | 0 | 0 | 0 | 0 | 0 | 0 | 0 | 0 | 0 | 0 | 0 | |
| TOZAI / DENRYOKU / HOSPITAL | 0 | 1 | 0 | 0 | 0 | 0 | 0 | 0 | 0 | 0 | 0 | 0 | 0 | 0 | 0 | 1 | 0 | |
| TOZAI / DENRYOKU / RESORT / FUJISAWA / SOU | 0 | 0.95 | 0 | 0 | 0 | 0 | 0 | 0 | 0 | 0 | 0.4 | 0.7 | 0.8 | 0 | 0 | 0 | 0 | |
| TOZAI / DENRYOKU / RESORT / NINOMIYA /SOU | 0 | 0.95 | 0 | 0 | 0 | 0 | 0 | 0 | 0 | 0 | 0.4 | 0.7 | 0 | 0.8 | 0 | 0 | 0 | |
| TOZAI / DENRYOKU / RESORT / YOKOSUKA / SOU | 0 | 0.95 | 0 | 0 | 0 | 0 | 0 | 0 | 0 | 0 | 0.4 | 0.7 | 0 | 0 | 0.8 | 0 | 0 | |
| TOZAI / DENRYOKU / TRAINING / CENTER | 0 | 0.95 | 0 | 0 | 0 | 0.9 | 0 | 0 | 0 | 0 | 0 | 0 | 0 | 0 | 0 | 0 | 0 | |
| YOTSUBISHI / BANK / TOZAI / DENRYOKU / MAE / BRANCH / OFFICE | 0 | 0.6 | 0 | 0 | 0 | 0 | 0 | 0 | 0 | 0 | 0 | 0 | 0 | 0 | 0 | 0 | 0.95 | |
| HIMACHI / CORPORATION / TOZAI / DENDO / KOGU / CENTER | 0 | 0 | 0 | 0 | 0 | 0.8 | 0 | 0 | 0 | 0 | 0 | 0 | 0 | 0 | 0 | 0 | 0 | |
| HOSEKI / CENTER / TOZAI / DEJIMA / SHOP | 0.6 | 0 | 0 | 0 | 0 | 0.95 | 0 | 0 | 0 | 0 | 0 | 0 | 0 | 0 | 0 | 0 | 0 | |

| COMBINATION OF MORPHEME | DEGREE OF INDEPENDENCY $p_{IND}$ | DEGREE OF COVERAGE $p_{EXH}$ | DEGREE OF EQUALITY $p_{EQU}$ | DEGREE OF UNDERSTANDABILITY $p_{EAS}$ | SCORE S |
|---|---|---|---|---|---|
| DEJIMA, DENRYOKU, DESIGN | 1.000 | 0.516 | 0.945 | 0.933 | 4.343 |
| DEJIMA, DENRYOKU, DEALER | 1.000 | 0.484 | 0.930 | 0.933 | 4.263 |
| DEJIMA, DENRYOKU, DIGITAL | 1.000 | 0.484 | 0.930 | 0.933 | 4.263 |
| DEJIMA, DENRYOKU, UNIVERSITY | 1.000 | 0.484 | 0.930 | 0.933 | 4.263 |
| | | ⋮ | | | |
| SOU, RESORT, KOGANEI | 0.903 | 0.129 | 0.970 | 0.567 | 2.813 |
| SOU, RESORT, SHIN | 0.903 | 0.129 | 0.970 | 0.567 | 2.813 |
| SOU, RESORT, DENDO | 0.903 | 0.129 | 0.970 | 0.567 | 2.813 |
| SOU, RESORT, HACHIOJI | 0.903 | 0.129 | 0.970 | 0.567 | 2.813 |

18020

WEIGHT $w_{IND} = 0.5$ $w_{EXH} = 2.0$ $w_{EQU} = 1.0$ $w_{EAS} = 2.0$

| ATTRIBUTE WORD (MORPHEME) / POI NAME CANDIDATE | CENTER | SOU | RESORT | TENJI | FUJISAWA | NINOMIYA | YOKOSUKA | HOSPITAL | YOTSUBISHI | BANK | TRAINING |
|---|---|---|---|---|---|---|---|---|---|---|---|
| TOZAI DENRYOKU TENJI KAN | 0 | 0 | 0 | 0.7 | 0 | 0 | 0 | 0 | 0 | 0 | 0 |
| TOZAI DENRYOKU HOSPITAL | 0 | 0 | 0 | 0 | 0 | 0 | 0 | 1 | 0 | 0 | 0 |
| TOZAI DENRYOKU RESORT FUJISAWA SOU | 0 | 0.4 | 0.7 | 0 | 0.8 | 0 | 0 | 0 | 0 | 0 | 0 |
| TOZAI DENRYOKU RESORT NINOMIYA SOU | 0 | 0.4 | 0.7 | 0 | 0 | 0.8 | 0 | 0 | 0 | 0 | 0 |
| TOZAI DENRYOKU RESORT YOKOSUKA SOU | 0 | 0.4 | 0.7 | 0 | 0 | 0 | 0.8 | 0 | 0 | 0 | 0 |
| TOZAI DENRYOKU TRAINING CENTER | 0.9 | 0 | 0 | 0 | 0 | 0 | 0 | 0 | 0 | 0 | 0.9 |
| YOTSUBISHI BANK TOZAI DENRYOKU MAE BRANCH OFFICE | 0 | 0 | 0 | 0 | 0 | 0 | 0 | 0 | 0.95 | 1 | 0 |

*FIG. 21*

| POI NAME CANDIDATE | ATTRIBUTE WORD | | |
|---|---|---|---|
| | ACCOMMODATION FACILITY | PUBLIC INSTITUTION | OTHERWISE |
| MISATSU CITY HOSPITAL | 0 | 0.7 | 0 |
| MISATSU ANIMAL HOSPITAL | 0 | 0 | 1 |
| JA MISATSU CANAL | 0 | 0.2 | 0.8 |
| COOP MISATSU | 0 | 0 | 1 |
| MISATSU CAR-DEALER | 0 | 0 | 1 |
| MISATSU INTERCHANGE | 0 | 0 | 1 |
| DOG AND CAT PARK MISATSU | 0 | 0 | 1 |
| CATTERY, KENNEL MISATSU | 0.4 | 0 | 0.6 |
| MISATSU CS HOTEL | 1 | 0 | 0 |
| MISATSU CANAL DENTAL CLINIC | 0 | 0 | 1 |
| MISATSU CITY CAMPSITE | 0.1 | 0 | 0.9 |
| MISATSU CIVIC SPA RESORT | 0.9 | 0.5 | 0 |
| MISATSU CANAL POST OFFICE | 0 | 0.9 | 0 |

23010

THERESHOLD *T* = 0.5

*FIG. 24*

| POI NAME CANDIDATE | ATTRIBUTE WORD | | | |
|---|---|---|---|---|
| | ACCOMMODATION FACILITY | PUBLIC INSTITUTION | OTHERWISE | $C'_{IND}$ |
| MISATSU CITY HOSPITAL | 0 | 0.7 | 0 | 0 |
| MISATSU ANIMAL HOSPITAL | 0 | 0 | 1 | 0 |
| JA MISATSU CANAL | 0 | 0.2 | 0.8 | 1 |
| COOP MISATSU | 0 | 0 | 1 | 0 |
| MISATSU CAR-DEALER | 0 | 0 | 1 | 0 |
| MISATSU INTERCHANGE | 0 | 0 | 1 | 0 |
| DOG AND CAT PARK MISATSU | 0 | 0 | 1 | 0 |
| CATTERY, KENNEL MISATSU | 0.4 | 0 | 0.6 | 1 |
| MISATSU CS HOTEL | 1 | 0 | 0 | 0 |
| MISATSU CANAL DENTAL CLINIC | 0 | 0 | 1 | 0 |
| MISATSU CITY CAMPSITE | 0.1 | 0 | 0.9 | 1 |
| MISATSU CIVIC SPA RESORT | 0.9 | 0.5 | 0 | 1 |
| MISATSU CANAL POST OFFICE | 0 | 0.9 | 0 | 0 |
| | | | SUM OF $C'_{IND}$ | 4 |
| | | | DEGREE OF INDEPENDENCY($p_{IND}$) | 0.692 |

*FIG. 25*

| POI NAME CANDIDATE | ATTRIBUTE WORD: ACCOMMODATION FACILITY | ATTRIBUTE WORD: PUBLIC INSTITUTION | $C'_{EXH}$ |
|---|---|---|---|
| MISATSU CITY HOSPITAL | 0 | 0.7 | 1 |
| MISATSU ANIMAL HOSPITAL | 0 | 0 | 0 |
| JA MISATSU CANAL | 0 | 0.2 | 1 |
| COOP MISATSU | 0 | 0 | 0 |
| MISATSU CAR-DEALER | 0 | 0 | 0 |
| MISATSU INTERCHANGE | 0 | 0 | 0 |
| DOG AND CAT PARK MISATSU | 0 | 0 | 0 |
| CATTERY, KENNEL MISATSU | 0.4 | 0 | 1 |
| MISATSU CS HOTEL | 1 | 0 | 1 |
| MISATSU CANAL DENTAL CLINIC | 0 | 0 | 0 |
| MISATSU CITY CAMPSITE | 0.1 | 0 | 1 |
| MISATSU CIVIC SPA RESORT | 0.9 | 0.5 | 1 |
| MISATSU CANAL POST OFFICE | 0 | 0.9 | 1 |
| | | SUM OF $C'_{EXH}$ | 7 |
| | | DEGREE OF COVERAGE($p_{EXH}$) | 0.538 |

*FIG. 26*

| POI NAME CANDIDATE | ATTRIBUTE WORD: ACCOMMODATION FACILITY | ATTRIBUTE WORD: PUBLIC INSTITUTION | ATTRIBUTE WORD: OTHERWISE |
|---|---|---|---|
| MISATSU CITY HOSPITAL | 0 | 0.7 | 0 |
| MISATSU ANIMAL HOSPITAL | 0 | 0 | 1 |
| JA MISATSU CANAL | 0 | 0.2 | 0.8 |
| COOP MISATSU | 0 | 0 | 1 |
| MISATSU CAR-DEALER | 0 | 0 | 1 |
| MISATSU INTERCHANGE | 0 | 0 | 1 |
| DOG AND CAT PARK MISATSU | 0 | 0 | 1 |
| CATTERY, KENNEL MISATSU | 0.4 | 0 | 0.6 |
| MISATSU CS HOTEL | 1 | 0 | 0 |
| MISATSU CANAL DENTAL CLINIC | 0 | 0 | 1 |
| MISATSU CITY CAMPSITE | 0.1 | 0 | 0.9 |
| MISATSU CIVIC SPA RESORT | 0.9 | 0.5 | 0 |
| MISATSU CANAL POST OFFICE | 0 | 0.9 | 0 |
| $D'_{EQU}$ | 4 | 4 | 9 |
| | STANDARD DEVIATION OF $D'_{EQU}$ | | 2.357 |
| | DEGREE OF EQUALITY($p_{EQU}$) | | 0.819 |

*FIG. 27*

| POI NAME CANDIDATE | ATTRIBUTE WORD | | |
|---|---|---|---|
| | ACCOMMODATION FACILITY | PUBLIC INSTITUTION | OTHERWISE |
| MISATSU CITY HOSPITAL | 0 | 0.7 | 0 |
| MISATSU ANIMAL HOSPITAL | 0 | 0 | 1 |
| JA MISATSU CANAL | 0 | 0.2 | 0.8 |
| COOP MISATSU | 0 | 0 | 1 |
| MISATSU CAR-DEALER | 0 | 0 | 1 |
| MISATSU INTERCHANGE | 0 | 0 | 1 |
| DOG AND CAT PARK MISATSU | 0 | 0 | 1 |
| CATTERY, KENNEL MISATSU | 0.4 | 0 | 0.6 |
| MISATSU CS HOTEL | 1 | 0 | 0 |
| MISATSU CANAL DENTAL CLINIC | 0 | 0 | 1 |
| MISATSU CITY CAMPSITE | 0.1 | 0 | 0.9 |
| MISATSU CIVIC SPA RESORT | 0.9 | 0.5 | 0 |
| MISATSU CANAL POST OFFICE | 0 | 0.9 | 0 |
| $D'_{EAS}$ | 0.600 | 0.575 | 0.922 |
| | DEGREE OF UNDERSTANDABILITY($p_{EAS}$) | | 0.699 |

| COMBINATION OF ATTRIBUTE WORDS | DEGREE OF INDEPENDENCY $p_{IND}$ | DEGREE OF COVERAGE $p_{EXH}$ | DEGREE OF EQUALITY $p_{EQU}$ | DEGREE OF UNDERSTANDABILITY $p_{EAS}$ | SCORE S |
|---|---|---|---|---|---|
| HOSPITAL, LEISURE, OTHERWISE | 1.000 | 0.538 | 0.904 | 0.910 | 3.277 |
| PET, LEISURE, OTHERWISE | 0.923 | 0.462 | 0.869 | 0.932 | 3.241 |
| SHOPPING, LEISURE, OTHERWISE | 1.000 | 0.462 | 0.842 | 0.921 | 3.230 |
| LEISURE, DENTAL OFFICE, OTHERWISE | 1.000 | 0.462 | 0.842 | 0.921 | 3.230 |
| | | ⋮ | | | |
| MONETARY FACILITY, GENERAL HOSPITAL, OTHERWISE | 0.846 | 0.385 | 0.726 | 0.714 | 2.617 |
| COOPERATIVE, GENERAL HOSPITAL, OTHERWISE | 0.846 | 0.385 | 0.726 | 0.689 | 2.567 |
| ACCOMMODATION FACILITY, GENERAL HOSPITAL, OTHERWISE | 0.692 | 0.538 | 0.762 | 0.639 | 2.441 |
| GENERAL HOSPITAL, PUBLIC INSTITUTION, OTHERWISE | 0.615 | 0.462 | 0.726 | 0.627 | 2.334 |

WEIGHT 28020

$w_{IND} = 0.5$ $w_{EXH} = 0.1$ $w_{EQU} = 1.0$ $w_{EAS} = 2.0$

*FIG. 29*

| | | | |
|---|---|---|---|
| 31010 | SET OF ATTRIBUTE WORD | CATEGORY | MORPHEME |
| 31020 | ATTRIBUTE WORD | HOSPITAL | TOZAI |
| | | PET | DEJIMA |
| | | COOPERATIVE | DENRYOKU |
| | | MONETARY FACILITY | DESIGN |
| | | SHOPPING | SCHOOL |
| | | SUPERMARKET | CLINIC |
| | | CAR | CENTER |
| | | LEISURE | DEALER |
| | | ACCOMMODATOIN FACILITY | DIGITAL |
| | | CATTERY/KENNEL | DENTAL |
| | | DENTAL OFFICE | DENDEN |
| | | GENERAL HOSPITAL | VIEW |
| | | INTERCHANGE | HOTEL |
| | | SPA | LAND |
| | | PUBLIC INSTITUCION | TECHNICAL |
| | | POST OFFICE | SOU |
| | | ... | ... |

*FIG. 32*

| | |
|---|---|
| ENTERED POI NAME | MISATSU CIVIC SPA RESORT |
| ATTRIBUTE WORDS THAT WERE SELECTED BY USER | LEISURE<br>ACCOMMODATION FACILITY |
| ATTRUBUTE WORDS THAT WERE NOT SELECTED BY USER | HOSPITAL<br>SHOPPING<br>PET<br>SPA |

*FIG. 35*

| POIS THAT WERE SET AS DESTINATION IN THE PAST 6 MONTHS \ ATTRIBUTE WORD | HOSPITAL | CAR | LEISURE | RANCH | SPA | ... |
|---|---|---|---|---|---|---|
| TOZAI CAR-DEALER MISATSU SHOP | 0 | 0.95 | 0 | 0 | 0 | ... |
| MISATSU RANCH | 0 | 0 | 0.7 | 1 | 0 | ... |
| ITO BERRY FARM | 0 | 0 | 0.7 | 0 | 0 | ... |
| CAR-SHOP IKEDA | 0 | 0.9 | 0 | 0 | 0 | ... |
| TIRE CENTER MISATSU SHOP | 0 | 0.8 | 0 | 0 | 0 | ... |
| ... | ... | ... | ... | ... | ... | ... |

| ATTRIBUTE WORD(a) | NUMBER OF POIS THAT HAVE RELEVANCE TO EACH ATTRIBUTE WORD, IN WHICH THE POIS WERE SET AS DESTINATION IN THE PAST 6 MONTH(E(a)) | ADDITIONAL VALUE e(a) ( $= w_e \cdot E(a) / E_{all}$ ) |
|---|---|---|
| CAR | 10 | 0.31 |
| LEISURE | 8 | 0.25 |
| RANCH | 5 | 0.16 |
| ⋮ | ⋮ | ⋮ |
| SPA | 1 | 0.03 |
| HOSPITAL | 0 | 0.00 |

36130 TOTAL NUMBER OF TIMES TO SET DESTINATION IN THE PAST 6 MONTH ($E_{all}$) : 48
WEIGHT $w_e$ : 1.5

*FIG. 37B*

(a) BEFORE ADDING

| POI NAME \ ATTRIBUTE WORD | CAR | LEISURE | RANCH | SPA | HOSPITAL | ... |
|---|---|---|---|---|---|---|
| ... | ... | ... | ... | ... | ... | ... |
| MISATSU CITY HOSPITAL | 0 | 0 | 0 | 0 | 1 | ... |
| MISATSU CAR-DEALER | 0.95 | 0 | 0 | 0 | 0 | ... |
| DOG AND CAT PARK MISATSU | 0 | 0.8 | 0 | 0 | 0 | ... |
| MISATSU CANAL DENTAL CLINIC | 0 | 0 | 0 | 0 | 1 | ... |
| MISATSU CIVIC SPA RESORT | 0 | 0.9 | 0 | 0.9 | 0 | ... |
| MISATSU CANAL POST OFFICE | 0 | 0 | 0 | 0 | 0 | ... |
| ALADDIN RENT-A-CAR CORPORATION TOZAI DEJIMA OFFICE | 1 | 0.7 | 0 | 0 | 0 | ... |
| TOZAI CAR-DEALER MISATSU SHOP | 0.95 | 0 | 0 | 0 | 0 | ... |
| MISATSU RANCH | 0 | 0.7 | 1 | 0 | 0 | ... |
| ITO BERRY FARM | 0 | 0.7 | 0 | 0 | 0 | ... |
| CAR-SHOP IKADA | 0.9 | 0 | 0 | 0 | 0 | ... |
| TIRE CENTER MISATSU SHOP | 0.8 | 0 | 0 | 0 | 0 | ... |
| OYAMADA RANCH | 0 | 0.9 | 1 | 0 | 0 | ... |
| ... | ... | ... | ... | ... | ... | ... |

*FIG. 38A*

(b) AFTER ADDING

| POI NAME \ ATTRIBUTE WORD | CAR | LEISURE | RANCH | SPA | HOSPITAL | ... |
|---|---|---|---|---|---|---|
| ... | ... | ... | ... | ... | ... | ... |
| MISATSU CITY HOSPITAL | 0 | 0 | 0 | 0 | 1 | ... |
| MISATSU CAR-DEALER | 1.26 | 0 | 0 | 0 | 0 | ... |
| DOG AND CAT PARK MISATSU | 0 | 1.05 | 0 | 0 | 0 | ... |
| MISATSU CANAL DENTAL CLINIC | 0 | 0 | 0 | 0 | 1 | ... |
| MISATSU CIVIC SPA RESORT | 0 | 1.15 | 0 | 0.93 | 0 | ... |
| MISATSU CANAL POST OFFICE | 0 | 0 | 0 | 0 | 0 | ... |
| ALADDIN RENT-A-CAR CORPORATION TOZAI DEJIMA OFFICE | 1.31 | 0.95 | 0 | 0 | 0 | ... |
| TOZAI CAR-DEALER MISATSU SHOP | 1.26 | 0 | 0 | 0 | 0 | ... |
| MISATSU RANCH | 0 | 0.95 | 1.16 | 0 | 0 | ... |
| ITO BERRY FARM | 0 | 0.95 | 0 | 0 | 0 | ... |
| CAR-SHOP IKADA | 1.21 | 0 | 0 | 0 | 0 | ... |
| TIRE CENTER MISATSU SHOP | 1.11 | 0 | 0 | 0 | 0 | ... |
| OYAMADA RANCH | 0 | 1.15 | 1.16 | 0 | 0 | ... |
| ... | ... | ... | ... | ... | ... | ... |

| SUBCATEGORY g | WEIGHT wg(g) |
|---|---|
| CITY HALL | 0.95 |
| GENERAL HOSPITAL | 1 |
| PRESCHOOL | 0.7 |
| ELEMENTARY SCHOOL | 0.7 |
| SPA | 1 |
| AMUSEMENT GROUND | 0.9 |
| HOTEL | 0.9 |
| FAMILY RESTAURANT | 0.8 |
| KIMONO SHO | 0.5 |
| ... | ... |

| ATTRIBUTE WORD / POI NAME | NUMBER OF TIMES TO BE SET AS DESTINATION | NUMBER OF TIMES TO BE SELECTED EACH ATTRIBUTE WORD | | | | | | |
|---|---|---|---|---|---|---|---|---|
| | | HOSPITAL | PET | LEISURE | ACCOMMODATION FACILITY | CATTERY/ KENNEL | GENERAL HOSPITAL | ... |
| ... | ... | ... | ... | ... | ... | ... | ... | ... |
| MISATSU ANIMAL HOSPITAL | 732 | 210 | 359 | — | — | 124 | 0 | ... |
| DOG AND CAT PARK MISATSU | 4236 | — | 517 | 2148 | — | — | — | ... |
| CATTERY/KENNEL MISATSU | 544 | — | 303 | — | 10 | 220 | — | ... |
| MISATSU CS HOTEL | 1218 | — | — | 38 | 901 | — | — | ... |
| ... | ... | ... | ... | ... | ... | ... | ... | ... |

*FIG. 42*

(a) CANDIDATES OF POI NAME

ALADDIN RENT-A-CAR CORPORATION TOZAI DEJIMA OFFICE
IRYOHOJIN KENKOKAI TOZAI DEJIMA CLINIC
SHIN TOZAI DENNETSU CORPORATION
TOZAI DIGITAL CORPORATION
TOZAI DIGITAL TECHNICAL SCHOOL
TOZAI DENDEN LAND
TOZAI DENDEN LAND HOTEL
TOZAI DETOX SERVICE CORPORATION
TOZAI DEALER KOGANEI SHOP
TOZAI DEALER HACHIOJI SHOP
TOZAI DENTAL CLINIC
TOZAI DENTAL SEMINAR HOUSE
TOZAI DEJIMA LAWYER OFFICE
TOZAI DISC
TOZAI DENSHI TECHNICAL SCHOOL
TOZAI DENNO SHA
HIMACHI CORPORATION TOZAI DENDO KOGU CENTER
HOSEKI CENTER TOZAI DEJIMA SHOP (b) "DEJIMA"

ALADDIN RENT-A-CAR CORPORATION TOZAI DEJIMA OFFICE
IRYOHOJIN KENKOKAI TOZAI DEJIMA CLINIC
TOZAI DEJIMA LAWYER OFFICE
HOSEKI CENTER TOZAI DEJIMA SHOP (c) "DENDEN"

TOZAI DENDEN LAND
TOZAI DENDEN LAND HOTEL

| POI NAME CANDIDATE \ MORPHEME(POSITION) | HOTEL (HEAD) | HOTEL (MIDDLE) | HOTEL (TAIL) | ... |
|---|---|---|---|---|
| ... | ... | ... | ... | ... |
| HOTEL・MISATSU・CRESCENT | 1 | 0 | 0 | ... |
| HOTEL・OYAMA・MISATSU | 1 | 0 | 0 | ... |
| MISATSU・DAIICHI・HOTEL | 0 | 0 | 1 | ... |
| PHILADELPHIA・HOTEL・MISATSU | 0 | 1 | 0 | ... |
| ... | ... | ... | ... | ... |

| WORD | PHONEME STRING |
|---|---|
| CLINIC | K L IH N IH K |
| HOTEL | HH OW T EH L |
| FAMILY | F AE M AH L IY |
| LAND | L AE N D |
| CENTER | S EH N T ER |
| DESIGN | D AH Z AY N |
| HOUSE | HH AW S |
| ... | ... |

FIG. 48

INFORMATION RETRIEVAL APPARATUS, INFORMATION RETRIEVAL SYSTEM, AND INFORMATION RETRIEVAL METHOD

CLAIM OF PRIORITY

The present application claims priority from Japanese patent application JP 2008-61013 filed on Mar. 11, 2008, the content of which is hereby incorporated by reference into this application.

BACKGROUND OF THE INVENTION

This invention relates to an information retrieval apparatus for retrieving user's desired data from a database.

There is known an information retrieval apparatus for a user to retrieve desired data from a database, in which the user inputs a part of a target name as characters, and the apparatus provides the user with data matching the input characters so that the user can select the data to finish the task.

As a typical one, there is a task of setting a destination in a car navigation system.

A car navigation system uses information retrieval interface as described above for retrieving POI (Point Of Interest) names and place names existing enormously on a nationwide scale so as to set a destination. In this information retrieval, the user first inputs a part of the POI name via a touch panel or a remote controller of the car navigation system. After that, when a retrieval button is pressed, a list of POI names including the character string input by the user is displayed, and the destination can be set when the user selects one of the listed POI names.

However, there is an enormous number of POIs on a nationwide scale, and hence the number of POI names matching the character string input as a part of the POI name by the user may be greatly large in many cases. Therefore, the user may be required to scroll or to do other operations for viewing all the candidates even when the list of the POI names is displayed. Thus, it may take the user a long period of time to find a desired POI.

To solve this problem, Japanese Patent Application Laid-open No. 2002-107173 discloses a technology of decreasing the number of candidate POIs by providing means for inputting a place name or a POI's category in addition to the means for inputting a POI name as a character string. In addition, Japanese Patent Application Laid-open No. 2006-202159 discloses a technology of changing an attribute for narrowing candidates of contents in content retrieval of a database, based on a retrieval strategy.

Japanese Patent Application Laid-open No. 2004-234421 discloses a technology in a website retrieval apparatus as follows. If the number of items as a result of retrieval is larger than a predetermined number so that the items cannot be displayed on a screen, keywords included in the websites of the retrieval result are shown to the user so that the user can select the keyword. Thus, the websites are narrowed to ones including the keyword selected by the user.

SUMMARY OF THE INVENTION

However, the above-mentioned technologies disclosed in Japanese Patent Application Laid-open No. 2002-107173 and in Japanese Patent Application Laid-open No. 2006-202159 may be difficult for the user to select a category because the user is required to select a candidate from many categories if there are many types of POI's categories or content's categories. In addition, if the user does not know the attribute shown as narrowing means, the narrowing operation cannot be achieved. For instance, if the user wants to set a POI named " . . . post office" as a destination, it may be difficult for the user to distinguish whether the POI belongs to a "monetary facility" or to a "public institution", and hence the user may be confused by them. It is because Japanese post offices also have a function of a monetary facility and had been operated by the national government until 2007, whereby the post office has an aspect of a public institution. In this manner, some POIs are difficult for the user to recognize a category thereof.

The technology disclosed in Japanese Patent Application Laid-open No. 2004-234421 may cause a difficulty for the user to understand the keywords shown to the user. In addition, the user may not know whether or not the keyword is included in the user's desired data. In addition, if the number of keywords is too large, it is difficult for the user to select the keyword because many keywords are displayed on the screen.

This invention has been made in view of the above-mentioned problems, and it is therefore an object thereof to reduce user's efforts about the narrowing operation by showing the user the attribute words that the user can easily understand as choices for the narrowing operation even if the retrieval result includes many candidates. Hereinafter, the attribute words shown as choices for the narrowing operation are referred to as "attribute words for narrowing".

A representative aspect of this invention is as follows. That is, there is provided an information retrieval apparatus comprising: an input unit for inputting characters; a database for storing a name, an attribute word associated with the name, and a degree of relevance indicating a degree of relevance between the name and the attribute word; a name retrieval unit for retrieving a name including the input characters from the database so as to output the retrieved name as a candidate name; an attribute word generating unit for extracting an attribute word associated with the candidate name output from the name retrieval unit from the database; and an output unit for displaying the attribute word extracted by the attribute word generating unit and the candidate name from the name retrieval unit. The attribute word generating unit is configured to: obtain a degree of relevance of the candidate name associated with the attribute word from the database with respect to a combination of the extracted attribute words; calculate a degree of independency indicating a degree of difference between the extracted attribute words; calculate a degree of coverage indicating an exhausitivity of the candidate names by the combination of the extracted attribute words; and calculate a degree of equality indicating uniformity of a number of corresponding candidate names for each attribute word. The attribute word generating unit comprises a first score calculating unit for calculating a score of the combination of the attribute words based on at least one of the calculated degree of independency, the calculated degree of coverage and the calculated degree of equality. The attribute word generating unit outputs the combinations of the attribute words to the output unit in a descending order of the score.

According to this invention, the information retrieval apparatus can show the user the attribute words that the user can understand easily as the attribute words for narrowing so that the user can easily achieve the narrowing operation even if the retrieval result includes many candidate names such as POI names. Thus, it is possible to reduce a period of time and efforts for selecting name data such as the POI name.

BRIEF DESCRIPTION OF THE DRAWINGS

The present invention can be appreciated by the description which follows in conjunction with the following figures, wherein:

FIG. 4A is a POI name table constituting a POI name database according to the first embodiment of this invention;

FIG. 4B is an attribute word table constituting the POI name database according to the first embodiment of this invention;

FIG. 5 is a retrieval result of the POI name retrieving unit according to the first embodiment of this invention;

FIG. 7A is an explanatory diagram illustrating an example of a result of calculation of a degree of independency $P_{IND}$ performed in the attribute word generating unit according to the first embodiment of this invention;

FIG. 7B is an explanatory diagram illustrating an example of a result of the calculation of the degree of independency performed in the attribute word generating unit according to the first embodiment of this invention;

FIG. 8A is an explanatory diagram illustrating an example of a result of calculation of a degree of coverage performed in the attribute word generating unit according to the first embodiment of this invention;

FIG. 8B is an explanatory diagram illustrating an example of a result of the calculation of the degree of coverage performed in the attribute word generating unit according to the first embodiment of this invention;

FIG. 9A is an explanatory diagram illustrating an example of a result of calculation of a degree of equality performed in the attribute word generating unit according to the first embodiment of this invention;

FIG. 9B is an explanatory diagram illustrating an example of a result of the calculation of the degree of equality performed in the attribute word generating unit according to the first embodiment of this invention;

FIG. 10A is an explanatory diagram illustrating an example of a result of calculation of a degree of understandability performed in the attribute word generating unit according to the first embodiment of this invention;

FIG. 10B is an explanatory diagram illustrating an example of a result of the calculation of the degree of understandability performed in the attribute word generating unit according to the first embodiment of this invention;

FIG. 11 is a diagram illustrating combinations of the attribute words according to the first embodiment of this invention;

FIG. 13 is a list of POI name candidates generated by a POI name retrieving unit, the attribute words and the degrees of relevance according to the first embodiment of this invention;

FIG. 15 is an explanatory diagram illustrating a relationship among the POI name candidate generated by the POI name retrieving unit, the attribute word and the degree of relevance according to the first embodiment of this invention;

FIG. 17 is an explanatory diagram illustrating a relationship among a POI name, morphemes (attribute words) and a degree of relevance according to a second embodiment of this invention;

FIG. 18 is an explanatory diagram illustrating the morphemes of the POI name and a relationship between the morpheme and the degree of relevance according to the second embodiment of this invention;

FIG. 19 is an explanatory diagram in which POI name candidates are arranged in the descending order of scores for combinations of the morphemes according to the second embodiment of this invention;

FIG. 21 is an explanatory diagram illustrating the POI name candidates and a relationship between the morpheme and the degree of relevance according to the second embodiment of this invention;

FIG. 24 is an explanatory diagram illustrating a calculation result of a degree of relevance between a POI name candidate and the attribute word according to the third embodiment of this invention;

FIG. 25 is an explanatory diagram illustrating a relationship among the POI name candidate, the attribute word and a degree of independency according to the third embodiment of this invention;

FIG. 26 is an explanatory diagram illustrating a relationship among the POI name candidate, the attribute word and a degree of coverage according to the third embodiment of this invention;

FIG. 27 is an explanatory diagram illustrating a relationship among the POI name candidate, the attribute word and a degree of equality according to the third embodiment of this invention;

FIG. 28 is an explanatory diagram illustrating a relationship among the POI name candidate, the attribute word and a degree of understandability according to the third embodiment of this invention;

FIG. 29 is an explanatory diagram illustrating an example of the score calculation according to the third embodiment of this invention;

FIG. 32 is an explanatory diagram illustrating a relationship between an attribute set and an attribute word according to a fourth embodiment of this invention;

FIG. 35 is an explanatory diagram illustrating an example of contents stored in an entered POI name storing unit according to the six embodiment of this invention;

FIG. 37A is an explanatory diagram illustrating a state of learning according to the six embodiment of this invention;

FIG. 37B is an explanatory diagram illustrating a state of learning according to the six embodiment of this invention;

FIG. 38A is an explanatory diagram illustrating a relationship among the POI name, the attribute word and a degree of relevance according to the six embodiment of this invention;

FIG. 38B is an explanatory diagram illustrating a relationship among the POI name, the attribute word and the degree of relevance according to the six embodiment of this invention;

FIG. 39 is an explanatory diagram of a table recording weight of each POI's category according to a seventh embodiment of this invention;

FIG. 42 is an explanatory diagram illustrating a summation result of the POI name, attribute words and the number of times of the selection in selecting POI names according to the eighth embodiment of this invention;

FIG. 43 is an explanatory diagram illustrating a manner of showing attribute words by morphemes according to a ninth embodiment of this invention;

FIG. 45 is an explanatory diagram illustrating a relationship among a POI name candidate, morphemes and a degree of relevance according to a tenth embodiment of this invention;

FIG. 48 is an explanatory diagram illustrating a relationship between a word and a phoneme string according to the eleventh embodiment of this invention.

DETAILED DESCRIPTION OF THE PREFERRED EMBODIMENTS

Hereinafter, embodiments of this invention will be described with reference to the attached drawings.

First Embodiment

Figure 1:
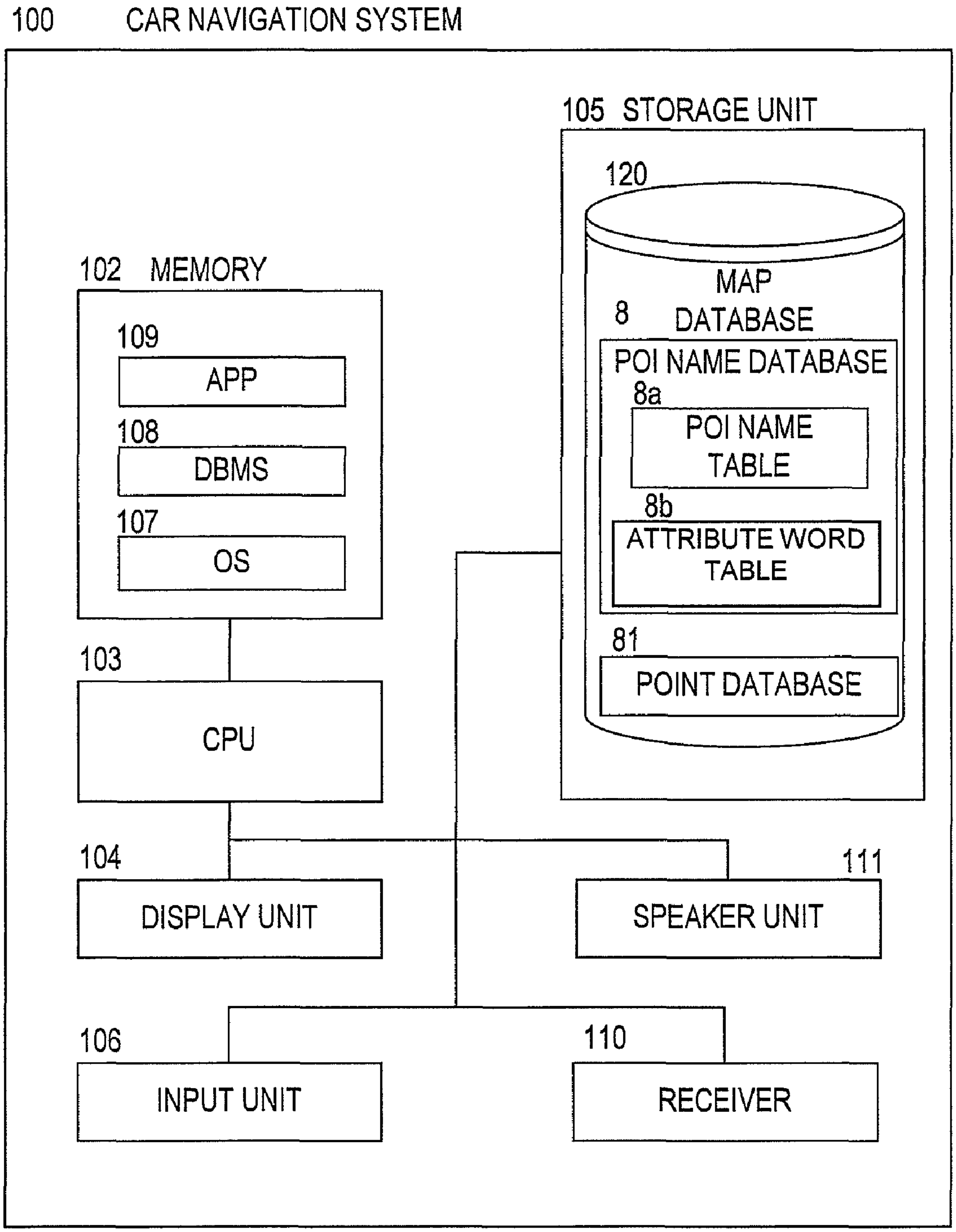
FIG. 1 is a block diagram illustrating an example of a car navigation system according to a first embodiment of this invention.

FIG. 1 illustrates a first embodiment of this invention and is a block diagram illustrating an example of a car navigation system to which this invention is applied. A car navigation system 100 is made of a computer including a CPU (processor) 103 for performing a calculating process, a memory 102 for temporarily storing data and programs, a storage unit 105 for storing data and programs, a display unit 104 for displaying a result of the operation and the like, an input unit 106 for receiving input from a user, a receiver 110 for receiving signals from satellites for the global positioning system (GPS), and a speaker unit 111 for outputting audio guidance and the like. It should be noted that this embodiment exemplifies the case where a touch panel as the input unit 106 for receiving input from the user is disposed on a display screen of the display unit 104. In addition, the input unit 106 may include a speech input unit such as a microphone in addition to the touch panel.

The storage unit 105 stores a map database 120 including graphic elements such as points, lines and surfaces indicating features constituting a map and attribute elements such as characters and numeric values indicating contents of a feature. Further, the map database 120 includes a point database 81 storing information about a point such as a current position or a destination, and a POI name database 8 storing names and attributes of POIs corresponding to points.

The memory 102 is loaded with a database management system (DBMS) 108 for managing the map database 120, an application 109 for using the map database 120 via the DBMS 108, and an operating system (OS) 107 for managing the DBMS 108 and the application 109, and they are executed by the CPU 103. The application 109 computes the current position based on the signals received by the receiver 110 from the GPS satellites, retrieves current point data from the map database 120, and obtains map information, which is output to the display unit 104. In addition, when the car navigation system 100 receives a retrieval instruction from the user via the input unit 106, the application 109 retrieves the map database 120 via the DBMS 108 as described later and outputs a result of the requested retrieval to the display unit 104. It should be noted that the OS 107, the DBMS 108 and the application 109 are stored in the storage unit 105 as a recording medium, are loaded to the memory 102 when the car navigation system 100 is activated, and are executed by the CPU 103.

General Embodiment

Figure 2:
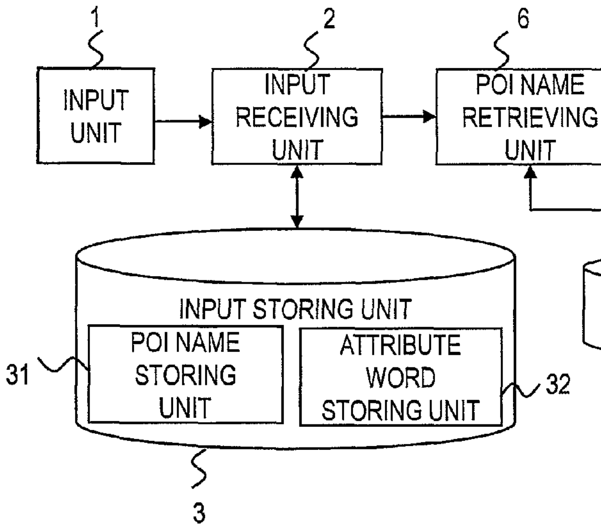
FIG. 2 is a block diagram illustrating functional elements of an application and a DBMS executed in the car navigation system according to the first embodiment of this invention.

FIG. 2 is a block diagram illustrating functional elements of the application 109 and the DBMS 108 executed in the car navigation system 100.

An input unit 1 corresponds to the input unit 106 illustrated in FIG. 1, which receives an input from the user and outputs it to an input receiving unit 2. Here, it is supposed that the input is performed by the touch panel provided to the screen of the display unit 104 of the car navigation system 100. In addition, it is supposed that the input from the user includes an input of a POI name using an alphabet table, a user's selection with respect to the attribute word displayed on the screen, and a POI selection from a list of POI names.

Figure 3:
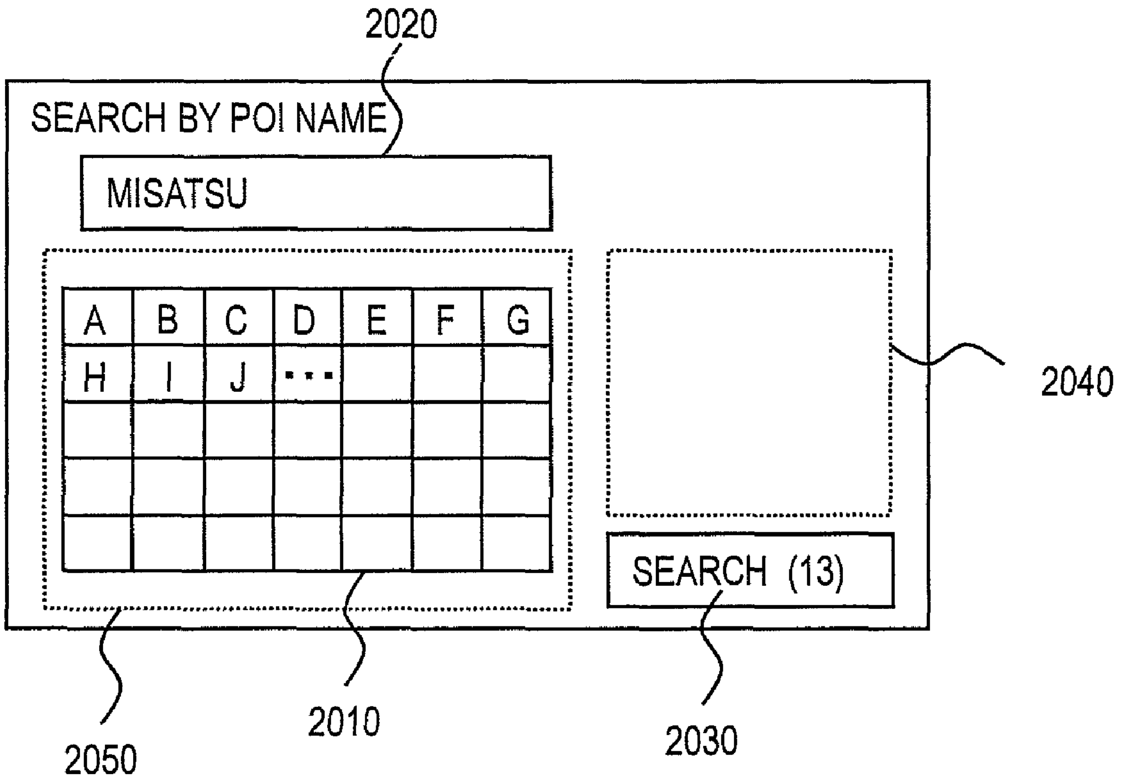
FIG. 3 is a screen image displayed on a display unit of the car navigation system according to the first embodiment of this invention.

An example of the screen displayed on the display unit 104 of the car navigation system 100 is illustrated in FIG. 3. FIG. 3 illustrates a first embodiment, which is a screen image displayed on the display unit of the car navigation system. An alphabet table 2010 is displayed on the screen for input of a character string using the touch panel. This screen is a touch panel. The touch panel 2010 is provided with the alphabet table and a back button for correcting a character string. In addition, alphabetic characters and numerals can be input. When the user presses the touch panel 2010, a character string is input one by one character. The input character string is displayed on a display portion 2020.

In addition, when a button 2030 is pressed, a list of POI names that partially match the current input character string can be displayed. This list display is performed on a display region 2050 set on the screen in a predetermined region, which will be described later.

In addition, a display region 2040 displays attribute words for narrowing the POI names, and the user can select an attribute word by pressing it on the display. This display will be described in the embodiment described later.

The input receiving unit 2 of FIG. 2 obtains an output from the input unit 1 and stores a result of the input in an input storing unit 3. The input storing unit 3 is a storage region set in the memory 102, for example. The input storing unit 3 stores various input contents sent from the input unit 1, but only a POI name storing unit 31 and an attribute word storing unit 32 that constitute a feature of this invention will be described here. The POI name storing unit 31 stores the character string input by the user as alphabet input. The attribute word storing unit 32 stores the attribute word selected by the user.

A POI name retrieving unit 6 compares the input character string (i.e., character string stored in the POI name storing unit 31) with the POI name stored in the POI name database 8, so as to retrieve POI names matching partially. In order to achieve a high speed retrieving process, it is possible to adopt a method in which the POI name is divided into morphemes in advance, and an index for searching is generated in advance.

In addition, the POI name retrieving unit 6 retrieves POI names associated with the attribute word designated by the user (i.e., attribute word stored in the attribute word storing unit 32) from POI names obtained from a result of the partial matching so as to obtain a list of the POI names, which is output to an attribute word generating unit 7. The definition of the "POI names associated with the attribute word" will be described later.

The POI name database 8 stores various information about the POI name stored in the car navigation system 100. A form of storing various types of information about the POI name is illustrated in FIGS. 4A and 4B. FIG. 4A is an explanatory diagram illustrating a POI name table of the POI name database 8, and FIG. 4B is an explanatory diagram illustrating an attribute word table of the POI name database 8.

FIG. 4A illustrates a POI name table 8*a* constituting the POI name database 8, and FIG. 4B illustrates an attribute word table 8*b* constituting the POI name database 8. Reference numeral 3010 in the POI name table 8*a* of FIG. 4A denotes an ID number determining each of the POI names in a unique manner. Reference numeral 3020 denotes a POI name. Reference numerals 3040 to 3060 denote an address, a telephone number, latitude and longitude of each POI. Reference numerals 3070 and 3080 denote categories to which each POI belongs. A main category is a rough category of the POI while a subcategory is a more detail category. The main category and the subcategory are used for a function of retrieving a POI by a category that is usually provided to the car navigation system 100, and are used for showing the user the POI names that have the categories 3070 and 3080 matching the category selected by the user.

In addition, the POI name database 8 includes the attribute word table 8*b* storing a relationship between each POI name and the attribute word characterizing the same. Reference numeral 3090 in the attribute word table 8*b* illustrated in FIG. 4B denotes the attribute word. Reference numeral 3100 denotes a degree of relevance that indicates how much extent each POI name 3020 is related to each attribute word 3090, and the degree of relevance 3100 has a value within the range of 0 to 1. The degree of relevance 3100 can be determined for each POI name 3020 by studying how much extent each attribute word 3090 is associated with each POI by the user. For instance, it can be determined using a method of card sorting performed in a usability test. It should be noted that the "POI names associated with the attribute word" described above are defined as the POI name 3020 having the degree of relevance 3100 that is a value larger than zero with respect to the attribute word 3090.

For instance, it is supposed that the POI name 3020 is "Sapporo City Hall" in FIG. 4B, and that there is a study result showing that all the users who use the car navigation system 100 recognize it as a "City Hall". Based on this study result, the degree of relevance 3100 between the POI name "Sapporo City Hall" and the attribute word "City Hall" is assigned with "1" that is the maximum value, because all the users recognize the relevance. In addition, as to the degree of relevance 3100 between the POI name "Sapporo City Hall" and the attribute word "public institution", if there is a study result indicating that 95% of users recognize that it is the public institution, the degree of relevance is assigned with 0.95 reflecting the value.

Further, in FIG. 4B, it is supposed that there is a study result indicating that "Tozai Denden Land Hotel" is an accommodation facility, but 70% of users feel that it is natural to associate it with the attribute word "amusement ground" because there is an amusement ground named "Tozai Denden Land". Based on this result, the degree of relevance between the POI name "Tozai Denden Land Hotel" and the attribute word "amusement ground" is assigned with 0.7.

This degree of relevance 3100 does not necessarily require a large scale of user study, and may be determined by a developer.

In addition, the degree of relevance 3100 may have a form in which the individual POI names 3020 are assigned with different values. However, if all the POI names are assigned with different degrees of relevance, a storage capacity is consumed. In addition, it is expected that similar POIs are assigned with the same degree of relevance 3100 as a set. Therefore, POIs having a set of the same degrees of relevance 3100 are grouped, and a set of degrees of relevance 3100 may be assigned to each group. In addition, the main category (3070) and the subcategory (3080) illustrated in FIG. 4A may be adopted as they are as the group.

In addition, the degree of relevance 3100 is not necessarily a continuous quantity between 0 and 1. A storage capacity can be reduced and a process speed can be increased if a value of the degree of relevance 3100 is quantized by few typical values. For instance, the degree of relevance 3100 may be limited to four types, and values corresponding to the types may be determined as 0, 0.3, 0.7 and 1.0. Hence, the degree of relevance 3100 can be constituted by a storage capacity of two bits. As an extreme example, the degree of relevance 3100 may be expressed by binary values including 0 and 1. In this case, the degree of relevance 3100 can be constituted by one bit.

The attribute word generating unit 7 illustrated in FIG. 2 selects the attribute word 3090 that is easy for the user to distinguish among the attribute word table 8*b* and shows the selected one to the user. A processing method in the attribute word generating unit 7 will be described later. It is preferable that various types of attribute words 3090 are prepared in the attribute word table 8*b*. Therefore, a relationship between attribute words is not necessarily a hierarchical structure in particular, but may be various types. In addition, there may be overlapping POIs covered by individual attribute words. In addition, the attribute word 3090 is not limited to one indicating a type of the POI. For instance, there may be various viewpoints existing in a mixed manner, including a place name (e.g., Tokyo, Chiba, (prefecture names in Japan), . . . city, etc.), hours of operation (e.g., open 24 hours a day, closed during night, closed on Saturday and Sunday), a location (e.g., along the Route . . . , along the city road).

An output unit 9 illustrated in FIG. 2 outputs the attribute word obtained from the attribute word generating unit 7, on the screen of the display unit 104 or through a speaker of the speaker unit 111.

(Process of Attribute Word Generating Unit)

Figure 6A:
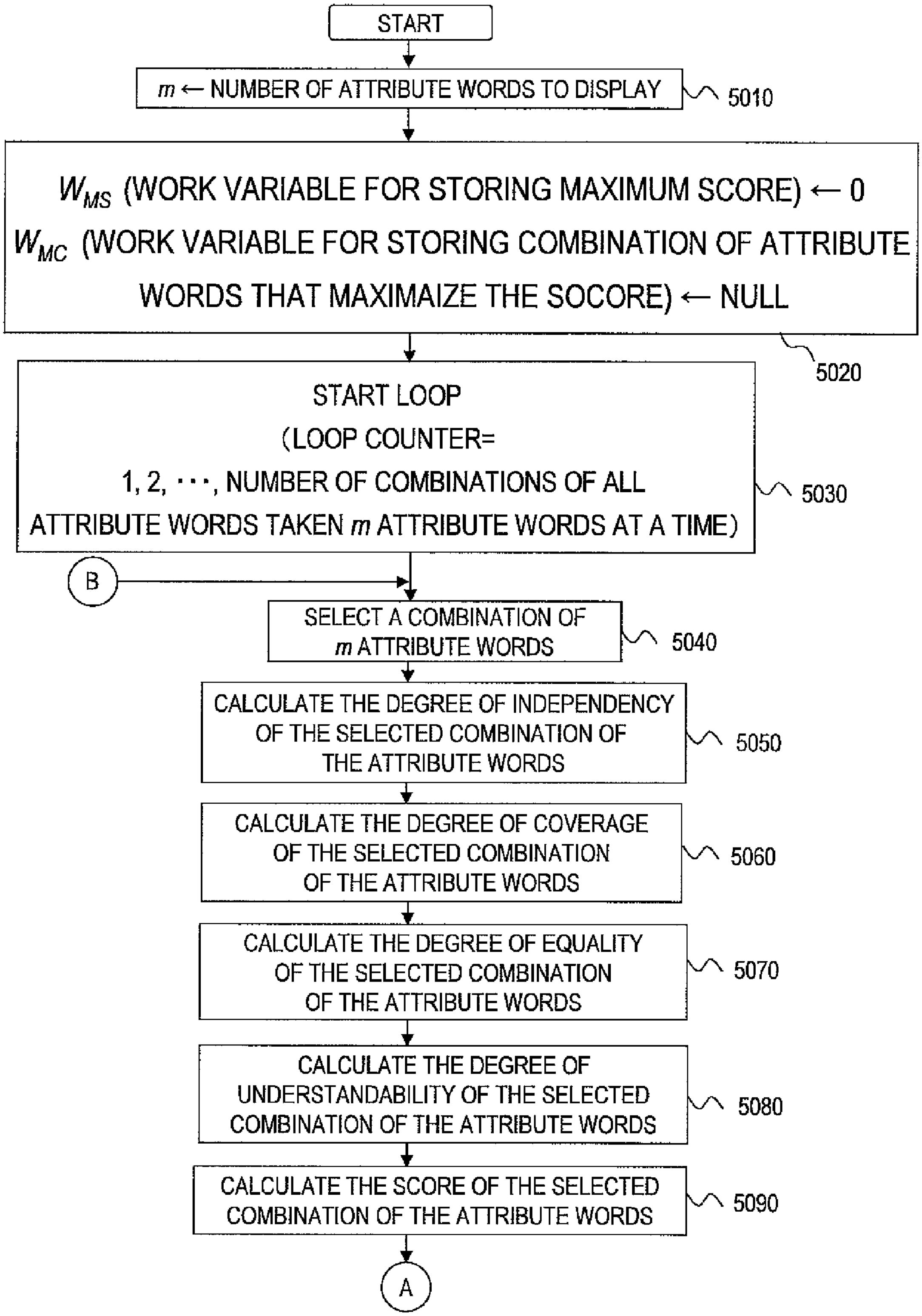
FIGS. 6A and 6B are flowcharts of a process of the attribute word generating unit according to the first embodiment of this invention.
Figure 6B:
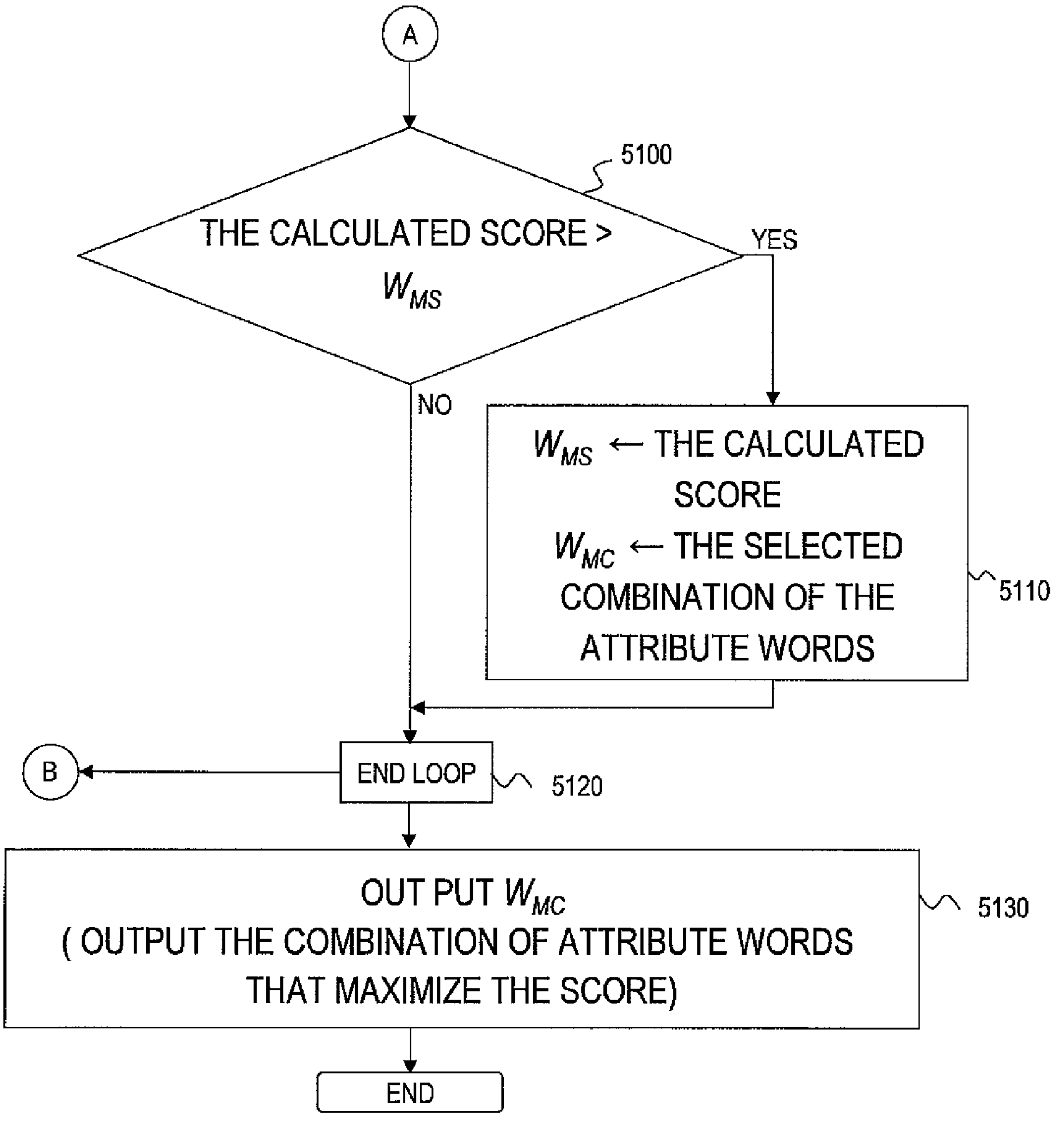

Next, an example of a process performed in the attribute word generating unit 7 will be described. In addition, a flowchart of the process performed in the attribute word generating unit 7 is illustrated in FIGS. 6A and 6B. FIGS. 6A and 6B illustrate the first embodiment and are flowcharts illustrating an example of the process performed in the attribute word generating unit of the car navigation system.

As a precondition, it is supposed that the user inputs "MISATSU" as a character string of the POI name (FIG. 3). As a result, the POI name storing unit 31 stores the character string "MISATSU". In addition, the attribute word storing unit 32 is vacant in an initial state.

It is supposed that the POI name retrieving unit 6 retrieves the POI name that partially matches the character string "MISATSU", and that thirteen POI name candidates are obtained. In addition, it is supposed that only the attribute words having the degree of relevance 3100 larger than 0 with respect to the POI name candidate are extracted among the attribute words, and that sixteen attribute words are extracted, with the degree of relevance 3100 between the POI name candidate and the attribute word as illustrated in FIG. 5. It should be noted that FIG. 5 illustrates the retrieval result of the POI name retrieving unit 6, which is a relationship among a POI name candidate 4010, the attribute word 3090 and the degree of relevance 3100.

It is supposed that the attribute word generating unit 7 selects three attribute words 3090 as the attribute word for narrowing from the above-mentioned sixteen attribute words 3090.

Each symbol is defined as follows.

A total number of the attribute words is denoted by M (M=16 in this embodiment).

The number of attribute words to be displayed is denoted by m (m=3 in this embodiment).

The number of candidate POIs is denoted by n (n=13 in this embodiment).

The POI name is denoted by $L_i$ (i=1, 2, . . . n).

A flowchart of the process of the attribute word generating unit 7 is illustrated in FIGS. 6A and 6B.

First, in Step 5010 of FIG. 6A, the number of the attribute words to be displayed is set. Here, a predetermined number of the attribute words (M) is set to be three.

In Step 5020, a maximum score is reset, and a variable for storing combinations of attribute words to be displayed is reset.

In Step 5030, a loop is started. In one loop, arbitrary attribute words are extracted from M attribute words. This loop is repeated for every combination of m attribute words. Therefore, the number of times repeating the loop is as below.

$$ {}_{M}C_{m} = \frac{M!}{m!(M-m)!} \qquad \text{[Equation 1]} $$

In Step 5040, arbitrary m attribute words are extracted from M attribute words. The attribute words extracted here may be denoted by $a_i$ (i=1, 2, . . . m). In addition, the degree of relevance 3100 between the POI name L and the attribute a is denoted by r(L, a). Further, a step function Hc is defined by the equation below, which is used for a score calculation as described later.

$$ H_c(x) = \begin{cases} 0 (x < 0) \\ c (x = 0) \\ 1 (x > 0) \end{cases} \qquad \text{[Equation 2]} $$

(Calculation of Degree of Independency)

In Step 5050, the degree of independency with respect to a combination of the attribute words is calculated. The degree of independency is an indicator indicating how much extent the POI narrowed by a certain attribute word is different from another POI name narrowed by another attribute word. In other words, the degree of independency is an indicator for selecting the attribute words so as not to overlap each other. If the degree of independency is high, overlapping of the attribute words with respect to a POI name candidate is reduced. On the contrary, if the degree of independency is low, overlapping of the attribute words with respect to a POI name candidate increases.

First, the number of attribute words that are assigned to each of the POI names having the degree of relevance 3100 larger than zero is counted. Then, only if a result of the counting is one or larger, one is subtracted from the value. The calculation result of the degree of independency of the attribute word is denoted by $C_{IND}(L_i)$. The specific calculation equation is as below.

$$ C_{IND}(l_i) = \sum_{j=1}^{m} H_0(r(l_i, a_j)) - H_1\left(\left(\sum_{j=1}^{m} H_0(r(l_i, a_j))\right) - 1\right) \qquad \text{[Equation 3]} $$

The values of $C_{IND}(L_i)$ are summed up for all the POI name candidates. If the sum value is large, it means that a plurality of attribute words are associated with the same POI name. Therefore, it means that the number of narrowed POIs is not so small that the narrowing efficiency is low even when the user performs the narrowing operation by selecting one attribute word. Therefore, as the sum value is smaller, the narrowing efficiency of the combination of the attribute words is higher.

For this reason, the sum value is normalized by the number of POIs and is subtracted from one for defining the result as the degree of independency $P_{IND}$.

$$ p_{IND} = 1 - \frac{1}{n}\sum_{i=1}^{n} C_{IND}(l_i) \qquad \text{[Equation 4]} $$

A calculation example of the degree of independency $P_{IND}$ is illustrated in FIGS. 7A and 7B. FIG. 7A illustrates a first embodiment and is an explanatory diagram illustrating an example of a result of the calculation of the degree of independency $P_{IND}$ performed in the attribute word generating unit, which illustrates an example of a high degree of independency. FIG. 7B illustrates a first embodiment and is an explanatory diagram illustrating an example of a result of the calculation of the degree of independency $P_{IND}$ performed in the attribute word generating unit, which illustrates an example of a low degree of independency.

FIG. 7A illustrates a combination of three attribute words, i.e., "shopping", "leisure" and "public institution". In this case, it is only "Misatsu Civic Spa Resort" denoted by 6010 that has at least two attribute words having the degree of relevance 3100 with the same POI name. On the other hand, in the combination of attribute words "hospital", "dental office" and "general hospital" illustrated in FIG. 7B, a plurality of attribute words are associated with the POIs denoted by 6030 and 6031 among thirteen POIs. As a result, comparing the degrees of independency, it is understood that a degree of independency (6020) of FIG. 7A has a larger value than a degree of independency (6040) of FIG. 7B.

If the attribute words "hospital", "dental office" and "general hospital" illustrated in FIG. 7B are shown to the user as attribute words for narrowing, they may not contribute to the narrowing so much because they can be easily confused with each other and the number of overlapping is large. According to the calculation described above, the degree of contribution can be evaluated as the degree of independency $P_{IND}$ in a quantitative manner.

(Calculation of Degree of Coverage)

Next, in Step 5060 of FIG. 6A, a degree of coverage with respect to a combination of the attribute words is calculated. The degree of coverage is an indicator indicating what ratio of the POI name candidates can be selected by the combination of the attribute words. In other words, if the degree of coverage is high, candidate attribute words for the POI name candidate are displayed. On the contrary, if the degree of coverage is low, candidate attribute words for the POI name candidate are not displayed.

The number of POIs in each of which the degree of relevance 3100 is assigned with a value larger than zero for at least one attribute word is counted for each POI name. A result of the counted number of POIs is denoted by $C_{EXH}(L_i)$, which is calculated by the equation below.

$$C_{EXH}(l_i) = H_0\left(\sum_{j=1}^{m} H_0(r(l_i, a_j))\right) \quad \text{[Equation 5]}$$

The calculated values for all POI name candidates are summed up. If the sum value is large, it means that many POIs can be covered by the combination of the attribute words, and hence there is a small number of POIs that are excluded from the narrowing by the selection of the attribute words. The sum value is normalized by the number of POIs so as to define it as the degree of coverage $p_{EXH}$.

$$p_{EXH} = \frac{1}{n}\sum_{i=1}^{n} C_{EXH}(l_i) \quad \text{[Equation 6]}$$

A calculation example of the degree of coverage $p_{EXH}$ is illustrated in FIGS. 8A and 8B. FIG. 8A illustrates the first embodiment of this invention and is an explanatory diagram illustrating an example of a result of the calculation of the degree of coverage $p_{EXH}$ performed in the attribute word generating unit, which is an example of a high degree of coverage. FIG. 8B illustrates the first embodiment of this invention and is an explanatory diagram illustrating an example of a result of the calculation of the degree of coverage $p_{EXH}$ performed in the attribute word generating unit, which is an example of a low degree of coverage. FIG. 8A illustrates a combination of three attribute words, i.e., "hospital", "accommodation facility" and "public institution". In this case, the number of POIs in which the degree of relevance 3100 larger than zero is assigned with at least one attribute word is nine as denoted by 7010. On the other hand, in the case of the attribute words "cooperative", "supermarket" and "post office" illustrated in FIG. 8B, the number of POIs having the degree of relevance 3100 larger than zero assigned with at least one attribute word is three as denoted by 7030. As a result, the combination of the attribute words of FIG. 8A covers more POIs, and hence a degree of coverage (7020) of FIG. 8A is larger than a degree of coverage (7040) illustrated in FIG. 8B.

(Calculation of Degree of Equality)

In Step 5070 of FIG. 6A, a degree of equality with respect to the combination of the attribute words is calculated. The degree of equality is an indicator indicating what ratio of the number of remaining POIs is the same number by each attribute word when the narrowing is performed with each selected attribute word in a certain combination of attribute words. In other words, the degree of equality indicates a degree of equality of the number of candidates according to the shown attribute word. If the degree of equality is high, it means that the numbers of candidates with respect to the individual attribute words are substantially the same. On the contrary, if the degree of equality is low, it means that the numbers of candidates with respect to the individual attribute words are different.

First, the number of POIs having the degree of relevance 3100 that is assigned with a value larger than zero is counted for each of the attribute words. This value is denoted by $D_{EQU}(a_i)$, which is calculated by the equation below.

$$D_{EQU}(a_i) = \sum_{j=1}^{n} H_0(r(l_j, a_i)) \quad \text{[Equation 7]}$$

Next, a standard deviation of the number $D_{EQU}(a_i)$ of POIs having the degree of relevance 3100 that is larger than zero is calculated. If the standard deviation is large, the number of the narrowed POIs may be too large or too small in variation depending on the attribute word, and hence an attribute word that is inefficient for the narrowing may be shown when each of the attribute words is selected. Therefore, the standard deviation is normalized by the number of POIs, and is subtracted from one for calculating the degree of equality $p_{EQU}$.

$$p_{EQU} = 1 - \frac{1}{n}\sqrt{\frac{1}{m}\sum_{i=1}^{m}\left(D_{EQU}(a_i) - \frac{1}{m}\sum_{j=1}^{m} D_{EQU}(a_j)\right)^2} \quad \text{[Equation 8]}$$

An calculation example of the degree of equality $p_{EQU}$ is illustrated in FIGS. 9A and 9B. FIG. 9A illustrates the first embodiment and is an explanatory diagram illustrating an example of a result of the calculation of the degree of equality $p_{EQU}$ performed in the attribute word generating unit, which is an example of a high degree of equality. FIG. 9B illustrates the first embodiment and is an explanatory diagram illustrating an example of a result of the calculation of the degree of equality $p_{EQU}$ performed in the attribute word generating unit, which is an example of a low degree of equality. FIG. 9A illustrates a combination of three attribute words, i.e., "pet", "car" and "dental office". The number of POIs having the degree of relevance 3100 assigned with each of the attribute words is three, two and two as denoted by $D_{EQU}$ 8010. On the other hand, FIG. 9B illustrates a combination of three attribute words, i.e., "accommodation facility", "spa" and "post office". In this case, the number of POIs having the degree of relevance 3100 assigned with each of the attribute words is four, one and one as denoted by $D_{EQU}$8030.

The attribute word of FIG. 9B has a large variation of the number of POIs associated with each of the attribute words compared with FIG. 9A. Therefore, if the attribute words "accommodation facility", "spa" and "post office" are shown to the user for the narrowing, for example, it is good for the user who wants to go to a spa or a post office because the selection of "spa" and "post office" can narrow the number of POIs to one. However, if the user wants to go to an accommodation facility, it is not so efficient because the number of remaining POIs is large in spite of the selection of the "accommodation facility". On the other hand, in the case of FIG. 9A, approximately three POIs remain even if any attribute word is selected. Therefore, it is possible to reduce the number of remaining POIs to approximately the same number even if the user wants to go to any POI. Considering this, it is understood from the comparison between the degrees of equality that a value (8020) of FIG. 9A is larger than a value (8040) of FIG. 9B on the calculation, and hence the former can enable to select the combination of the attribute words that can be more uniform.

(Calculation of Degree of Understandability)

In Step 5080 of FIG. 6A, a degree of understandability with respect to a combination of the attribute words is calculated. The degree of understandability is an indicator indicating how much extent the user can easily understand a certain combination of the attribute words.

First, an average value of the degrees of relevance 3100 is calculated with respect to only the POIs having the degree of relevance 3100 larger than zero assigned to each of the attribute words. The average value of the degrees of relevance 3100 is denoted by $D_{EAS}(a_i)$, which is calculated by the equation below.

[Equation 9]

$$D_{EAS}(a_i) = \frac{\sum_{j=1}^{n} r(l_j, a_i)}{\sum_{j=1}^{n} H_0(r(l_j, a_i))}$$

If the attribute word has a high average value $D_{EAS}(a_i)$ of the degrees of relevance, it means that the degree of relevance 3100 is generally high. The degree of relevance 3100 is a value indicating easiness of association between the POI name and the attribute word. Therefore, the attribute word having a high average value $D_{EAS}(a_i)$ of the degrees of relevance means that the user can easily decide whether or not one POI belongs to the attribute word. On the contrary, a low average value $D_{EAS}(a_i)$ of the degrees of relevance means that it is difficult for the user to decide whether or not the attribute word should be selected when the user selects a desired POI.

Therefore, the average value $D_{EAS}(a_i)$ of the degrees of relevance is normalized by the number of the attribute words so as to define the degree of understandability $P_{EAS}$.

[Equation 10]

$$p_{EAS} = \frac{1}{m}\sum_{i=1}^{m} D_{EAS}(a_i)$$

The degree of understandability is an indicator indicating easiness of understanding the relationship between the attribute word and the POI name. If the degree of understandability is high, the attribute word corresponding to the POI name can be sensed easily. On the contrary, if the degree of understandability is low, incongruity is apt to exist between the POI name and the attribute word.

An calculation example of the degree of understandability is illustrated in FIGS. 10A and 10B. FIG. 10A illustrates the first embodiment and is an explanatory diagram illustrating an example of a result of the calculation of the degree of understandability $P_{EAS}$ performed in the attribute word generating unit, which is an example of a high degree of understandability. FIG. 10B illustrates the first embodiment and is an explanatory diagram illustrating an example of a result of the calculation of the degree of understandability $P_{EAS}$ performed in the attribute word generating unit, which is an example of a low degree of understandability. FIG. 10A illustrates a combination of three attribute words, i.e., "supermarket", "leisure" and "post office". Only values having the degree of relevance 3100 larger than zero are extracted, and an average value thereof is calculated. Then, it is 1.0, 0.863 or 1.0 for each of the attribute words as denoted by $D_{EAS}$(9010), and each value is close to one. On the other hand, FIG. 10B illustrates a combination of three attribute words, i.e., "car", "accommodation facility" and "public institution". In this example, low degrees of relevance 3100 are found here and there. For instance, in the POI of "Cattery, Kennel Misatsu", the degree of relevance 3100 with respect to "accommodation facility" is low as 0.4. This indicates that it is difficult for the user to decide whether or not a pet hotel should be regarded as the accommodation facility. Considering this, only the values having the degree of relevance 3100 larger than zero are extracted, and an average value thereof is calculated (9030). Then, it is 0.875, 0.6 or 0.575 for each of the attribute words, which are low values compared with FIG. 10A.

In addition, the degree of understandability is calculated, and a value (9020) of FIG. 10A is larger than a value (9040) of FIG. 10B. As a result, it is understood that if a combination of the attribute words having a higher degree of understandability is selected, it is possible to select the combination of the attribute words that is easier for the user to distinguish.

(Calculation of Score)

In Step 5090 of FIG. 6A, the individual indicators calculated above are assessed integrally, so as to calculate a score with respect to one combination of the attribute words. Here, weighted adding of the indicators is performed so as to determine the score. A score S for one attribute word combination is calculated by the equation below.

$$S = w_{IND} \cdot p_{IND} + w_{EXH} \cdot p_{EXH} + w_{EQU} \cdot p_{EQU} + w_{EAS} + p_{EAS}$$ [Equation 11]

Here, $w_{IND}$, $w_{EXH}$, $w_{EQU}$, $w_{EAS}$ denote weights of the degree of independency, the degree of coverage, the degree of equality and the degree of understandability, respectively.

In Steps 5100 and 5110 of FIG. 6B, if a result of the score calculation till then exceeds the maximum score, the maximum score is updated, and the attribute word combination stored as an attribute word combination to be shown is also updated.

Step 5120 is an termination of the loop. The score is calculated for every attribute word combination, and the process of Steps 5040 to 5110 is repeated until the attribute word combination to be the maximum score is determined.

(Output of Attribute Word Having Maximum Score)

In Step 5130, the combination of the attribute words to be the maximum score is output to the output unit 9. Thus, the attribute word for narrowing is shown on the screen of the display unit 104, and hence the user can perform the narrowing.

FIG. 11 illustrates the first embodiment and is an explanatory diagram illustrating an example of a combination of the attribute words extracted by the attribute word generating unit. FIG. 11 is a diagram illustrating combinations of the attribute words arranged in the descending order of the score after the score calculation is performed with respect to the combination of the attribute words for the POI name candidate of FIG. 5. It should be noted that the weight is calculated according to a value denoted by 10020 in the diagram.

In FIG. 11, the combination of the attribute words having the maximum score is one including "hospital", "shopping" and "leisure" as denoted by 10010. Therefore, the attribute word generating unit 7 outputs the three attribute words to the output unit 9.

Receiving the attribute words, the output unit 9 displays the attribute words on the screen of the display unit 104. Simultaneously, the speaker of the speaker unit 111 may produce audio guidance like "The narrowing operation will be started from any one of hospital, shopping and leisure".

Figure 12:
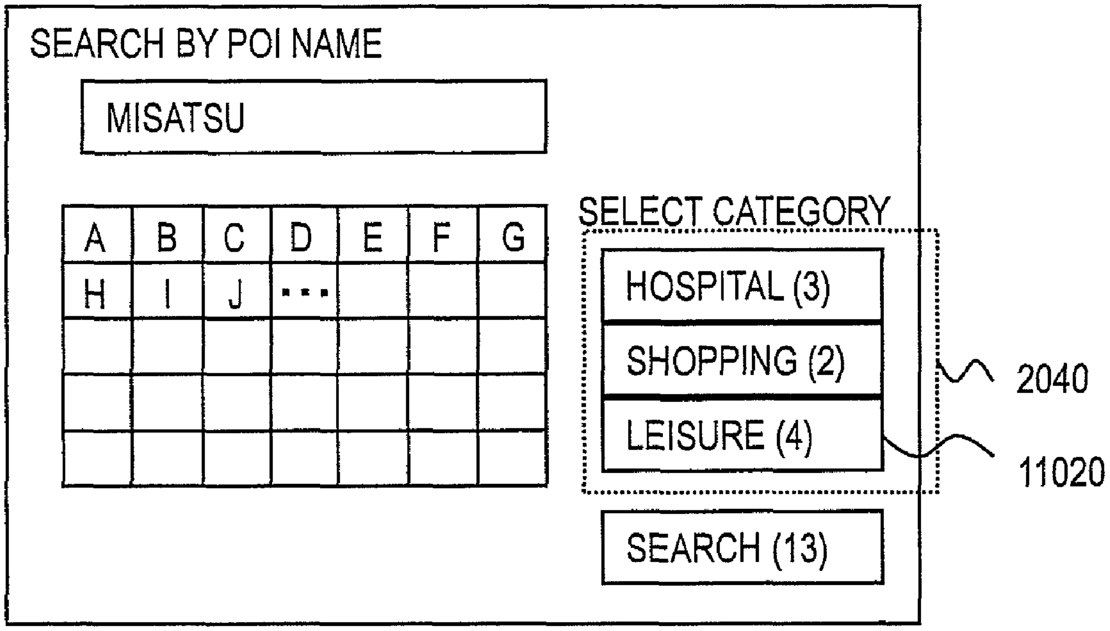
FIG. 12 is a screen image of the attribute words to be displayed on the display unit of the car navigation system according to the first embodiment of this invention.

The screen with an updated display is illustrated in FIG. 12. FIG. 12 illustrates the first embodiment and is a screen image of the attribute words to be displayed on the display unit of the car navigation system. As illustrated in the display region 2040 in the diagram, three attribute words, i.e., "hospital", "shopping" and "leisure" selected by the attribute word generating unit 7 are displayed. In addition, the number of POIs having the degree of relevance 3100 assigned with a value larger than zero with respect to each of the attribute words is also displayed in parentheses.

(Case where Attribute Word for Narrowing is Selected)

Hereinafter, it is supposed that the user is in Misatsu and wants to go to an accommodation facility managed by the city, but does not know that the formal name of the POI is "Misatsu Civic Spa Resort". Further, it is supposed that the user selects "leisure" that is closest to the user's target among the three attribute words and presses a button 11020 on the screen.

This pressing is received by the input unit 1 and is stored in the attribute word storing unit 32 by the input receiving unit 2.

Next, the POI name retrieving unit 6 generates a list of POI names that partially match the character string "MISATSU" and have the degree of relevance 3100 larger than zero with the attribute word "leisure". FIG. 13 illustrates the first embodiment of this invention and is a list of the POI name candidates generated by the POI name retrieving unit, the attribute words and the degrees of relevance. This list includes four remaining candidate POIs as illustrated in FIG. 13 with POI name candidates 12010. In addition, an attribute word 12020 has at least one degree of relevance 3100 assigned with a value larger than zero with the POI name candidate. Further, "leisure" that is already selected is omitted.

The attribute word generating unit 7 selects the attribute word to be output to the display unit 104 according to the procedure of the process illustrated in FIGS. 6A and 6B based on the degrees of relevance 3100 between the POI name candidate and the attribute word illustrated in FIG. 13. This procedure overlaps the above-mentioned procedure, and hence description thereof will be omitted. As a result of this process, three attribute words including "pet", "accommodation facility" and "spa" are selected. Therefore, the attribute word generating unit 7 outputs the three attribute words to the output unit 9.

Figure 14:
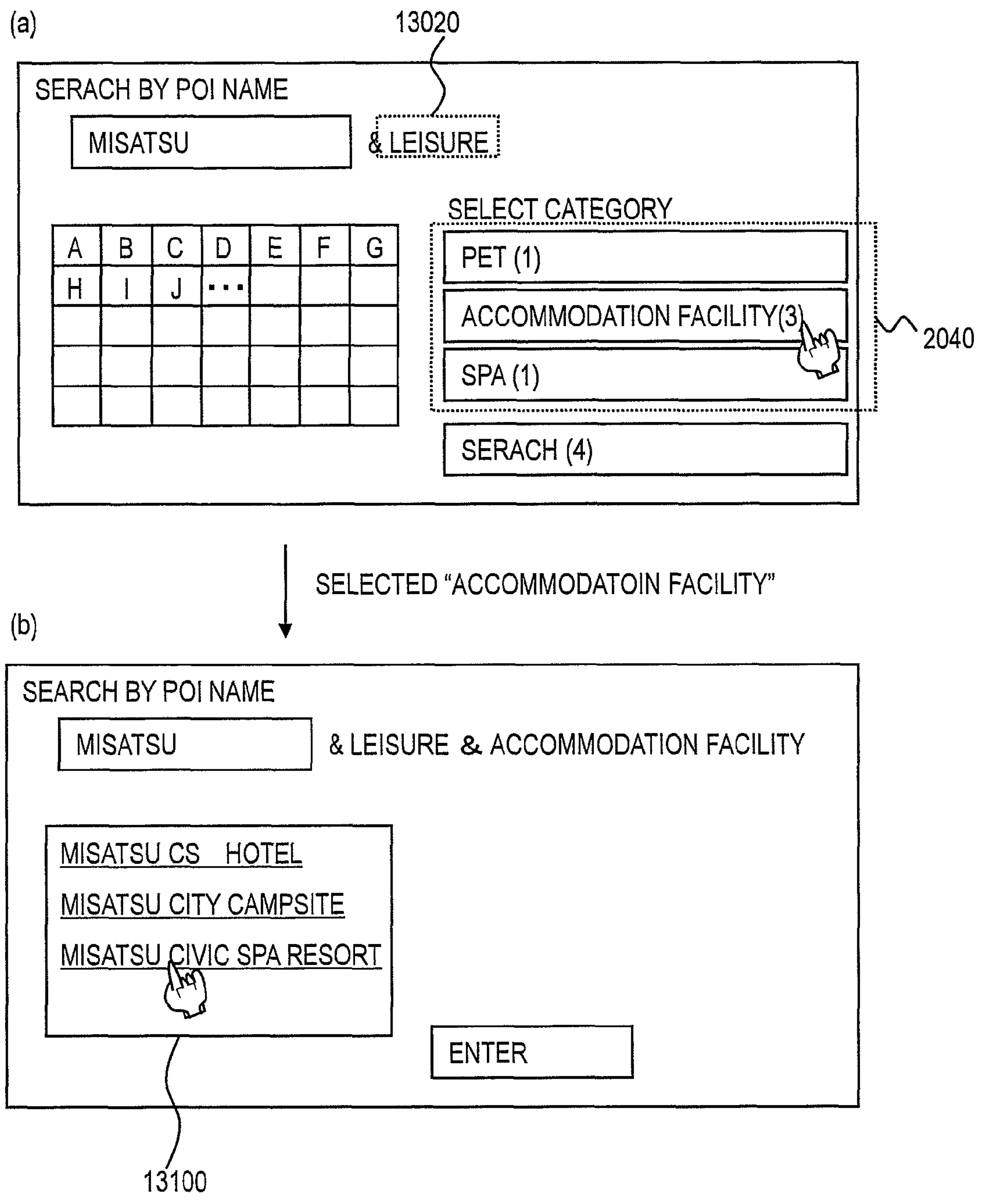
FIG. 14 is a screen image of the attribute words displayed on the display unit of the car navigation system according to the first embodiment of this invention.

Receiving these attribute words, the output unit 9 updates the display on the screen of the display unit 104 and produces the audio guidance from the speaker unit 111. The updated screen of the display unit 104 is illustrated in FIG. 14A. The display region 2040 displays the selected attribute words including "pet", "accommodation facility" and "spa", and the number of POIs is displayed in parentheses. In addition, as illustrated in a display region 13020, the attribute word that is already selected by the user may be displayed. FIG. 14A illustrates the first embodiment and is a screen image of the attribute words displayed on the display unit of the car navigation system, which illustrates the state where the attribute words are updated. FIG. 14B illustrates the first embodiment and is a screen image of the attribute words displayed on the display unit of the car navigation system, which illustrates the state where the POI name candidates are displayed as a list.

Further, the user selects "accommodation facility". Then, the number of remaining POIs becomes three. Therefore, the car navigation system 100 decides that the number of remaining POIs is sufficiently small and switches the display to one illustrated in FIG. 14B. Here, all the POI name candidates are displayed as a list in a display region 13100. When the user selects "Misatsu Civic Spa Resort" on this screen, the POI can be determined.

As described above, according to this embodiment, the attribute words to be used for the narrowing operation are dynamically selected from many attribute words according to the POI name candidate. Thus, it is possible to provide the attribute words that are always easy for the user to understand and have high narrowing efficiency.

(Continuous Input of Characters)

The embodiment described above is the case where the user selects the attribute word in the state where the attribute words are displayed as illustrated in FIG. 12. In contrast, according to this invention, the user can input the character string continuously even in the state where the attribute words are already displayed.

As an example of this case, it is supposed that the user presses the "C" to input in addition to the state of FIG. 12. This pressing operation is received by the input unit 1, and the input receiving unit 2 updates the POI name storing unit 31 to have "MISATSUC". On the other hand, the attribute word storing unit 32 is still vacant.

Next, the POI name retrieving unit 6 generates a list of POI names that partially match the character string "MISATSUC". This list is as illustrated in FIG. 15, in which eight POIs remain as candidates as illustrated in a POI name candidate 14010. In addition, displayed attribute words 14020 have at least one degree of relevance 3100 assigned with a value larger than zero with the POI name candidate. FIG. 15 illustrates the first embodiment and is an explanatory diagram illustrating a relationship among the POI name candidate generated by the POI name retrieving unit, the attribute word and the degree of relevance.

The attribute word generating unit 7 selects the attribute word to be output according to the procedure of the process illustrated in FIGS. 6A and 6B based on the degrees of relevance 3100 between the POI name candidate 14010 and the attribute word illustrated in FIG. 15. This procedure overlaps the above-mentioned procedure, and hence description thereof will be omitted. As a result of this process, three attribute words including "hospital", "monetary facility" and "leisure" are selected. Therefore, the attribute word generating unit 7 outputs the three attribute words to the output unit 9.

Figure 16:
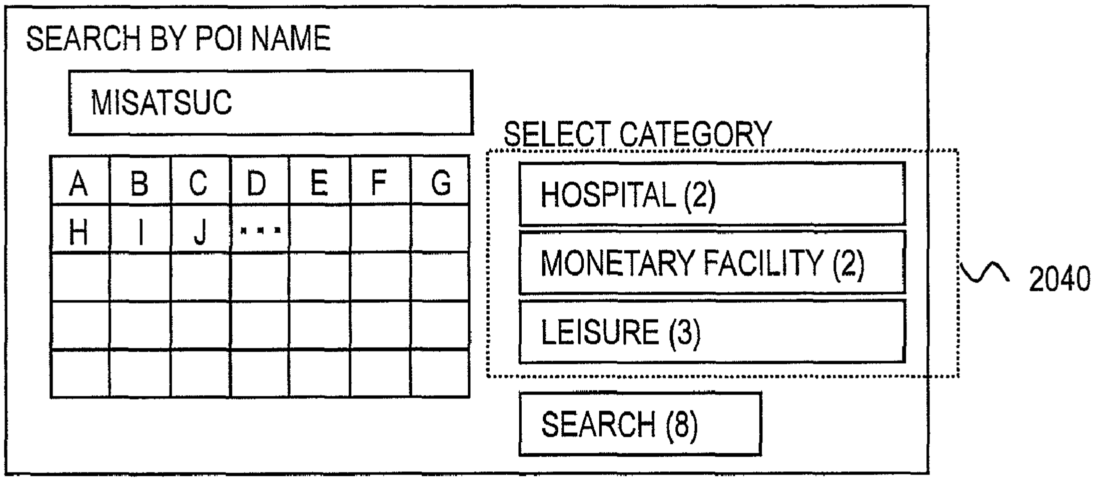
FIG. 16 is a screen image of the attribute words displayed on a display unit of the car navigation system according to the first embodiment of this invention.

Receiving these attribute words, the output unit 9 updates the display on the screen of the display unit 104 and produces the audio guidance from the speaker unit 111. The updated screen of the display unit 104 is illustrated in FIG. 16. FIG. 16 illustrates the first embodiment and is a screen image of the attribute words displayed on the display unit of the car navigation system, which illustrates the state where the attribute words are updated. The display region 2040 displays the selected attribute words including "hospital", "monetary facility" and "leisure", and the number of POIs is also displayed.

In this way, the attribute words that are shown to the user change to the combination having the maximum score every time the POI name candidate is changed. Thus, it is possible to provide the attribute words that are always easy for the user to understand and have high narrowing efficiency.

(Introduction of Threshold Value)

In the embodiment described above, all the POIs having the degree of relevance 3100 larger than zero are selected as POIs to be left as candidates when a certain attribute word is selected. This is because if the degree of relevance 3100 is larger than zero, it means that there is some relevance and that not a few users may select the attribute word for selecting the POI.

However, if the degree of relevance 3100 is extremely small, only greatly few users may consider that there is a relevance between the POI and the attribute word, and the extremely small degree of relevance 3100 may be assigned as a reflection of a result of the study. For instance, in the example illustrated in FIG. 5, the degree of relevance 3100 between the POI "Misatsu Animal Hospital" and the "general hospital" is assigned with only 0.05. This may be assigned as a reflection of a result of the study that there are greatly few users who have associated "Misatsu Animal Hospital" with "general hospital". However, a majority of the users do not consider that an animal hospital is a general hospital. Therefore, if "Misatsu Animal Hospital" remains as the POI name candidate when the attribute word "general hospital" is selected, a confusion may be caused on the contrary.

In order to deal with such a phenomenon, it is possible to adopt a method in which a low value of the degree of relevance 3100 is regarded as an irrelevance for selecting the attribute word. This method can be implemented by providing a threshold value with respect to the degree of relevance 3100. More specifically, when the threshold value of the degree of relevance 3100 regarded as an irrelevance is denoted by $T_{ignore}$, a redefined degree of relevance 3100 r'(L, a) is calculated as below with respect to the degree of relevance 3100 that is originally stored in the POI name database 8.

$$r'(l, a) = \begin{cases} r(l, a) & (\text{if } r(l, a) \geq T_{ignore}) \\ 0 & (\text{otherwise}) \end{cases} \qquad \text{[Equation 12]}$$

In other words, only the degrees of relevance 3100 that are larger than the threshold value are left, and others are regarded as zero. If the degrees of relevance 3100 redefined in this manner are used for selecting the attribute words, the user's confusion due to the extremely low degree of relevance 3100 can be avoided.

As described above, according to this invention, attribute words that the user can understand easily are shown to the user as the attribute word for narrowing so that the user can easily perform the narrowing operation even if many candidates of the POI name or the like are included in a result of retrieval. In other words, the conventional example uses predetermined attribute words with respect to the POI names for selecting the attribute word therefrom so as to perform the narrowing operation, but this invention can dynamically change POI name candidates to be shown according to the degree of relevance between the attribute word and the POI name candidate. Thus, the attribute words that the user can understand easily can be shown by priority as the attribute words for narrowing.

Second Embodiment

Morphemes

A second embodiment of this invention will be described. In this embodiment, morphemes that are obtained by dividing the POI name are used as the attribute words in the first embodiment.

In general, the POI name is expressed in a combined form of a plurality of words in many cases. Therefore, it is considered to divide the POI name into the word units and to use them as the attribute words as they are. The morpheme that is hereinafter referred to means a result of dividing the POI name into the word units.

When being divided into the morphemes, the POI name is divided at positions felt by the user to be natural.

In addition, as long as the POI name is divided at positions felt by the user to be natural, one morpheme may include a plurality of words. Otherwise, one word may be divided into a plurality of morphemes.

For instance, when the POI name "Misatsu Municipal Misatsu Business High School" is divided into morphemes, division into "Misatsu Munic" and "ipal" may be felt to be unnatural for the user, because a part that has no meaning singly, i.e., "ipal" is output. In this case, if it is divided into "Misatsu", "Municipal", "Misatsu", "Business", "High", and "School", the user may feel the division is natural.

(POI Name—Manner of Storing Data Between Morphemes and Static Table)

FIG. 17 illustrates the second embodiment of this invention and is an explanatory diagram illustrating a relationship among the POI name, the morphemes (attribute words) and the degree of relevance. FIG. 17 illustrates a table defining the degree of relevance with respect to the morphemes corresponding to the POI names 3020 illustrated in FIG. 4 of the first embodiment. In FIG. 17, reference numeral 16020 denotes a list of the morphemes. Reference numeral 16030 denotes the degree of relevance between each POI name 16010 and each morpheme. As the simplest method of deciding the degree of relevance 16030, the degree of relevance 16030 is decided to be one if a morpheme is included in the POI name while being decided to be zero if a morpheme is not included in the same. However, in FIG. 17, a continuous value from 0 to 1 is assigned. As the number of users who think the POI name includes the morphemes increases, the assigned value becomes larger.

For instance, it is supposed that every user knows that "hospital" is included in the name of the POI "Misatsu City Hospital". As a reflection of this, the degree of relevance 16030 is assigned with the largest value "1". On the other hand, it is supposed that 10% of users think "tozai" is not included in the name of the POI "Tozai Denden Land" and that the name is "Denden Land" or the like. In other words, it is supposed that 90% of users know that "tozai" is prefixed to the POI name. As a reflection of this, the degree of relevance 16030 is assigned with 0.9.

In addition, some morphemes are originally difficult for the user to recall. For instance, a morpheme such as "shop" or "corporation" is included in many POI names, but is not included in the POI name that the user actually recalls in many cases. Therefore, those morphemes that are difficult for the user to recall may not be stored in the POI name database 8 from the beginning.

(POI Name—Manner of Storing Data Between Morphemes and Dynamic Morpheme Division)

In addition, the method of dividing the POI name into morphemes is not limited to the method illustrated in FIG. 17 in which the table is stored in advance. It is possible to perform a dynamic morpheme division. The method of the morpheme division may be a known method. For instance, the method disclosed in "http://chasen.naist.jp/" or the like may be adopted.

For instance, the morphemes and word classes of the morphemes are stored as a dictionary, and a longest match method, a number of partitions minimizing method, or a minimum connecting cost method can be adopted for dividing the POI name into the morphemes. In addition, it is possible to use a set of word classes that are well suited to categorize divided strings of POI name. In the known document ("Company name analysis using Natural Language Processing", Shigehito Iwase, IEICE Transactions on Information and Systems, vol. J82-DII, No. 8, pp. 1305-1314, 1999) discloses the study of semantic categories when the POI name is divided.

If the semantic categories described in this document are used as the word classes, the word class "proper name", for example, is considered to be easy for the user to recall the POI and thus can be assigned with a high degree of relevance. In contrast, the word class "occupational desinence" is considered to be difficult for the user to recall the POI, and thus can be assigned with a low degree of relevance.

(Specific Process Flow)

Next, supposing that the user want to set "Tozai Denryoku Hospital" as a destination and that the user has input the character string "TOZAID" with the touch panel of the car navigation system 100, the process will be described.

The car navigation system 100 to be used is similar to that illustrated in FIG. 2. The description about FIG. 2 has been made in the first embodiment, and hence the overlapping description will be omitted here.

The user inputs the character string "TOZAID" with the touch panel using the alphabet table displayed on the screen of the display unit 104. The character string is stored in the POI name storing unit 31 of the input storing unit 3 by operations of the input unit 1 and the input receiving unit 2 illustrated in FIG. 2 of the first embodiment. It should be noted that the attribute word is not selected in particular, and hence the attribute word storing unit 32 is vacant.

The POI name retrieving unit 6 compares the input character string "TOZAID" with the POI name stored in the POI name database 8 so as to retrieve the POI names that partially match.

The processing method of the attribute word generating unit 7 will be described. The procedure of the process is similar to that of the first embodiment. The flowchart of the process is also similar to that illustrated in FIGS. 6A and B.

The POI name retrieving unit 6 retrieves the POIs that partially match the character string "TOZAID", and it is supposed that 31 POI name candidates are obtained. In addition, it is supposed that only the morphemes having the degree of relevance larger than zero between the morphemes and the POI name candidate are extracted and that the degrees of relevance between the POI and the morpheme are as illustrated in FIG. 18. It should be noted that in a POI name 17010 illustrated in FIG. 18, the separator between morphemes is indicated by "/". FIG. 18 illustrates the second embodiment and is an explanatory diagram illustrating the morphemes of the POI name and a relationship between the morpheme and the degree of relevance.

It is supposed that the attribute word generating unit 7 selects three morphemes 17020 as the attribute words for the narrowing operation from the morphemes. Further, the attribute word generating unit 7 calculates the score by a method similar to that of the first embodiment with respect to a combination of the morphemes, and outputs the combination of the morphemes having the highest score. The method of calculating the score is the same as that of the first embodiment, and hence the overlapping description is omitted here.

FIG. 19 illustrates the second embodiment and is an explanatory diagram in which the POI name candidates are arranged in the descending order of the scores for the combinations of the morphemes. FIG. 19 is a diagram in which the POI name candidates illustrated in FIG. 18 are arranged in the descending order of the scores for the combinations of the morphemes after the score calculation is performed. It should be noted that weights are calculated according to values denoted by 18020. The combination of the morphemes having the highest score is the combination of "dejima", "denryoku" and "design" denoted by 18010. Therefore, the attribute word generating unit 7 outputs the three morphemes to the output unit 9.

Figure 20:
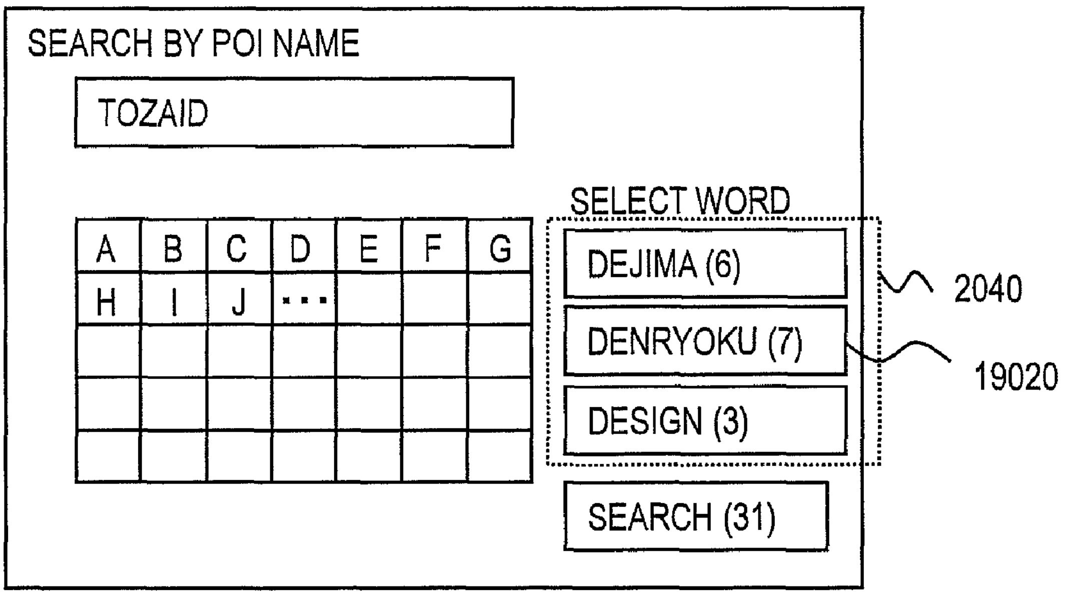
FIG. 20 is a screen image of the attribute words displayed on a display unit of the car navigation system according to the second embodiment of this invention.

Receiving those morphemes, the output unit 9 displays the morphemes on the screen of the display unit 104. At the same time, the speaker unit 111 may produce from the speaker the audio guidance such as "The narrowing operation will be started from any one of Dejima, Denryoku and Design". The updated screen of the display unit 104 is illustrated in FIG. 20. FIG. 20 illustrates the second embodiment and is an screen image of the attribute words displayed on the display unit of the car navigation system, which illustrates the state where the attribute words are updated. As illustrated in the display region 2040, the three morphemes, i.e., "dejima", "denryoku" and "design" selected by the attribute word generating unit 7 are displayed. In addition, the number of POIs having the degree of relevance assigned with a value larger than zero with respect to each morpheme is also displayed in parentheses.

In this state, it is supposed that the user selects "denryoku" from the three morphemes and presses a button 19020 on the screen illustrated in FIG. 20.

This pressing is received by the input unit 1 and is stored in the attribute word storing unit 32 by the input receiving unit 2.

Next, the POI name retrieving unit 6 generates a list of POI names that partially match the character string "TOZAID" and have the degree of relevance larger than zero with respect to the morpheme "denryoku". This list is as illustrated in FIG. 21, which includes seven POI names 20010 remaining as candidates. FIG. 21 illustrates the second embodiment and is an explanatory diagram illustrating the POI name candidates and a relationship between the morpheme and the degree of relevance. In addition, an attribute word 20020 has at least one degree of relevance assigned with a value larger than zero between the morpheme and the POI name candidate. In addition, "denryoku" that is already selected and "tozai" included in every POI name are eliminated.

The attribute word generating unit 7 selects the morphemes to be shown among the degrees of relevance between the POI name candidate and the attribute word illustrated in FIG. 21 according to the first embodiment. This procedure is the same as the procedure described above, and hence the overlapping description will be omitted. As a result of this process, three morphemes of "resort", "hospital" and "bank" are selected.

Therefore, the attribute word generating unit 7 outputs the three attributes to the output unit 9.

Figure 22:
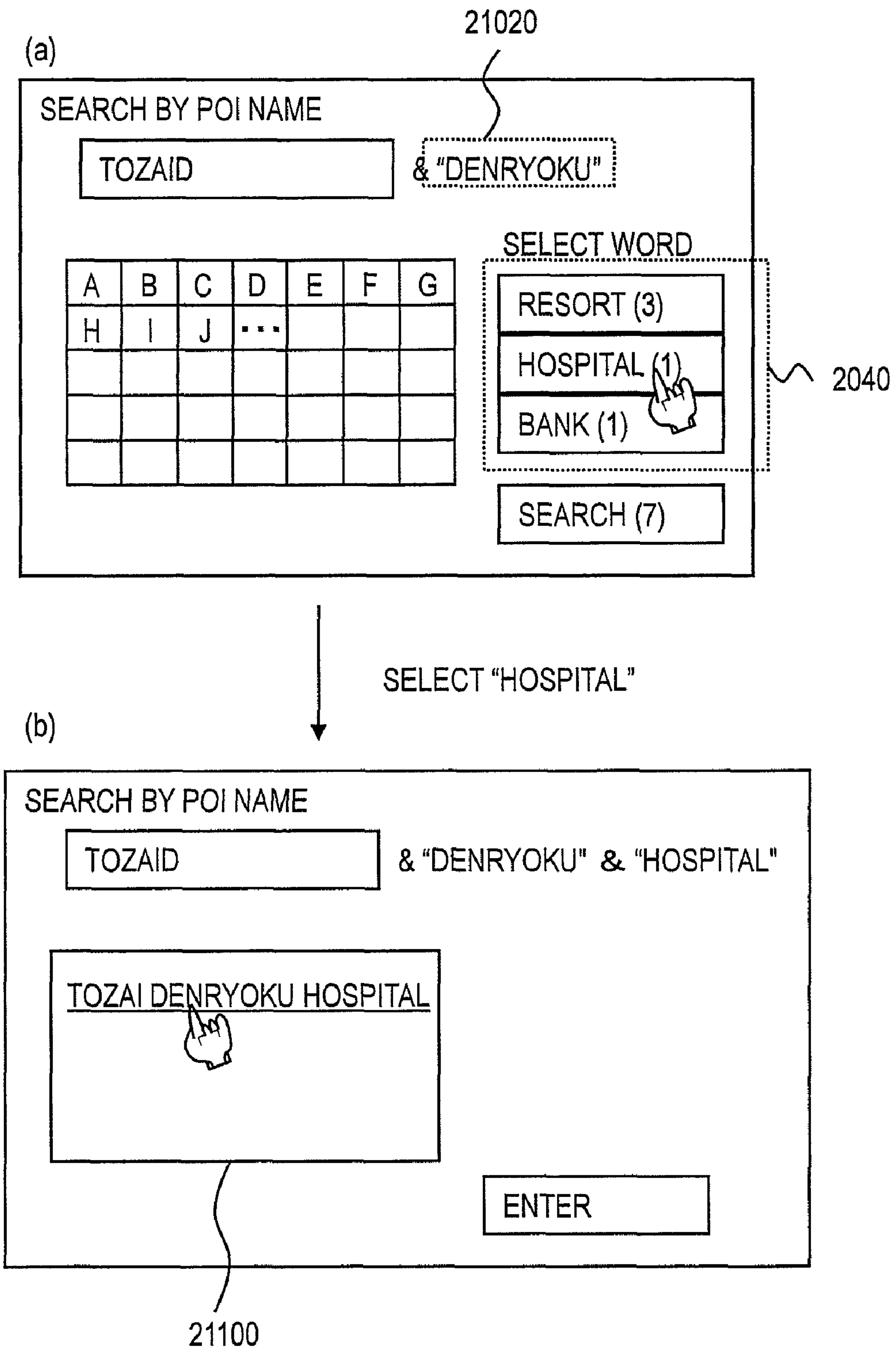
FIG. 22 is a screen image of the attribute words displayed on the display unit of a car navigation system according to the second embodiment of this invention.

Receiving those attributes, the output unit 9 updates the display on the screen of the display unit 104 and outputs the audio guidance. FIG. 22A illustrates the second embodiment and is a screen image of the attribute words displayed on the display unit of the car navigation system, which illustrates the state where the attribute words are updated. FIG. 22B illustrates the second embodiment and is a screen image of the attribute words displayed on the display unit of the car navigation system, which illustrates an example of a list display of the POI name candidates. The updated screen of the display unit 104 is illustrated in FIG. 22A. The display region 2040 displays the selected attribute words, i.e., "resort", "hospital" and "bank", and the number of POIs is also displayed. In addition, as illustrated in a display region 21020, the morpheme that is already selected by the user may be displayed.

Further, the user selects "hospital". Then, the number of the remaining POIs becomes one, and the display is changed to the list display of the POI name candidates (FIG. 22B). Here, the user selects "Tozai Denryoku Hospital" so that the POI can be decided.

In addition, if the user continuously inputs the POI name on the screen illustrated in FIG. 20 (for example, if the user inputs "EN"), the display of the morphemes for the narrowing operation is changed every time. This method is the same as that described in the first embodiment, and hence the overlapping description will be omitted.

As described above, using the morphemes each of which is a part of the POI name as the attribute words to be used for the narrowing operation, it is possible to narrow the POIs efficiently and in a manner that is easy for the user to understand.

(Description of Abbreviation and Paraphrase)

It should be noted that the degree of relevance may be assigned to the morpheme that is not necessarily included in the POI name as the relationship between the POI name and the morpheme illustrated in FIG. 17. For instance, if a majority of users accept an abbreviation "Toden" for "Tozai Denryoku" of the POI name, it is possible to prepare "Toden" as the morpheme and to assign the degree of relevance thereto. In addition, if a majority of users accept an abbreviation "TDL" for the POI name "Tozai Denden Land", it is possible to prepare "TDL" as the morpheme and to assign the degree of relevance thereto.

As described above, dynamically changing the attribute words (morphemes) to be shown to the user among the morphemes of the POI names according to the degree of relevance of the morphemes, the attribute words that the user can understand easily can be shown by priority as the attribute words for narrowing.

Third Embodiment

Use of "Otherwise" Attribute

A third embodiment of this invention will be described. In this embodiment, the attribute words to be shown to the user for the narrowing operation include an "otherwise" attribute that indicates not to belong to any attribute word, whereby the user can easily perform the narrowing operation.

This embodiment is different from the structure of the first embodiment illustrated in FIG. 2 in the method of selecting the attributes to be shown in the attribute word generating unit 7. Therefore, the processing method of the attribute word generating unit 7 will be described.

As a precondition, it is supposed that the user inputs "MISATSU" as a character string of the POI name (FIG. 3). As a result, the POI name storing unit 31 stores the character string "MISATSU". In addition, the attribute word storing unit 32 is vacant in an initial state.

It is supposed that the POI name retrieving unit 6 retrieves the POI name that partially matches the character string "MISATSU", and that thirteen POI name candidates are obtained. In addition, it is supposed that only the attribute words having the degree of relevance 3100 larger than 0 with respect to the POI name candidate are extracted among the attribute words, and that sixteen attribute words are extracted, with the degree of relevance 3100 between the POI name candidate and the attribute word as illustrated in FIG. 5.

It is supposed that the attribute word generating unit 7 selects two attribute words as the attribute word for narrowing from the above-mentioned sixteen attribute words.

Each symbol is defined as follows as in the first embodiment of this invention.

A total number of the attribute words is denoted by M (M=16 in this embodiment).

The number of attribute words to be displayed is denoted by m (m=2 in this embodiment).

The number of candidate POIs is denoted by n (n=13 in this embodiment).

The POI name is denoted by $L_i$ (i=1, 2, . . . n).

Figure 23A:
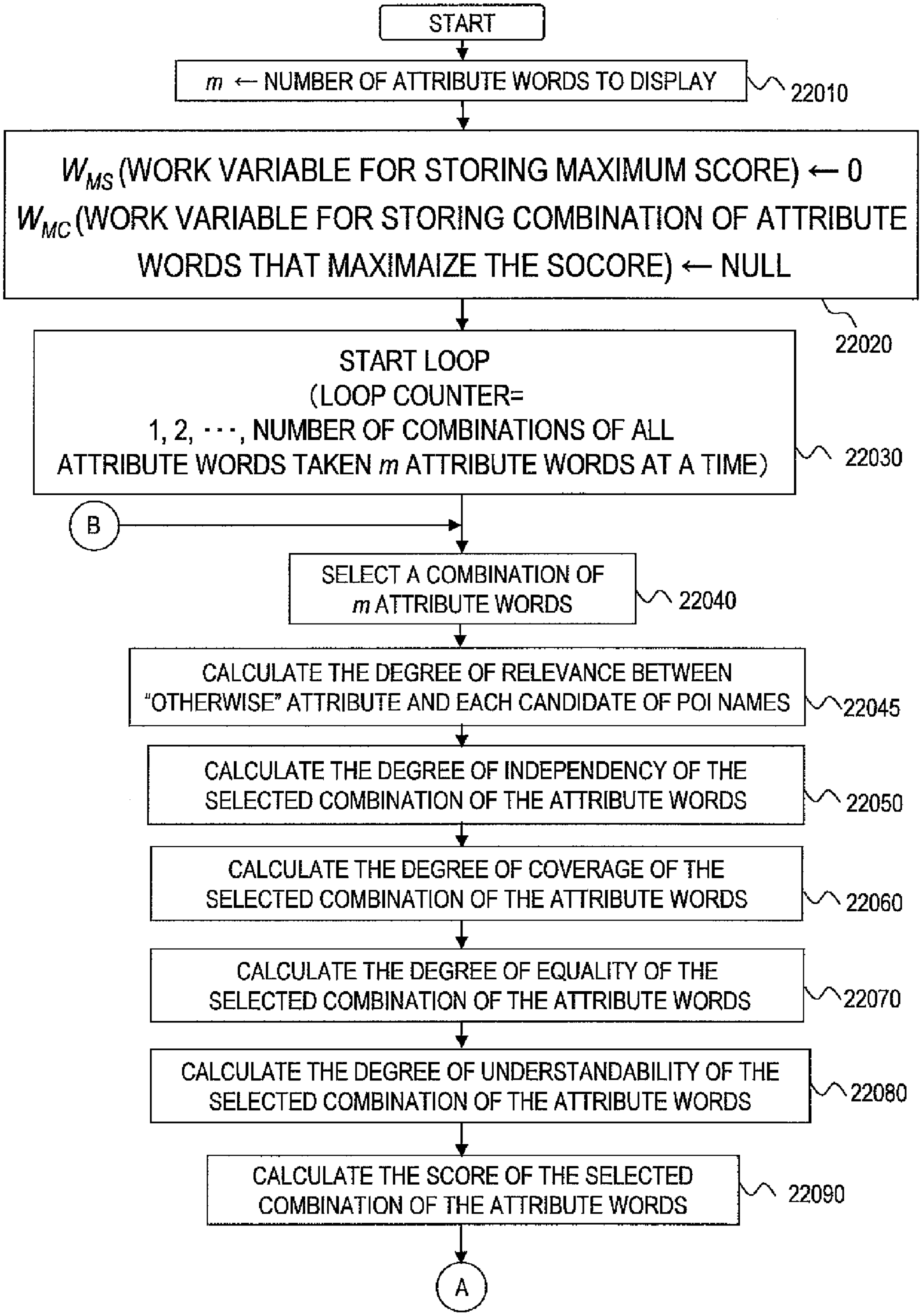
FIGS. 23A and 23B are flowcharts illustrating an example of a process performed in an attribute word generating unit according to a third embodiment of this invention.
Figure 23B:
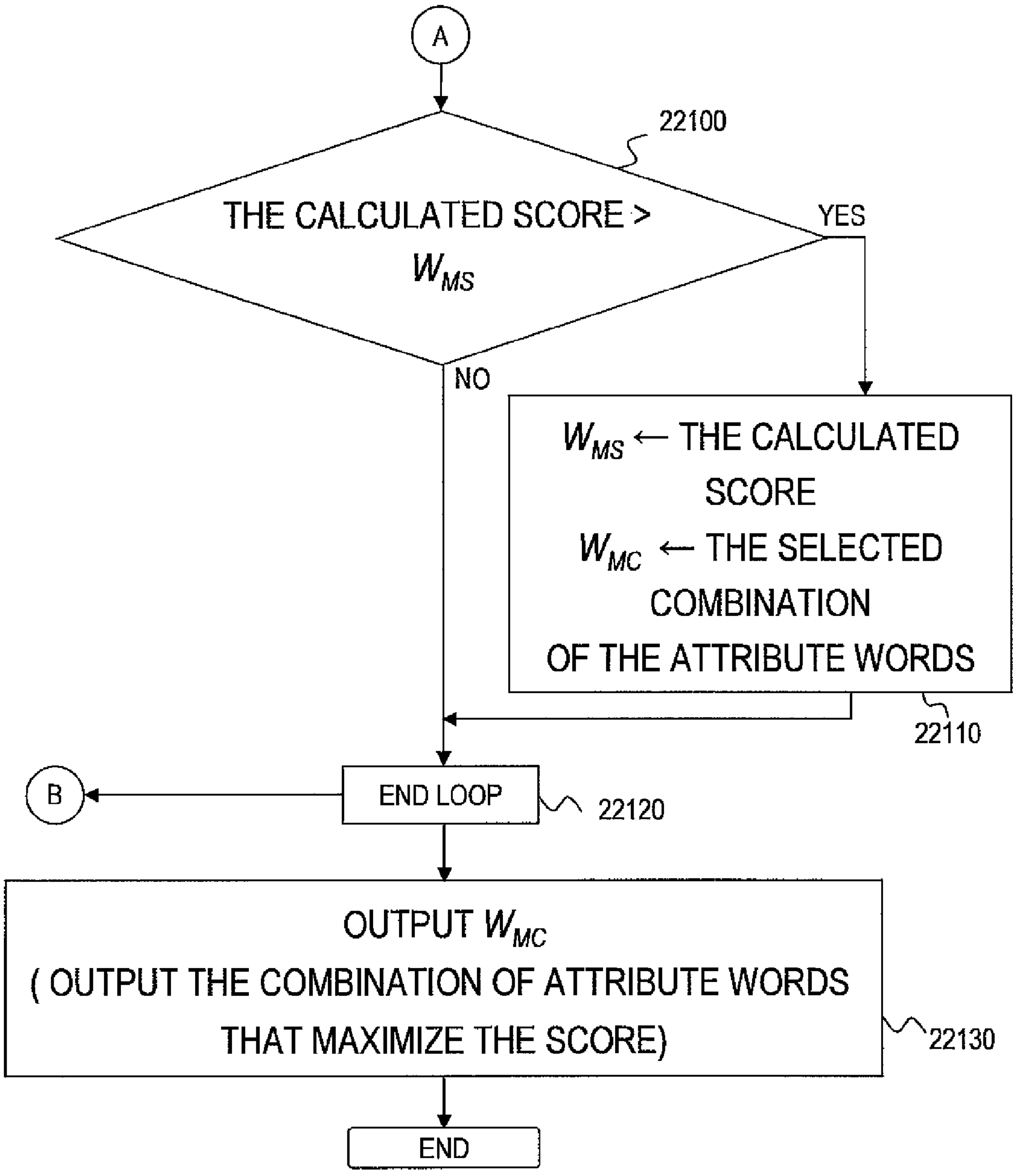

A flowchart of the process of the attribute word generating unit 7 is illustrated FIGS. 23A and 23B. FIGS. 23A and 23B illustrate the third embodiment and is a flowchart illustrating an example of the process performed in the attribute word generating unit 7.

First, in Step 22010 of FIG. 23A, the number of the attribute words to be displayed is set. Here, the number of the attribute words (m) is set to be two.

In Step 22020, a maximum score is reset, and a variable for storing combinations of attribute words to be displayed is reset.

In Step 22030, a loop is started. In one loop, arbitrary n attribute words are extracted from M attribute words. This loop is repeated for every combination of m attribute words. Therefore, the number of times repeating the loop is as below.

$$_{M}C_{m}=\frac{M!}{m!(M-m)!} \quad \text{[Equation 13]}$$

In Step 22040, arbitrary m attribute words are extracted from M attribute words. The attribute words extracted here may be denoted by $a_i$ (i=1, 2, . . . m). In addition, the degree of relevance between the POI name L and the attribute a is denoted by r(L, a).

(Calculation of Degree of Relevance for "Otherwise" Attribute)

In Step 22045, the POI that does not correspond to the combination of the m attribute words extracted in the above-mentioned Step 22040 is retrieved, and the POI is assigned with the degree of relevance with respect to the "otherwise" attribute.

First, the "otherwise" attribute is denoted by $a_{otherwise}$. The degree of relevance 3100 $r(L_i, a_{otherwise})$ between the POI name $L_i$ and the "otherwise" attribute $a_{otherwise}$ is calculated by the equation below.

[Equation 14]

$$r(l_i, a_{otherwise}) = \left(1 - \max_j(r(l_i, a_j))\right) \cdot H_1\left(1 - \max_j(r(l_i, a_j)) - T\right)$$

In other words, the largest degree of relevance among the attribute words that characterize a certain POI is determined. Then, a value is determined by subtracting the largest degree of relevance from one. If this value is larger than a threshold value (T), the value is determined to be the "degree of relevance of the "otherwise" attribute". On the contrary, if the value is lower than the threshold value, the degree of relevance of the "otherwise" attribute is not assigned so as to be zero.

If the degree of relevance between the POI and the "hotel" attribute is 0.9, the degree of relevance between the POI name and the "otherwise" attribute becomes 0.1 without a threshold value. This means that the POI may be a "hotel" or may be "otherwise" that means not to belong to any attribute word. In this case, the user may be confused if the two attribute words of "hotel" and "otherwise" are shown to the user. Therefore, the threshold value is provided. If the degree of relevance with respect to the attribute word already has some extent of value, the degree of relevance with respect to the "otherwise" attribute is not assigned.

An example of calculating the "otherwise" attribute is illustrated in FIG. 24. FIG. 24 illustrates the third embodiment and is an explanatory diagram illustrating a calculation result of the degree of relevance between the POI name candidate and the attribute word. Here, the degree of relevance of the "otherwise" attribute is illustrated (23010 of FIG. 24) in the case where "accommodation facility" and "public institution" are selected as a combination of the attribute words. It should be noted that the calculation is performed under the condition of the threshold value of 0.5 that is set in advance.

(Calculation of Degree of Independency)

In Step 22050, the degree of independency with respect to the combination of the attribute words is calculated. The meaning of the degree of independency is the same as that of the first embodiment, but the "otherwise" attribute is also regarded as one of the attribute words for the calculation.

First, the number of attribute words including the "otherwise" attribute that are assigned to each of the POI names having the degree of relevance is counted. Then, only if a result of the counting is one or larger, one is subtracted from the value. The calculation result of the degree of independency of the attribute word is denoted by $C'_{IND}(L_i)$. The specific calculation equation is as below.

[Equation 15]

$$C'_{IND}(l_i) = \sum_{j=1}^{m} H_0(r(l_i, a_j)) + H_0(r(l_i, a_{othewise})) - H_1\left(\left(\sum_{j=1}^{m} H_0(r(l_i, a_j))\right) + H_0(r(l_i, a_{otherwise}) - 1)\right)$$

The values of $C'_{IND}(L_i)$ are summed up for all the POI name candidates. The sum value is normalized by the number of POIs and one is subtracted from the same for defining the result as the degree of independency $P_{IND}$.

[Equation 16]

$$p_{IND} = 1 - \frac{1}{n}\sum_{i=1}^{n} C'_{IND}(l_i)$$

The calculation example of the degree of independency $P_{IND}$ in the case where "accommodation facility", "public institution" and "otherwise" attribute are combined as the attribute words is illustrated in FIG. 25. FIG. 25 illustrates the third embodiment and illustrates a relationship among the POI name candidate, the attribute word and the degree of independency. FIG. 25 also illustrates an example of the calculation result of the degree of independency $P_{IND}$ in the case where "accommodation facility", "public institution" and "otherwise" attribute are combined as the attribute words. The meaning of the degree of coverage is the same as that of the first embodiment.

(Calculation of Degree of Coverage)

In Step 22060 of FIG. 23A, the degree of coverage with respect to the combination of the attribute words is calculated.

The number of POIs in each of which the degree of relevance 3100 assigned with a value larger than zero for at least one attribute is counted for each POI name $L_i$. A result of the counted number of POIs is denoted by $C'_{EXH}(L_i)$, which is calculated by the equation below.

[Equation 17]

$$C'_{EXH}(l_i) = H_0\left(\sum_{j=1}^{m} H_0(r(l_i, a_j))\right)$$

The calculated values for all POI name candidates are summed up. If the sum value is large, it means that many POIs can be covered by the combination of the attribute words, and that there is a small number of POIs that are excluded from the narrowing by the selection of any one of attribute words. The sum value is normalized by the number of POIs so as to define it as the degree of coverage $p_{EXH}$.

[Equation 18]

$$p_{EXH} = \frac{1}{n}\sum_{i=1}^{n} C'_{EXH}(l_i)$$

The calculation example of the degree of coverage in the case where "accommodation facility" and "public institution" are combined as the attribute words is illustrated in FIG. 26. FIG. 26 illustrates the third embodiment and illustrates a relationship among the POI name candidate, the attribute word and the degree of coverage. FIG. 26 also illustrates an example of the calculation result of the degree of coverage in the case where "accommodation facility" and "public institution" are combined as the attribute words.

(Calculation of Degree of Equality)

In Step 22070 of FIG. 23A, the degree of equality with respect to the combination of the attribute words is calculated. The meaning of the degree of equality is the same as that of the first embodiment, but the calculation is performed by regarding the "otherwise" attribute as one of the attribute words.

First, the number of POIs having the degree of relevance that is assigned with a value larger than zero is counted for each attribute word $a_i$. Also for the "otherwise" attribute $a_{otherwise}$, the number of POIs assigned with a value larger than zero is counted. When the values are respectively denoted by $D'_{EQU}(a_i)$ and $D'_{EQU}(a_{otherwise})$, the values are calculated by the equation below.

[Equation 19]

$$\begin{cases} D'_{EQU}(a_i) = \sum_{j=1}^{n} H_0(r(l_j, a_i)) \\ D'_{EQU}(a_{otherwise}) = \sum_{j=1}^{n} H_0(r(l_j, a_{otherwise})) \end{cases}$$

Next, standard deviations of $D'_{EQU}(a_i)$ and $D'_{EQU}(a_{otherwise})$ are calculated. Further, the standard deviations are normalized by the number of POIs, and is subtracted from one for calculating the degree of equality $p_{EQU}$.

[Equation 20]

$$p_{EQU} = 1 - \frac{1}{n}\sqrt{\frac{1}{m+1}\left(\sum_{i=1}^{m} (D'_{EQU}(a_i) - d)^2 + (D'_{EQU}(a_i) - d)^2\right)}$$

Here, d is calculated by the equation below.

[Equation 21]

$$d = \frac{1}{m+1}\left(\sum_{j=1}^{m} D'_{EQU}(a_j) + D'_{EQU}(a_{otherwise})\right)$$

The calculation example of the degree of equality in the case where "accommodation facility", "public institution" and "otherwise" attribute are combined as the attribute words is illustrated in FIG. 27. FIG. 27 illustrates the third embodiment and illustrates a relationship among the POI name candidate, the attribute word and the degree of equality. FIG. 27 also illustrates an example of the calculation result of the degree of equality in the case where "accommodation facility", "public institution" and "otherwise" attribute are combined as the attribute words.

(Calculation of Degree of Understandability)

In Step 22080 of FIG. 23A, the degree of understandability for the combination of the attribute words is calculated. The meaning of the degree of understandability is the same as that of the first embodiment, but the calculation is performed by regarding the "otherwise" attribute as one of the attribute words.

First, an average value of the degrees of relevance is calculated with respect to only the POIs having the degree of relevance assigned with a value larger than zero for each attribute word. In addition, an average value of the degrees of relevance is calculated with respect to the POIs having the degree of relevance assigned with a value larger than zero with the "otherwise" attribute $a_{otherwise}$. When each average value is denoted by $D'_{EAS}(a_i)$, each average value is calculated by the equation below.

[Equation 22]

$$\begin{cases} D'_{EAS}(a_i) = \sum_{j=1}^{n} r(l_j, a_i) \Big/ \sum_{j=1}^{n} H_0(r(l_j, a_i)) \\ D'_{EAS}(a_{otherwise}) = \sum_{j=1}^{n} r\left(l_j, a_{otherwise}\right) \Big/ \sum_{j=1}^{n} H_0\left(r\left(l_j, a_{otherwise}\right)\right) \end{cases}$$

Therefore, those average values are normalized by the number of the attribute words so as to define the degree of understandability $p_{EAS}$.

[Equation 23]

$$p_{EAS} = \frac{1}{m+1}\left(\sum_{i=1}^{m} D'_{EAS}(a_i) + D'_{EAS}(a_{otherwise})\right)$$

The calculation example of the degree of understandability in the case where "accommodation facility", "public institution" and "otherwise" attribute are combined as the attribute words is illustrated in FIG. 28. FIG. 28 illustrates the third embodiment and illustrates a relationship among the POI name candidate, the attribute word and the degree of understandability. FIG. 28 also illustrates an example of the calculation result of the degree of understandability in the case where "accommodation facility", "public institution" and "otherwise" attribute are combined as the attribute words.

(Calculation of Score)

In Step 22090 of FIG. 23A, the individual indicators calculated above are assessed integrally, so as to calculate a score with respect to one combination of the attribute words. Here, weighted adding of the indicators is performed so as to determine the score. The score S for one attribute word combination is calculated by the equation below.

$$S = w_{IND} \cdot p_{IND} + w_{EXH} \cdot p_{EXH} + w_{EQU} \cdot p_{EQU} + w_{EAS} + p_{EAS}$$ [Equation 24]

Here, $w_{IND}$, $w_{EXH}$, $w_{EQU}$, $w_{EAS}$ denote weights of the degree of independency, the degree of coverage, the degree of equality and the degree of understandability, respectively.

In Steps 22100 and 22110, if a result of the score calculation till then exceeds the maximum score, the maximum score is updated, and the attribute word combination stored as an attribute word combination to be shown is also updated.

Step 22120 is a termination of the loop. The score S is calculated for every attribute word combination, and the process of Steps 22040 to 22110 is repeated until the attribute word combination to be the maximum score is determined.

(Output of Attribute Word Having Maximum Score)

In Step 22130, the combination of the attribute words to be the maximum score is output to the output unit 9. Thus, the attribute word for the narrowing is shown on the screen, and hence the user can perform the narrowing.

FIG. 29 illustrates the third embodiment and is an explanatory diagram illustrating an example of the score calculation with respect to a combination of two attribute words and the "otherwise" attribute in the descending order of the scores. FIG. 29 is a diagram in which the POI name candidates illustrated in FIG. 5 are arranged in the descending order of the scores for the combinations of the two attribute words and the "otherwise" attribute after the score calculation. It should be noted that the weight $w_{EXH}$ is calculated according to the value illustrated in a weight 28020. If the "otherwise" attribute is used, the POI that is not included in any one of the attribute words can also be included by the "otherwise" attribute. Therefore, the degree of coverage is not so important. As a reflection of this, the weight of the degree of coverage in the weight 28020 is set to be a value smaller than the value in the first embodiment (weight 10020 of FIG. 11).

The combination of the attribute words having the highest score is one including "hospital", "leisure" and "otherwise" attribute as denoted by an attribute combination 28010. Therefore, the attribute word generating unit 7 outputs the three attribute words to the output unit 9.

Receiving the attribute words, the output unit 9 displays the attribute words on the screen of the display unit 104. Simultaneously, the speaker of the speaker unit 111 may produce audio guidance like "The narrowing operation will be started from any one of hospital, leisure and otherwise".

Figure 30:
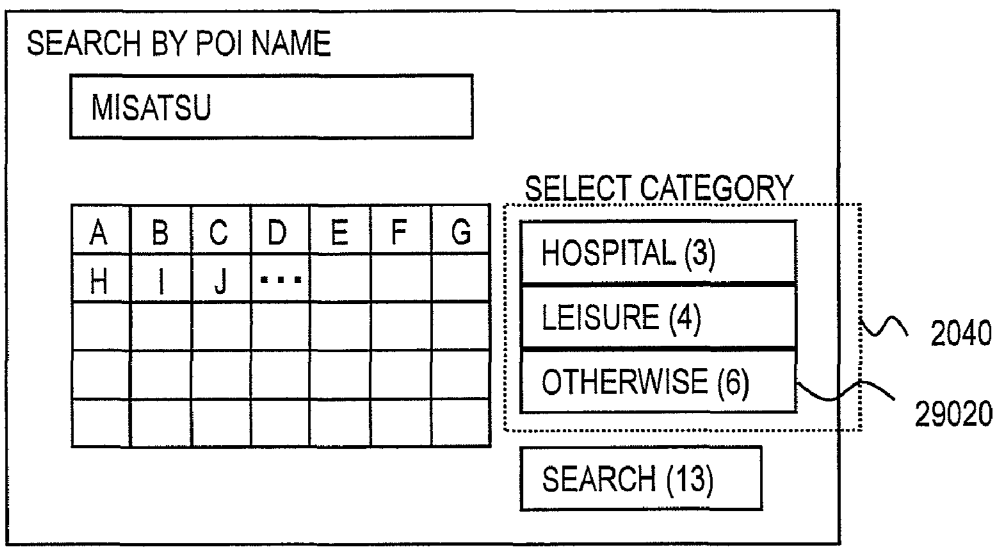
FIG. 30 is a screen image of the attribute words displayed on the display unit of a car navigation system according to the third embodiment of this invention.

The updated screen of the display unit 104 is illustrated in FIG. 30. FIG. 30 illustrates the third embodiment and is a screen image of the attribute words displayed on the display unit of the car navigation system, which illustrates the state where the attribute words are updated. The display region 2040 displays the "hospital", "leisure" and "otherwise". When "otherwise" is selected, the POI that does not belong to "hospital" nor "leisure" as the POI name candidate remains as a candidate.

(Case where Attribute Word for Narrowing is Selected)

The process when the user selects "otherwise" (i.e., presses a button 29020 of FIG. 30) will be described.

This pressing is received by the input unit 1, and "otherwise" is stored in the attribute word storing unit 32 by the input receiving unit 2.

Next, the POI name retrieving unit 6 generates a list of the POIs having the "otherwise" attribute assigned with a value in the POI name candidate selected before, so as to make the new POI name candidate.

The attribute word generating unit 7 selects the attribute word to be shown according to the procedure of the process illustrated in FIGS. 23A and 23B among the degrees of relevance between the POI name candidate and the attribute word. This procedure overlaps the above-mentioned procedure, and hence description thereof will be omitted. As a result of this process, the attribute word is selected.

After that, the process is followed by the update of the screen and the user's selection. The process procedure thereof is the same as the that in the first embodiment described above, and hence the overlapping description will be omitted.

As described above, the calculation is performed by regarding the "otherwise" attribute as one of the attribute words, whereby the attribute words to be used for the narrowing operation can be shown as a combination that is easy for the user to understand. In addition, the "otherwise" attribute can be selected so that the POI that does not belong to any attribute word can be selected. Thus, the function that is easy for the user to understand and has a high narrowing efficiency can be provided.

Fourth Embodiment

Selection of Use or Nonuse of "Otherwise"

A fourth embodiment of this invention will be described. In this embodiment, the selection of the attribute word described in the first embodiment and the selection of the attribute word using the "otherwise" attribute described in the third embodiment are both used, and it is evaluated which one acquires a higher score so that the attribute word to be displayed is selected.

This embodiment can be described as the car navigation system 100 in which the process of the attribute word generating unit 7 described in the first embodiment is modified, and hence the description of other portions will be omitted.

Figure 31:
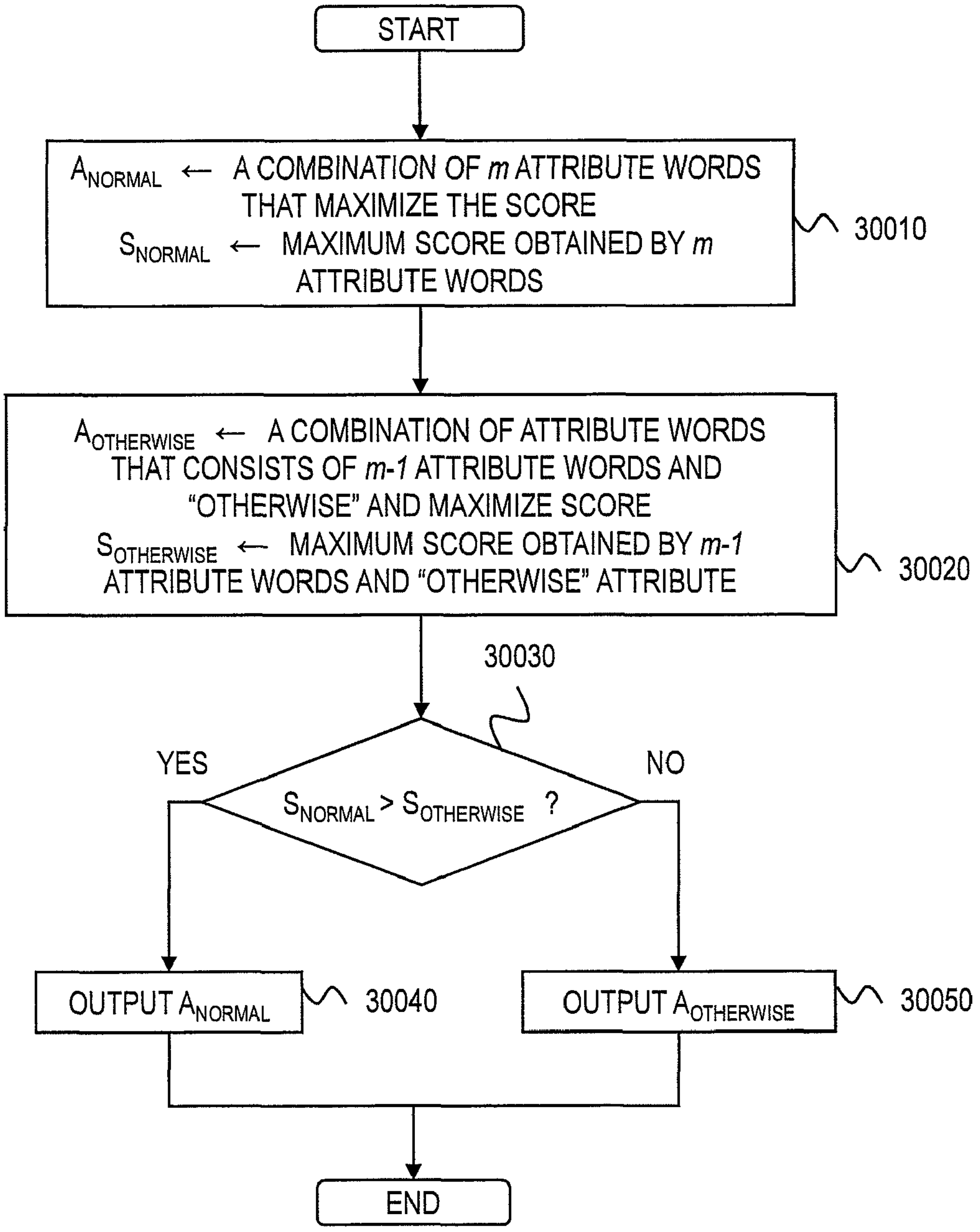
FIG. 31 is a flowchart illustrating an example of a process performed in an attribute word generating unit according to the third embodiment of this invention.

FIG. 31 illustrates the fourth embodiment and is a flowchart illustrating an example of the process performed in the attribute word generating unit 7. As a precondition for performing the flowchart of FIG. 31, it is supposed that the user has finished the character input, and that the POI name retrieving unit 6 has output the plurality of POI name candidates to the attribute word generating unit 7.

In Step 30010, a combination of the attribute words that maximize the score in the combination of the m attribute words is calculated from the POI name candidates. This computation is performed by calling the subroutine of the process of FIGS. 6A and 6B described in the first embodiment. The combination of attribute words obtained in this computation is denoted by $A_{normal}$, and the maximum score is denoted by $S_{normal}$.

In Step 30020, a combination of the attribute words that maximize the score is calculated from the POI name candidates by the combination of the $m^{-1}$ attribute words and the "otherwise" attribute. This computation is performed by calling the subroutine of the process of FIGS. 23A and 23B described in the third embodiment. The combination of attribute words obtained in this computation is denoted by $A_{otherwise}$, and the highest score is denoted by $S_{otherwise}$.

In Step 30030, both the scores are compared with each other.

Step 30040 is the process when the score of $S_{normal}$ is larger than the other. In this case, $A_{normal}$ is output to the output unit 9.

Step 30050 is the process when the score of $S_{otherwise}$ is larger than the other. In this case, $A_{otherwise}$ is output to the output unit 9.

As described above, in the fourth embodiment, the scores are compared between the case where the "otherwise" attribute is used and the case where the "otherwise" attribute is not used, whereby the attribute word having a higher score is shown to the user. Thus, the attribute word that is easier for the user to understand and has a high narrowing efficiency can be shown to the user.

It should be noted that it is predicted that the scores are different from each other between the score computations in Steps 30010 and 30020 described above. Therefore, it is possible to adjust the weight to be used for the score calculation to be an appropriate value in advance.

Fifth Embodiment

Use of a Set of Different Attributes

A fifth embodiment of this invention will be described. In this embodiment, the attribute words are classified into some types in advance. The maximum score with respect to the attribute word combination of each type is calculated, and the maximum scores are compared with each other. The attribute word combination of the type having the highest score is shown to the user.

This embodiment can be described as a modification of the process of the attribute word generating unit 7 and an addition of data of the POI name database 8 in the car navigation system 100 described in the first embodiment, and hence the description of other portions will be omitted.

FIG. 32 illustrates a list of association between the type of the attribute and the attribute word. FIG. 32 illustrates the fourth embodiment and is an explanatory diagram illustrating a relationship between the attribute set and the attribute word. Here, the type of the attribute word is referred to as the attribute set (31010). The attribute words corresponding to each attribute set 31010 are stored as denoted by 31020. As an example here, it is supposed that there are two types of attribute sets, i.e., "category" that is the attribute set 31010 related to the genre of the POI and "morpheme" that is the attribute set 31010 of the morpheme of the POI name. This list of association is stored in the POI name database 8 together with the attribute word. Further, a plurality of attribute sets may include the same attribute word, and hence the attribute words are actually managed with ID numbers or the like so as to be distinguished from each other.

Figure 33:
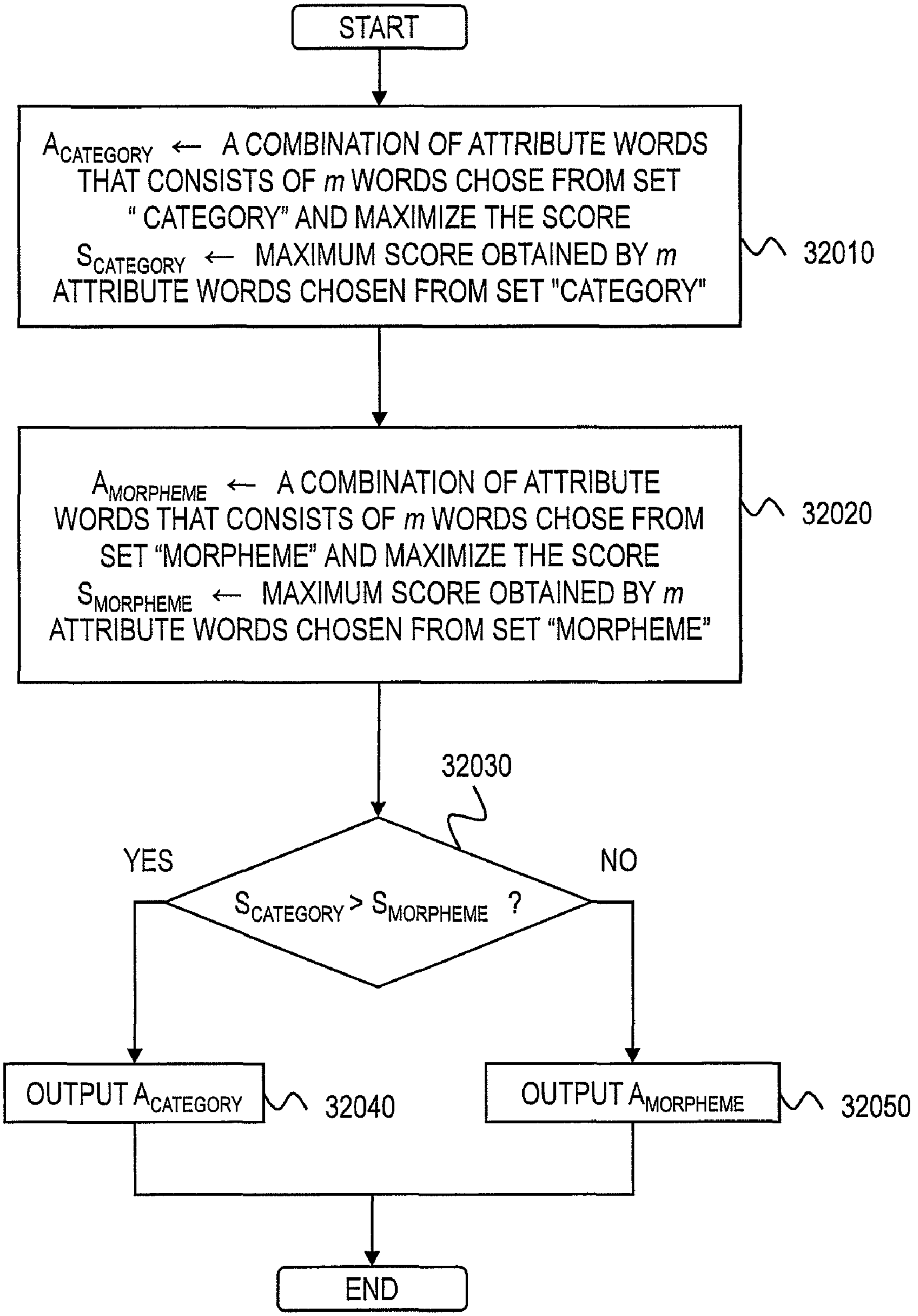
FIG. 33 is a flowchart illustrating an example of the process performed in an attribute word generating unit according to a fifth embodiment of this invention.

FIG. 33 illustrates the fifth embodiment of this invention and is a flowchart illustrating an example of the process performed in the attribute word generating unit 7. As a precondition for performing the flowchart of FIG. 33, it is supposed that the user has finished the character input, and that the POI name retrieving unit 6 has output a plurality of POI name candidates to the attribute word generating unit 7.

In Step 32010, a combination of the attribute words having a maximum score in the combinations of m attribute words is calculated from the POI name candidates by using only the attribute words belonging to the attribute set "category". This computation is performed by calling the subroutine of the process of FIGS. 6A and 6B described in the first embodiment of this invention. The combination of attributes obtained in this computation is denoted by $A_{category}$, and the maximum score is denoted by $S_{category}$.

In Step 32020, a combination of the attribute words having a maximum score in the combinations of m attribute words is calculated from the POI name candidates by using only the attribute words belonging to the attribute set "morpheme". This computation is also performed by calling the subroutine of the process of FIGS. 6A and 6B described in the first embodiment of this invention. The combination of attributes obtained in this computation is denoted by $A_{morpheme}$, and the maximum score is denoted by $S_{morpheme}$.

In Step 32030, both the scores are compared with each other.

Step 32040 is the process when the score of $S_{category}$ is larger than the other. In this case, the combination of attributes $A_{category}$ is output to the output unit 9.

Step 32050 is the process when the score of $S_{morpheme}$ is larger than the other. In this case, the combination of attributes $A_{morpheme}$ is output to the output unit 9.

As described above, in the fifth embodiment of this invention, the scores are compared between a plurality of types of attribute words, and hence the attribute words belonging to the type having a higher score are shown to the user. Thus, the attribute words belonging to the type that is easier for the user to understand and has a high narrowing efficiency can be shown to the user.

It should be noted that it is predicted that the scores are different from each other between the score computations in Steps 32010 and 32020 described above. Therefore, it is possible to adjust the weight to be used for the score calculation to be an appropriate value in advance.

In addition, if the display region on the display unit 104 has a margin, the attribute words selected from two or more attribute sets may be displayed at the same time. Thus, if the user doesn't know the morpheme but knows the category, the user can narrow the POI names based on the known category.

Sixth Embodiment

Reinforcement Learning of the Degree of Relevance

A sixth embodiment will be described. In this embodiment, the degree of relevance between the POI name and the attribute word is updated based on a history of an actual use (or selection) by the user, and hence the selection of the POI name becomes easier for the individual user.

Figure 34:
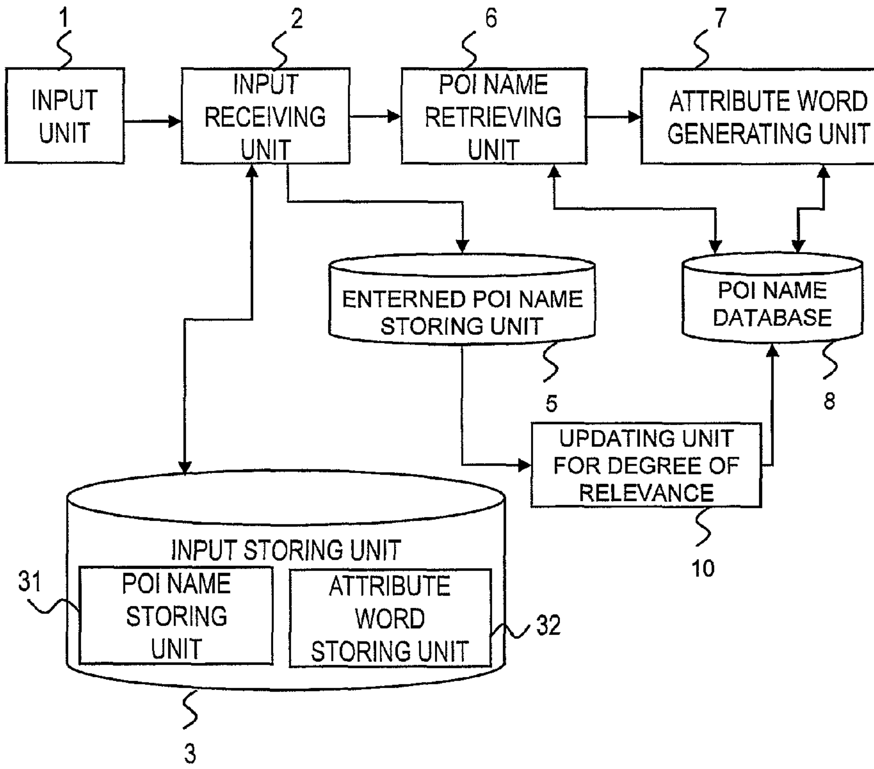
FIG. 34 is a block diagram illustrating functional elements of a car navigation system according to a six embodiment of this invention.

FIG. 34 illustrates the sixth embodiment of this invention and is a block diagram illustrating functional elements of the car navigation system 100. This car navigation system 100 includes an entered POI name storing unit 5 and an updating unit for degree of relevance 10 in addition to the structure of the car navigation system 100 of the first embodiment of this invention illustrated in FIG. 2.

Further, in this embodiment, only the process after the POI name is entered in the first embodiment of this invention is changed. Therefore, the overlapping description with the first embodiment will be omitted.

A precondition will be described. It is supposed that the user is in Misatsu and wants to go to an accommodation facility managed by the city, but does not know the formal name of the POI is "Misatsu Civic Spa Resort".

First, it is supposed that the user inputs the character string "MISATSU". As a result, the three attribute words "hospital", "shopping" and "leisure" are displayed on the screen of the display unit 104, and it is supposed that the user selects "leisure".

Next, it is supposed that the user selects "accommodation facility" among "pet", "accommodation facility" and "spa" that are displayed as the updated attribute words.

As a result, a list of three POI names including "Misatsu CS Hotel" "Misatsu City Campsite" and "Misatsu Civic Spa Resort" is displayed on the screen. It is supposed that the user selects the "Misatsu Civic Spa Resort" and enters the POI on the screen.

The process described above is similar to that described in the first embodiment of this invention. The following is the process that characterizes this embodiment.

When the POI name is entered, the input receiving unit 2 outputs the entered POI name "Misatsu Civic Spa Resort", the other attribute words "leisure" and "accommodation facility" that were selected by the user before the entering, and the still other attribute words "hospital", "shopping", "pet" and "spa" that were displayed on the screen but were not selected by the user to the entered POI name storing unit 5, and then they are stored. A form of this storage is illustrated in FIG. 35. FIG. 35 illustrates the sixth embodiment and is an explanatory diagram illustrating an example of contents stored in the entered POI name storing unit.

Figure 36:
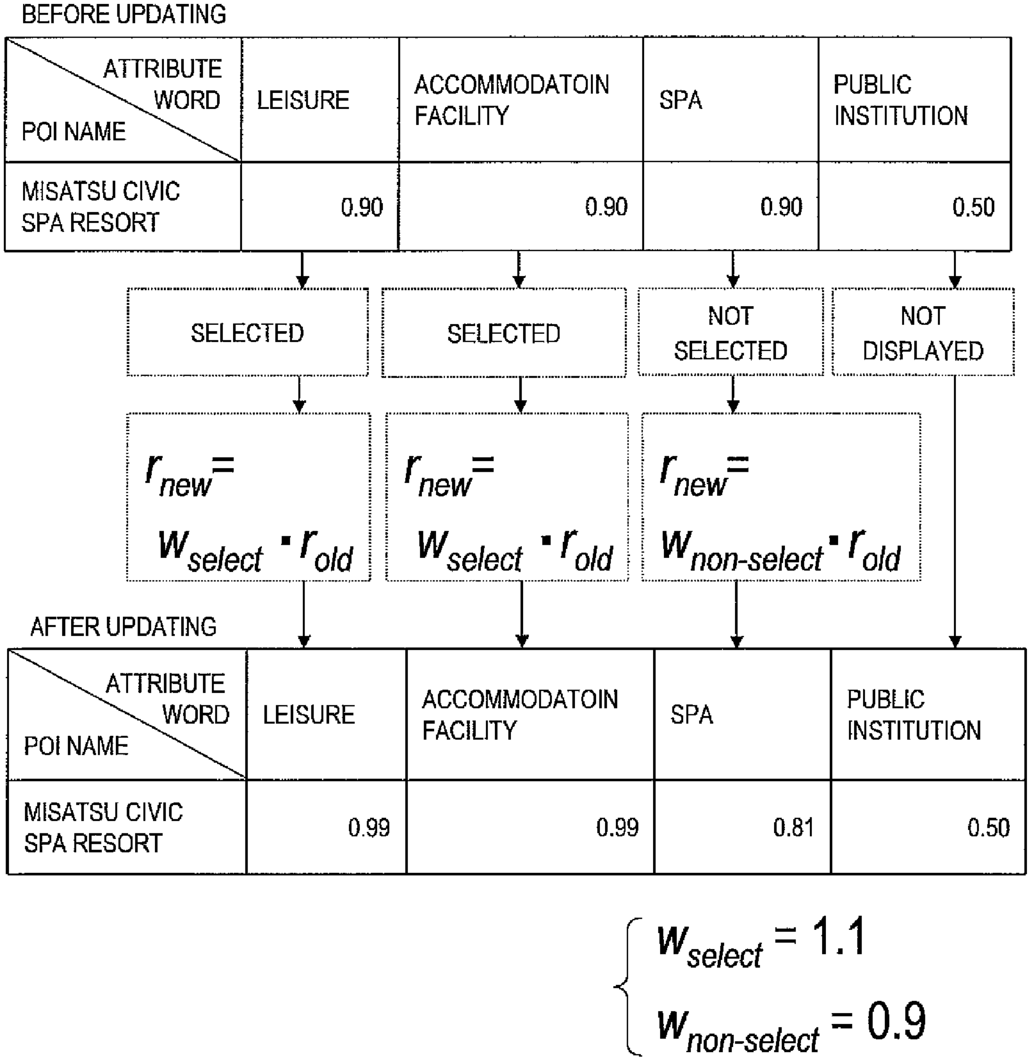
FIG. 36 is an explanatory diagram illustrating an example of updating a degree of relevance between a POI name and an attribute word according to the six embodiment of this invention.

Next, the updating unit for degree of relevance 10 updates the degree of relevance stored in the POI name database 8 based on the contents stored in the entered POI name storing unit 5. The updating method is illustrated in FIG. 36. FIG. 36 illustrates the sixth embodiment of this invention and is an explanatory diagram illustrating an example of updating the degree of relevance between the POI name and the attribute word.

First, the updating unit for degree of relevance 10 extracts the attribute words having the degree of relevance assigned to the entered POI name. Among those attribute words, the attribute word selected by the user can be guessed to be the attribute word that the user thinks to have a higher relevance with the POI because the user actually selects it. Therefore, the degree of relevance between the entered POI and the attribute word is increased. In contrast, the attribute word that was not selected by the user can be guessed to be the attribute word that the user thinks to have little relevance with the POI. Therefore, the degree of relevance between the entered POI and the attribute word is decreased.

Specifically, the entered POI is denoted by $L_{confirmed}$, the attribute word that was selected is denoted by $a_{select}$, the attribute word that was not selected is denoted by $a_{non\text{-}select}$, the degree of relevance before the update is denoted by $r_{old}(L, a)$ and the degree of relevance after the update is denoted by $r_{new}(L, a)$. Then, the degree of relevance is updated according to the equations below.

$$r_{new}(l_{confirmed}, a_{select}) = w_{select} \cdot r_{old}(l_{confirmed}, a_{select}) \quad \text{[Equation 25]}$$

$$r_{new}(l_{confirmed}, a_{non\text{-}select}) = w_{non\text{-}select} \cdot r_{old}(l_{confirmed}, a_{non\text{-}select}) \quad \text{[Equation 26]}$$

Here, $w_{select}$ and $w_{non\text{-}select}$ are coefficients, and $w_{select}$ has a value larger than one while $w_{non\text{-}select}$ has a value smaller than one.

In FIG. 36, as to each of $w_{select}$ and $w_{non\text{-}select}$, the degree of relevance is set to be high (the value is increased) for "leisure" and "accommodation facility" that were selected by the user while the degree of relevance is set to be low (the value is decreased) for "spa" that was not selected by the user. In addition, the value is kept as it is for "public institution" that was not displayed as the attribute word on the screen of the display unit 104.

As described above, in the fifth embodiment of this invention, the degree of relevance 3100 is updated based on the user's actual selecting operation, and hence the POI names can be narrowed in a manner that is easy for the user to use.

Variations of the Sixth Embodiment

Addition of Degree of Relevance of the POI which the User Often Visits

In addition, there is a method of updating the degree of relevance, in which a frequency of selection of the POI that the user has actually visited during a certain period is used for the update.

FIG. 37A illustrates the sixth embodiment of this invention and is an explanatory diagram illustrating a state of learning, which illustrates the degree of relevance between the POI set as a destination in the past half-year and the attribute word. FIG. 37B is an explanatory diagram illustrating a state of learning, which illustrates a relationship among the attribute, the number of POIs and the additional value.

FIG. 37A illustrates POIs set by the user in a predetermined period (e.g., in a half year) as a destination and the degree of relevance 36010 between the POI and the attribute word. In FIG. 37A, the attribute words having the degree of relevance 36010 with POI larger than zero are displayed by hatching.

Next, as to each attribute word, the number of POIs set in the past half-year having the degree of relevance with the attribute word assigned with a value larger than zero is calculated (E(a)). A result of the calculation is arranged in a descending manner as illustrated in FIG. 37B. In this example, it is understood that the user has made access to the POIs associated with "car" ten times and to the POIs associated with "leisure" eight times.

From this result, it is understood that the user often makes access to the POIs associated with the attribute word "car" or "leisure" that are displayed in the higher rank. Therefore, if the attribute words associated with the POIs that are often accessed are shown by priority as the attribute words for the narrowing operation, it is expected that ease of use can be enhanced for the user.

Therefore, addition to the degree of relevance stored in the POI name database 8 is performed according to the number of times. Specifically, when the additional value for each attribute word a is denoted by e(a), this value is normalized by the total number of times of the setting of the destination, and the weight is multiplied for the computation.

$$e(a) = w_e \frac{E(a)}{E_{all}} \qquad \text{[Equation 27]}$$

It should be noted that $E_{all}$ denotes the total number of times of the setting of the destination, $W_e$ denotes the weight.

A result of this computation is illustrated in FIG. 37B as 36120. A value of each variable is assumed as the weight 36130.

Using the calculated additional value, the addition is performed with respect to the degree of relevance stored in the POI name database 8.

$$r_e(l, a) = \begin{cases} r(l, a) + E(a) & (\text{if } r(l, a) > 0) \\ r(l, a) & (\text{otherwise}) \end{cases} \qquad \text{[Equation 28]}$$

In other words, the additional value e(a) is added only to the degree of relevance having a value larger than zero among the degrees of relevance set originally in the database 8. Using the $r_e$(L, a) obtained as described above, the attribute word generating unit 7 selects the attribute words to be shown to the user.

FIG. 38A illustrates the sixth embodiment of this invention and illustrates a relationship among the POI name, the attribute word and the degree of relevance, which is a value before adding the additional value. FIG. 38B illustrates the sixth embodiment of this invention and illustrates a relationship among the POI name, the attribute word and the degree of relevance, which is a value after adding the additional value. FIG. 38A illustrates the degree of relevance before the addition while FIG. 38B illustrates the degree of relevance after the addition. In FIG. 38B, the additional value obtained by the computation of FIG. 37B is added. Then, based on the degree of relevance after the addition, the narrowing attribute words to be shown to the user are selected.

As described above, according to this embodiment, the attribute words related to the POIs that are actually and frequently accessed by the user are shown by priority so that the narrowing operation of the POI names that is easy for the user to use can be realized.

Seventh Embodiment

Priority of POI that is Usually Set Frequently

A seventh embodiment of this invention will be described. In this embodiment, the degree of relevance 3100 between the POI name and the attribute word is weighted according to a frequency of each POI's category set usually in the car navigation system 100.

This embodiment can be described as a structure in which data of the POI name database 8 is added in the car navigation system 100 described in the first embodiment of this invention, and hence overlapping description of the other portions will be omitted.

FIG. 39 illustrates the seventh embodiment of this invention and is an explanatory diagram of a table recording the weight of each POI's category. FIG. 39 illustrates the table recording the weight of each POI's category (group) characterizing this embodiment. This table is stored in the POI name database 8.

Subcategories 38010 of FIG. 39 correspond to subcategories (groups) assigned to individual POI names denoted by 3080 in FIG. 4A. In addition, reference numeral 38020 denotes the weight set according to a frequency of being usually set as the destination for each subcategory. For instance, "spa" and "general hospital" are often set as the destination in the car navigation system 100, and hence a high value is assigned to it. In contrast, "Kimono shop" is not so often set as the destination, and hence a low value is assigned to it. The attribute word generating unit 7 uses a new degree of relevance that is obtained by multiplying the weight denoted by 38020 and the degree of relevance stored originally in the POI name database together so as to select the attribute word. Thus, the attribute words related to the POI that is often set as the destination in the car navigation system 100 is apt to be shown to the user.

Further, although the method of assigning one weight to the subcategory is described in this embodiment, it is possible to adopt another method of setting different weights to individual POIs.

AS described above, according to this embodiment, the attribute word related to the POI that is frequently set as a destination in the car navigation system 100 is usually shown by priority. Thus, the narrowing operation of the POI names can be performed in a manner easy for the user to use.

Eighth Embodiment

Download of Attribute Word and Degree of Relevance

An eighth embodiment of this invention will be described. In this embodiment, data of the POI name and the attribute words selected until the selection of the POI name are transmitted to a server, and the server generates data of a new degree of relevance, which is transmitted to each car navigation system 100 for the update.

Figure 40:
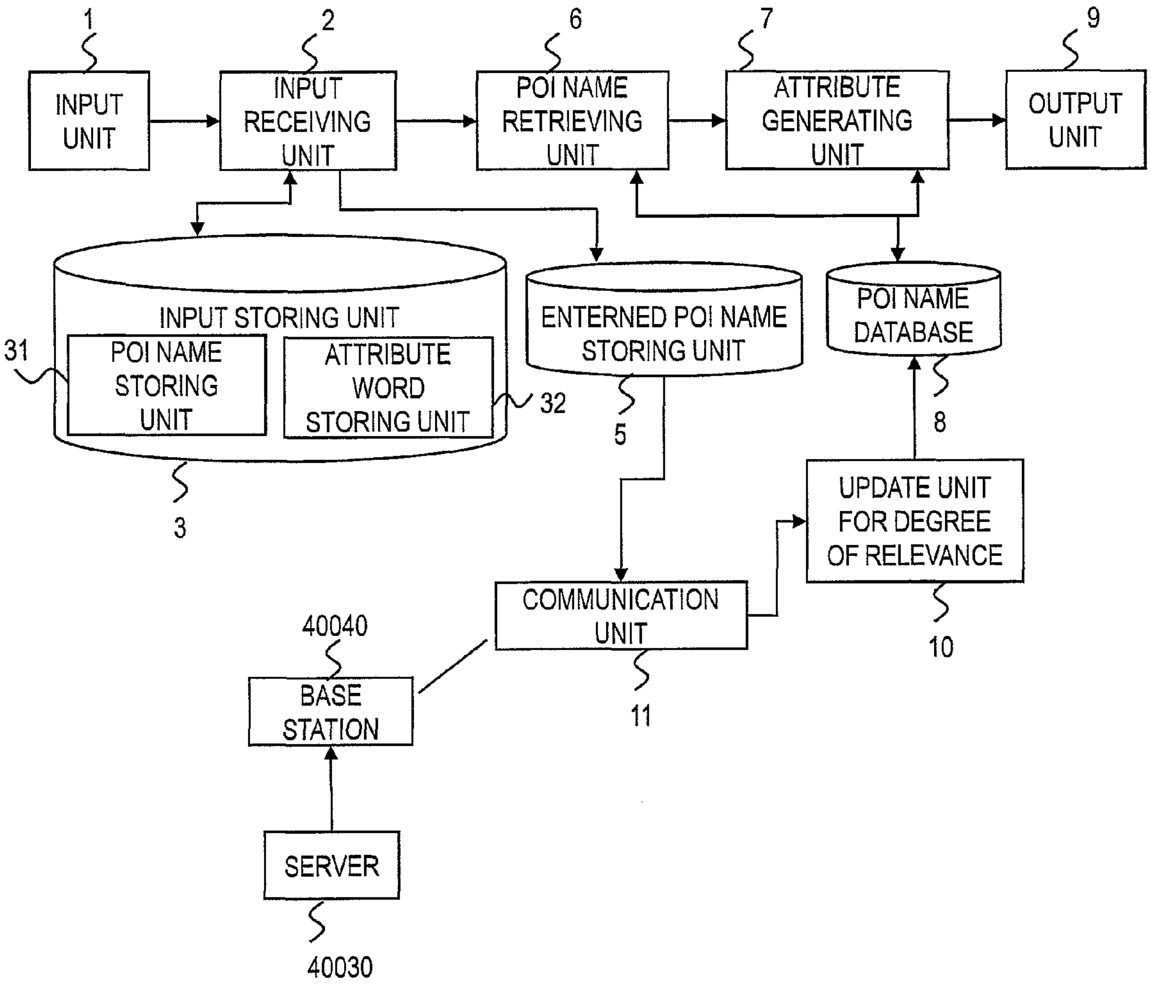
FIG. 40 is a block diagram illustrating functional elements of a computer system according to an eighth embodiment of this invention.

FIG. 40 illustrates the eighth embodiment of this invention and is a block diagram illustrating functional elements of the computer system. This computer system includes the car navigation system 100 of FIG. 2 having the structure of the first embodiment of this invention, the entered POI name storing unit 5, the updating unit for degree of relevance 10, and an additional communication unit 11, as well as a base station 40040 for performing communication with the communication unit 11 of the car navigation system 100, and a server 40030 for processing a request from the car navigation system 100.

Figure 41:
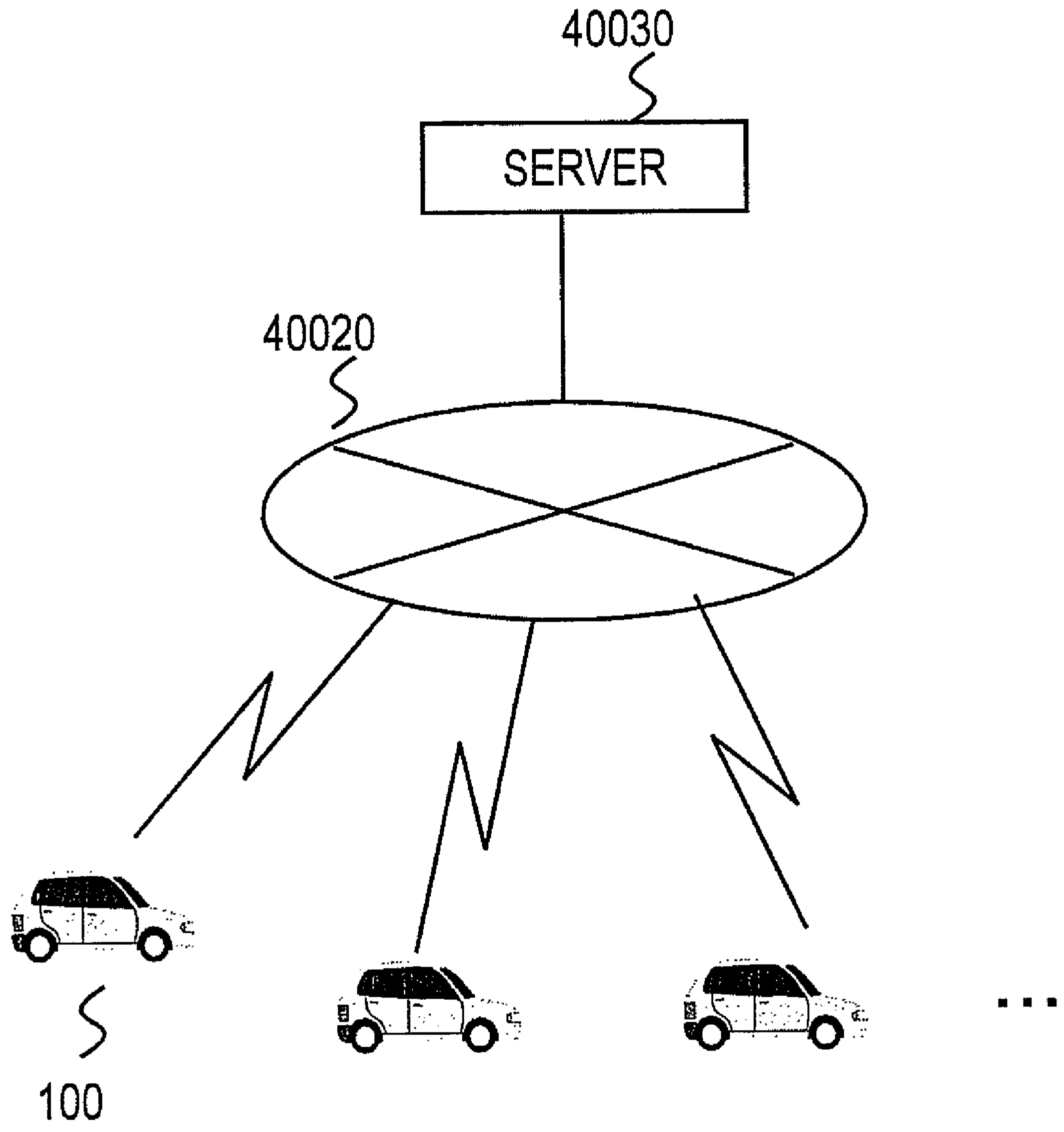
FIG. 41 is a block diagram illustrating a relationship in communication between a car navigation system and a server according to the eighth embodiment of this invention.

FIG. 41 is a block diagram illustrating a relationship in communication between the car navigation system 100 and the server 40030, which is necessary in this embodiment. There are a plurality of car navigation systems 100 provided to automobiles, and the communication unit 11 provided to each car navigation system 100 performs communication with the server 40030 via a communication network 40020.

In the system structure of FIG. 40, the entered POI name storing unit 5 stores the POI that was actually set by the user as a destination, the attribute words that were selected as the attribute words for the narrowing by the user until the selection of the POI, and the attribute words that were not selected by the user. For instance, if the user selects the attribute words "leisure" and "accommodation facility", but does not select the attribute words "hospital", "shopping", "pet", and "spa" before entering the POI name "Misatsu Civic Spa Resort", the storing state is as illustrated in FIG. 35. The communication unit 11 transmits the contents of the entered POI name storing unit 5 to the server 40030.

When the individual car navigation systems 100 similarly perform the transmission to the server 40030, the server 40030 sums up the POI names, the selected attribute words and the number of times of the selection in the process of selecting the POIs. An example of a summation result is illustrated in FIG. 42. FIG. 42 illustrates the eighth embodiment of this invention and is an explanatory diagram illustrating the summation result of the POI name, attribute words and the number of times of the selection in selecting the POI names. Reference numeral 41010 denotes the total number of times of the selection as a destination by all the users, and reference numeral 41020 denotes the total number of times of the selection of each attribute word when each POI name is selected as a destination.

The server 40030 transmits update information about the degree of relevance to each car navigation system 100 based on the summation result. Further, the communication unit 11 of each car navigation system 100 receives the update information and sends it to the updating unit for degree of relevance 10. The updating unit for degree of relevance 10 updates the degree of relevance described in the POI name database 8 based on the update information.

Further, the way of this updating is not limited to a particular one. For instance, there is a method as follows. A ratio of the number of times each attribute word is selected with respect to the number of times of setting the destination is calculated. If the ratio is a certain value or larger, the degree of relevance to be stored in the POI name database 8 is increased. When the ratio is smaller than the certain value, the degree of relevance to be stored in the POI name database 8 is decreased. For instance, the number of times the attribute word "general hospital" is selected with respect to the POI "Misatsu Animal Hospital" is zero in FIG. 42. As a reflection of this, among the degrees of relevance to be stored in the POI name database 8 illustrated in FIG. 5, the degree of relevance between the "Misatsu Animal Hospital" and "general hospital" is set to be zero.

As described above, the degree of relevance is updated based on the frequency of actually selecting the attribute word by many users, and hence the attribute word that is easy for more users to use can be shown to the user.

In addition to the update of the degree of relevance based on the frequency of user's selection of the attribute word, the car navigation system 100 may download from the server 40030 the POI name and the degree of relevance of the attribute word with respect to a newly established POI. Otherwise, in the case where the industrial type of the existing POI is changed, the attribute word and a value of the degree of relevance may be downloaded according to the updated industrial type.

Ninth Embodiment

Joining of Morphemes

A ninth embodiment of this invention will be described. In this embodiment, a method of displaying the morphemes is changed from the second embodiment of this invention, in which the morphemes are used as the attribute words. This embodiment is different from the second embodiment of this invention only in Step 5130 of FIG. 6B in the process of the attribute word generating unit 7, and hence only this portion will be described.

FIG. 43 illustrates the ninth embodiment of this invention and is an explanatory diagram illustrating a manner of showing the attribute words by the morphemes, which illustrates the extracted POI name candidates. FIG. 43 illustrates the POI name candidates corresponding to the morpheme "dejima". FIG. 43 illustrates the POI name candidates corresponding to the morpheme "denden".

As a precondition for the following description, it is supposed that the user inputs a character string "TOZAID" and that eighteen POI names illustrated in FIG. 43 are obtained as the POI name candidates. In addition, it is supposed that the process of selecting two morphemes as the narrowing attribute words among the POI name candidates is performed and that the score is highest in a combination of two morphemes “dejima” and “denden”.

In this case, the two morphemes “dejima” and “denden” are displayed as the attribute words for narrowing on the screen in the second embodiment of this invention. However, there is a possibility that the user cannot recognize that the morpheme is included in the POI name because it is a short morpheme. Therefore, it may be better to display a longer character string as the narrowing attribute word for avoiding the case where the user cannot recognize the morpheme.

In this embodiment, therefore, the POI name matching the selected two morphemes is extracted first in Step 5130. Then, there are five POI names matching “dejima” as illustrated in FIG. 43 and two POI names matching “denden” as illustrated in FIG. 43.

Next, the POI names before and after each morpheme are searched, and the character string is extracted so that the matching portion common to every POI name becomes longest. As a result, “Tozai Dejima” is extracted as illustrated in FIG. 43 while “Tozai Denden Land” is extracted as illustrated in FIG. 43.

Figure 44:
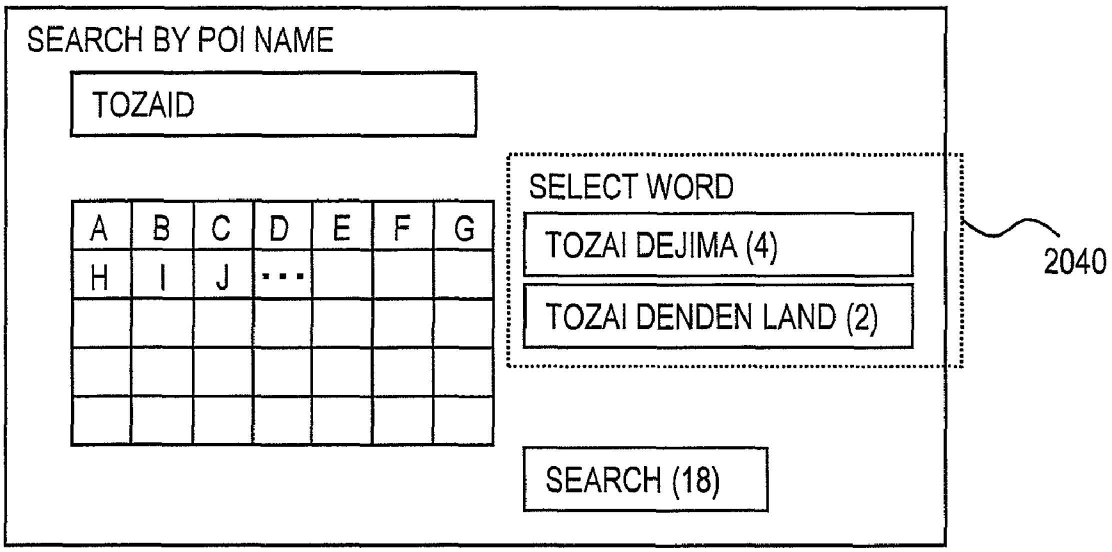
FIG. 44 is a screen image of the attribute words displayed on a display unit of a car navigation system according to the ninth embodiment of this invention.

Next, the character string selected as described above is output as the attribute words for narrowing to the output unit. As a result, two narrowing attribute words “Tozai Dejima” and “Tozai Denden Land” are displayed in the display region 2040 as illustrated in FIG. 44. FIG. 44 illustrates the ninth embodiment of this invention and is a screen image of the attribute words displayed on the display unit of the car navigation system.

As described above, the longer POI name portion is displayed as the attribute word for narrowing, and hence it is possible to avoid the case where the user cannot perform the narrowing operation.

Tenth Embodiment

Use of Position of Morpheme

A tenth embodiment of this invention will be described. In this embodiment, the display method is changed according to a position of the morpheme, in contrast to the second embodiment in which the morphemes are used as the attribute words. This embodiment is different from the second embodiment of this invention in the method of storing data in the POI name database 8, and hence this portion will be described.

As a precondition for the following description, it is supposed that the user inputs a character string “MISA” and that the POI name denoted by 44010 in FIG. 45 is extracted as the POI name candidate. FIG. 45 illustrates the tenth embodiment of this invention and is an explanatory diagram illustrating a relationship among the POI name candidate, the morphemes and the degree of relevance.

FIG. 45 illustrates a state of assigning the degree of relevance in the POI name database 8 in this embodiment. As illustrated in the POI name candidate 44020, the morpheme is “hotel” similarly to the second embodiment of this invention, but the POI name database 8 also has information about which position the morpheme exists in the POI name as a feature of this embodiment. For instance, as to “Hotel Misatsu Crescent”, the morpheme “hotel” exists as leading characters of the POI name. Therefore, an item “hotel (head)” is provided as the attribute word, and the degree of relevance is assigned to it. Similarly, attribute words “hotel (middle)” and “hotel (tail)” are also provided separately.

Figure 46:
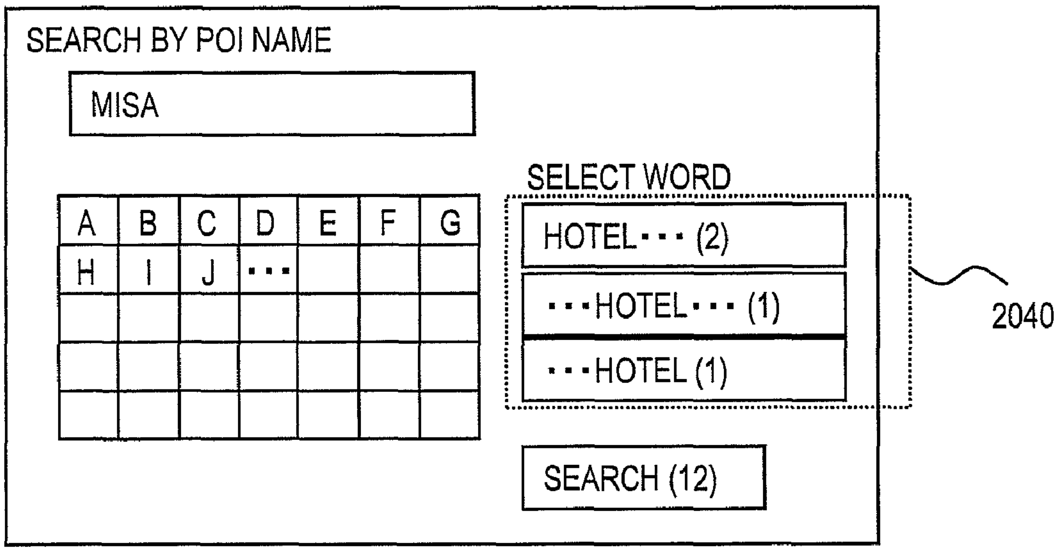
FIG. 46 is a screen image of attribute words displayed on a display unit of a car navigation system according to the tenth embodiment of this invention.

FIG. 46 illustrates the tenth embodiment of this invention and is a screen image of the attribute words displayed on the display unit of the car navigation system. Further, it is supposed that the display attribute selecting unit 7 selects the three attribute words including “hotel (head)”, “hotel (middle)” and “hotel (tail)” as the attribute words to be shown. Receiving this result, the screen may display “hotel (head)” as it is. For instance, however, it is possible to display as indicated by 2040 in FIG. 46, like “Hotel . . . ” or “ . . . . Hotel”, by which the user can intuitively know which position “hotel” exists in the POI name. Further, when the user selects “Hotel . . . ” here, “Hotel Misatsu Crescent” and “Hotel Oyama Misatsu” with leading characters “hotel” are displayed while the POI names without the leading characters “hotel” are not displayed among POI names included in the POI name candidates 44010 of FIG. 45.

As described above, the morpheme and position information are displayed together as the attribute word, and hence the user can easily perform the narrowing operation.

Eleventh Embodiment

Speech Input

An eleventh embodiment of this invention will be described. In this embodiment, user’s input is performed by speech for the first to tenth embodiments of this invention, and hence a result of speech recognition is used for the input. The car navigation system 100 of this embodiment can be implemented by adding speech input means and a speech recognition device to the position before the input unit 1 of the car navigation system 100 of the first to tenth embodiments of this invention.

It should be noted that a method of implementing the speech recognition is disclosed in known documents (see, for example, “Automatic Speech Recognition: The Development of the Sphinx Recognition System”, Lee and Reddy, published by Kluwer Academic Publishers, 1989, “Fundamentals of Speech Recognition”, Rabiner and Juang, published by Prentice Hall PTR, 1993).

Figure 47:
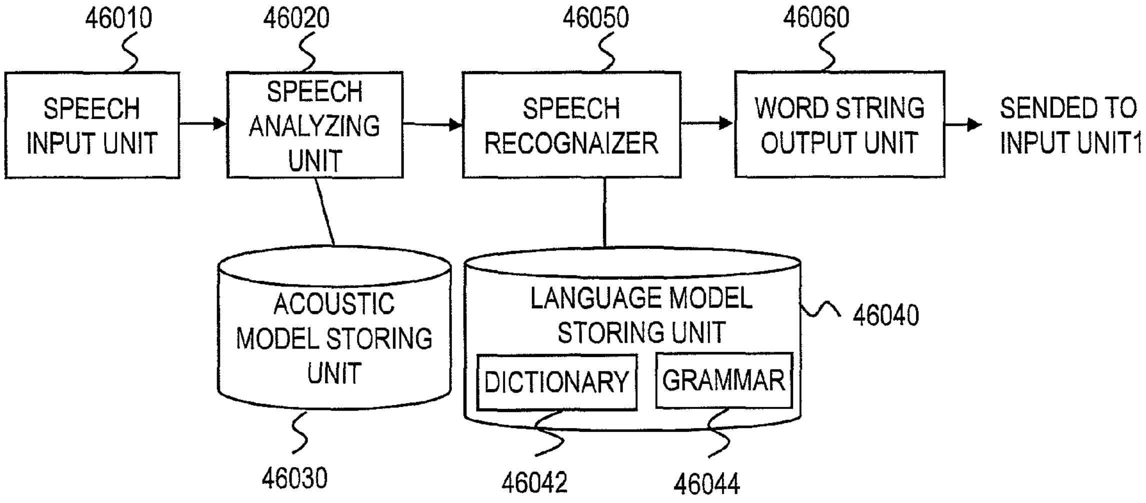
FIG. 47 is a block diagram illustrating functional elements of a car navigation system according to an eleventh embodiment of this invention.

FIG. 47 illustrates a structure that is necessary for the speech input means disposed at the position before the input unit 1. FIG. 47 illustrates the eleventh embodiment of this invention and is a block diagram illustrating functional elements of the car navigation system 100.

A speech input unit 46010 converts a speech signal from the user into a digital signal, which is received as speech data.

A speech analyzing unit 46020 converts speech data from the user into a sequence of feature vectors. The sequence of feature vectors is a set of multidimensional vectors arranged in time series, each of which indicates a feature of the speech at each time. For instance, the input speech data is divided by approximately 10 milliseconds, the speech data at each time is converted into the multidimensional vector called a mel frequency cepstrum coefficient (MFCC) parameter (feature parameter), and the speech data are arranged in time series.

An acoustic model storing unit 46030 stores a model corresponding to each phoneme extracted from the feature parameter. As an expression form of this model, a hidden Marcov model (HMM) can be used in which each phoneme is defined by three states.

A language model storing unit 46040 stores a dictionary 46042 and a grammar 46044. There are two types of language models in the speech recognition including a rule-based language model and a statistical language model, and it is supposed that the statistical language model is used in this embodiment. A method of implementing the speech recognition by the statistical language model is also disclosed in the above-mentioned documents written by Lee and Reddy, or written by Rabiner and Juang.

The dictionary 46042 stores words to be recognized by the speech recognition device and phoneme strings thereof. It is supposed in this embodiment that the POI name stored in the POI name database 8 is divided into the morphemes, which are stored as the words. An example of the dictionary is illustrated in FIG. 48. FIG. 48 illustrates the eleventh embodiment of this invention and illustrates an example of the dictionary, which is an explanatory diagram illustrating a relationship between the word and the phoneme string. Phonemic symbols that are used for expressing the phoneme strings of FIG. 48 are written in accordance with the rule of the Sphinx System (speech recognition system developed at Carnegie Mellon University) for English speech recognition. However, when it is actually implemented in each language, phonemic symbols that are used in the language may be used. In addition, if all the morphemes included in the POI names in a nationwide scale are stored in the dictionary, the number of the morphemes becomes enormous. As a result, a calculating amount and a storage amount necessary for the speech recognition will be increased. In addition, a decrease in recognition rate will probably occur. Therefore, this dictionary stores only morphemes appearing frequently in the POI names in a nationwide scale.

The grammar 46044 stores a transition probability between the words stored in the dictionary 46042. The transition probability can be calculated by a method of generating a word N-gram model that is used in general for generating the statistical language model. As a learning corpus for generating the word N-gram model, the POI names stored in the POI name database 8 can be used as they are, for example.

A speech recognizer 46050 compares the sequence of feature vectors of the input speech with each of word strings stored in the language model, computes a score indicating a matching degree between them, and outputs the word string having a high score. Here, it may output only one word string having the highest score or may output a plurality of word strings having high scores.

A word string output unit 46060 selects word strings to be sent to the input unit 1 among the word strings obtained from the speech recognizer. Here, it is supposed that a confidence measure is calculated based on the score of each of the word strings obtained from the speech recognizer and that only the word strings having high confidence measures are output.

The process after that is similar to that illustrated in the first to tenth embodiments of this invention. Specifically, the POI name retrieving unit 6 generates a list of POI names matching the word string input from the word string output unit. The attribute word generating unit generates a combination of the narrowing attribute words to be shown to the user according to the method in each embodiment of this invention. The output unit 9 displays the combination of the attribute words on the screen. In addition, the output unit 9 outputs the attribute word via the speaker as the audio guidance like "The narrowing operation will be started from any one of . . . ".

Receiving this, the user may designate the attribute word by the touch panel or may designate the attribute word by speech. If the attribute word is designated by speech, the word string output unit 46060 outputs the attribute word recognized from the user's speech to the input unit 1 so that the narrowing operation is performed according to the method of each embodiment of this invention.

In the case of the speech input, however, a plurality of word strings may be input or there may be a plurality of candidate word strings. Such cases will be described below. For instance, it is supposed that the user speaks "Tozai Denden Land" and that only two words "tozai" and "land" that have high confidence measures as a result of the speech recognition process are sent from the word string output unit 46060 to the input unit 1. In this case, the POI name retrieving unit 6 retrieves POI names having two morphemes "tozai" and "land" so as to obtain a list. In addition, it is supposed that the user speaks "Tozai Denden Land" and that two word strings are obtained, which respectively include two words "tokai" and "land" as well as "tozai" and "land" having high confidence measures as a result of the speech recognition process. It is supposed that the word string output unit 46060 sends the two word string to the input unit 1. In this case, the POI name retrieving unit 6 retrieves the POI name having two morphemes "tozai" and "land" as well as the POI name having two morphemes "tokai" and "land" so as to obtain a list.

In addition, since the word string output from the word string output unit 46060 is divided by the morpheme, it matches any one of the morphemes associated with each POI name 16010 illustrated in FIG. 17. Hereinafter, the recognized word that matches any one of the morphemes illustrated in FIG. 17 is referred to as "recognized morpheme". Therefore, for instance, there is a method to obtain POI name candidates with confidence measure. The word string output unit 46060 also inputs the recognized morphemes and a confidence measure indicating a likelihood of each recognized morpheme together. Then, the POI name retrieving unit 6 retrieves POI name candidates that include the morphemes corresponding with the recognized morphemes from the list illustrated in FIG. 17. In addition, the POI name retrieving unit 6 calculates the confidence measure of each POI name candidate as follows. First, for every morpheme having the degree of relevance larger than 0 with the POI name candidate, the product of degree of relevance and the confidence measure of the recognized morpheme is calculated. Second, the all calculated products are summed up with respect to one POI name so as to calculate the confidence measure of each POI name. According to this method, a list of POI names can be obtained with the confidence measure.

As described above, the speech input enables receiving various inputs from the user, whereby ease of use can be enhanced.

As described above, this invention can be applied to a car navigation system or a database system that performs retrieval based on character information.

While the present invention has been described in detail and pictorially in the accompanying drawings, the present invention is not limited to such detail but covers various obvious modifications and equivalent arrangements, which fall within the purview of the appended claims.

What is claimed is:

1. An information retrieval apparatus, comprising:

an input unit for inputting characters;

a database for storing a name, an attribute word associated with the name, and a degree of relevance indicating a degree of relevance between the name and the attribute word;

a name retrieval unit for retrieving a name including the input characters from the database to output the retrieved name as a candidate name;

an attribute word generating unit for extracting an attribute word associated with the candidate name output from the name retrieval unit from the database; and an output unit for displaying the attribute word extracted by the attribute word generating unit and the candidate name from the name retrieval unit, wherein:

the attribute word generating unit is configured to:

obtain a degree of relevance of the candidate name associated with the attribute word from the database with respect to a combination of the extracted attribute words;

calculate a degree of independency indicating a degree of difference between the extracted attribute words;

calculate a degree of coverage indicating an extent to which the combination of the extracted attribute words covers the candidate names; and calculate a degree of equality indicating uniformity of a number of corresponding candidate names for each attribute word;

the attribute word generating unit comprises a first score calculating unit for calculating a score of the combination of the attribute words based on at least one of the calculated degree of independency, the calculated degree of coverage and the calculated degree of equality; and the attribute word generating unit outputs the combinations of the attribute words to the output unit in a descending order of the score.

2. The information retrieval apparatus according to claim 1, wherein the attribute word stored in the database comprises a morpheme constituting a part of the candidate name.

3. The information retrieval apparatus according to claim 1, wherein:

the attribute word generating unit is further configured to:

generate an attribute indicating an irrelevance with the combination of the extracted attribute words as a second attribute word to calculate a degree of relevance between the second attribute word and the candidate name;

calculate a degree of independency indicating the degree of difference between the candidate names of the extracted attribute words based on the degree of relevance between the combination of the extracted attribute words and the candidate name, and the degree of relevance between the second attribute word and the candidate name;

calculate a degree of coverage indicating an extent to which the combination of the extracted attribute words covers the candidate names based on the degree of relevance between the combination of the extracted attribute words and the candidate name, and the degree of relevance between the second attribute word and the candidate name; and calculate a degree of equality indicating the uniformity of the number of corresponding candidate names between the attribute words based on the degree of relevance between the combination of the extracted attribute words and the candidate name, and the degree of relevance between the second attribute word and the candidate name;

the attribute word generating unit comprises a second score calculating unit for calculating a score of the combination of the attribute words based on at least one of the calculated degree of independency, the calculated degree of coverage and the calculated degree of equality; and the attribute word generating unit outputs the combinations of the attribute words to the output unit in the descending order of the score calculated by the second score calculating unit.

4. The information retrieval apparatus according to claim 3, wherein the attribute word generating unit compares the score calculated by the first score calculating unit with the score calculated by the second score calculating unit, to output the combination of the attribute words having a higher score to the output unit.

5. The information retrieval apparatus according to claim 1, wherein:

the attribute words stored in the database are classified according to a type of the attribute word; and the attribute word generating unit calculates the score of the combination of the attribute words for each type of the attribute word, to output the combination of the attribute words having a maximum score to the output unit.

6. The information retrieval apparatus according to claim 1, further comprising:

a second input unit for selecting the candidate name and the attribute word output to the output unit;

an entered name storing unit for storing the candidate name and the attribute word selected by the second input unit, and the attribute word that has not been selected by the second input unit; and an updating unit for degree of relevance for updating the degree of relevance stored in the database based on the candidate name and the attribute word stored in the entered name storing unit, wherein the updating unit for degree of relevance increases the degree of relevance between the candidate name and the attribute word selected by the second input unit, and decreases the degree of relevance between the attribute word that has not been selected by the second input unit and the candidate name, among the candidate names and the attribute words stored in the entered name storing unit, to update a value of the degree of relevance stored in the database.

7. The information retrieval apparatus according to claim 1, wherein:

the database includes a table of numeric values assigned to one of each name and a classified group of a plurality of the names; and the attribute word generating unit uses a value obtained by multiplying the numeric value and the degree of relevance corresponding to the candidate name, as a new degree of relevance.

8. The information retrieval apparatus according to claim 1, further comprising a communication unit for receiving the degree of relevance, wherein the degree of relevance stored in the database is updated with the received degree of relevance.

9. The information retrieval apparatus according to claim 2, wherein the attribute word generating unit is further configured to:

calculate the attribute word having a high score;

retrieve the candidate name by character strings before and after the attribute word;

generate a character string in which the attribute word matches the candidate name for a longer part; and output the generated character string as the attribute word to the output unit.

10. The information retrieval apparatus according to claim 2, wherein the attribute word stored in the database comprises:

a morpheme that is a part of the name; and position information indicating a position of the morpheme in the name.

11. The information retrieval apparatus according to claim 1, further comprising:

a speech input unit for obtaining a speech signal; and a speech recognizer for recognizing words from the obtained speech signal to output the recognized words, wherein the words output from the speech recognizer are input to the input unit.

12. The information retrieval apparatus according to claim 1, wherein the attribute word generating unit is further configured to:

calculate a degree of understandability indicating a general level of the degree of relevance by the combination of the attribute words; and calculate a score of the combination of the attribute words based on at least one of the calculated degree of independency, the calculated degree of coverage, the calculated degree of equality and the calculated degree of understandability.

13. The information retrieval apparatus according to claim 12, wherein the degree of understandability is an indicator indicating an understandability of a relationship between the attribute word and the name.

14. The information retrieval apparatus according to claim 1, wherein the degree of independency is an indicator of different attribute words between the extracted attribute words.

15. The information retrieval apparatus according to claim 1, wherein the degree of coverage is an indicator indicating a ratio of the candidate names which is selected by the combination of the extracted attribute words.

16. The information retrieval apparatus according to claim 1, wherein the degree of equality is an indicator indicating uniformity of the number of candidate names corresponding to the extracted attribute word.

17. An information retrieval system, comprising:

an information retrieval apparatus for retrieving a name including input characters from a database; and a server coupled to the information retrieval apparatus via a network, wherein:

the information retrieval apparatus comprises:

an input unit for inputting characters;

a database for storing the name, an attribute word associated with the name, and a degree of relevance indicating a degree of relevance between the name and the attribute word;

a name retrieval unit for retrieving a name including the input characters from the database to output the retrieved name as a candidate name;

an attribute word generating unit for extracting an attribute word associated with the candidate name output from the name retrieval unit from the database;

an output unit for displaying the attribute word extracted by the attribute word generating unit and the candidate name from the name retrieval unit;

a communication unit for communicating with the server; and an updating unit for degree of relevance for updating the degree of relevance stored in the database with a degree of relevance received from the server;

the attribute word generating unit is configured to:

obtain a degree of relevance of the candidate name associated with the attribute word from the database with respect to a combination of the extracted attribute words;

calculate a degree of independency indicating a degree of difference between the extracted attribute words;

calculate a degree of coverage indicating an extent to which the combination of the extracted attribute words covers of the candidate names; and calculate a degree of equality indicating uniformity of a number of corresponding candidate names for each attribute word;

the attribute word generating unit comprises a first score calculating unit for calculating a score of the combination of the attribute words based on at least one of the calculated degree of independency, the calculated degree of coverage and the calculated degree of equality; and the attribute word generating unit outputs the combinations of the attribute words to the output unit in a descending order of the score.

18. The information retrieval system according to claim 17, wherein the attribute word stored in the database comprises a morpheme constituting a part of the candidate name.

19. An information retrieval method of retrieving a name including characters input in a computer from a database, the method comprising:

retrieving, by the computer, the name including the input characters from a database for storing the name, an attribute word associated with the name, and a degree of relevance indicating a degree of relevance between the name and the attribute word;

outputting the retrieved name as a candidate name;

extracting an attribute word associated with the candidate name from the database; and outputting the extracted attribute word and the candidate name to an output unit of the computer, wherein the extracting an attribute word associated with the candidate name from the database comprises:

obtaining a degree of relevance of the candidate name associated with the attribute word from the database with respect to a combination of the extracted attribute words;

calculating a degree of independency indicating a degree of difference between the extracted attribute words;

calculating a degree of coverage indicating an extent to which the combination of the extracted attribute words covers the candidate names;

calculating a degree of equality indicating uniformity of a number of corresponding candidate names for each attribute word;

calculating a score of the combination of the attribute words based on at least one of the calculated degree of independency, the calculated degree of coverage and the calculated degree of equality; and outputting the combinations of the attribute words to the output unit in a descending order of the score.

20. The information retrieval method according to claim 19, wherein the attribute word stored in the database comprises a morpheme constituting a part of the candidate name.

* * * * *